(12) United States Patent
LaMuth

(10) Patent No.: US 7,236,963 B1
(45) Date of Patent: Jun. 26, 2007

(54) INDUCTIVE INFERENCE AFFECTIVE LANGUAGE ANALYZER SIMULATING TRANSITIONAL ARTIFICIAL INTELLIGENCE

(75) Inventor: John E. LaMuth, P.O. Box 1004, Lucerne Valley, CA (US) 92356

(73) Assignee: John E. LaMuth, Lucerne Valley, CA (US)

( * ) Notice: Subject to any disclaimer, the term of this patent is extended or adjusted under 35 U.S.C. 154(b) by 932 days.

(21) Appl. No.: 10/387,241

(22) Filed: Mar. 11, 2003

Related U.S. Application Data

(60) Provisional application No. 60/367,995, filed on Mar. 25, 2002.

(51) Int. Cl.
*G06F 17/00* (2006.01)
*G06N 5/02* (2006.01)

(52) U.S. Cl. ............................. 706/46; 706/45; 706/47
(58) Field of Classification Search .................. 706/46, 706/45, 47; 704/270; 434/236
See application file for complete search history.

(56) References Cited

U.S. PATENT DOCUMENTS

| | | | | |
|---|---|---|---|---|
| 5,724,987 | A | * | 3/1998 | Gevins et al. .............. 600/544 |
| 6,006,188 | A | * | 12/1999 | Bogdashevsky et al. .... 704/270 |
| 6,157,913 | A | * | 12/2000 | Bernstein .................... 704/275 |
| 2003/0018469 | A1 | * | 1/2003 | Humphreys et al. ........... 704/9 |

* cited by examiner

*Primary Examiner*—Joseph P Hirl

(57) ABSTRACT

The transitional version of the inductive inference affective language analyzer is organized as a tandem nested expert system composed of a transitional language analyzer overseen by a master control unit-expert system that coordinates the transitional interchanges over time. The systematic organization of the transitional power hierarchy permits extreme efficiency in programming of the respective knowledge bases through the principles of inheritance: permitting a precise determination of the motivational level at issue during a given transitional interchange. The preferred mode of operation is the true AI simulation mode, utilizing a sentence generator for formulating responses judged for appropriateness by feedback through the decoding system. The decoding and simulation of the transitional power maneuvers permits an AI simulation of humor/comedy in the virtuous realm, criminality with respect to the domain of defect, and the role of AI mental health clinician employs the transitional power maneuvers targeting the vices of excess.

1 Claim, 89 Drawing Sheets

| ++ VICES of EXCESS (EXCESSIVE VIRTUE) | MENTAL ILLNESS (TRANSITIONAL EXCESS) |
|---|---|
| + MAJOR VIRTUES (VIRTUOUS MODE) | LESSER VIRTUES (TRANSITIONAL VIRTUE) | o NEUTRALITY STATUS
(DEFAULT POSITION)

| − VICES of DEFECT (ABSENCE OF VIRTUE) | CRIMINALITY (TRANSITIONAL DEFECT) |
|---|---|
| − − HYPER-VIOLENCE (EXCESSIVE DEFECT) | HYPER-CRIMINALITY (TRANSITIONAL HYPERV.) |

Fig. 1

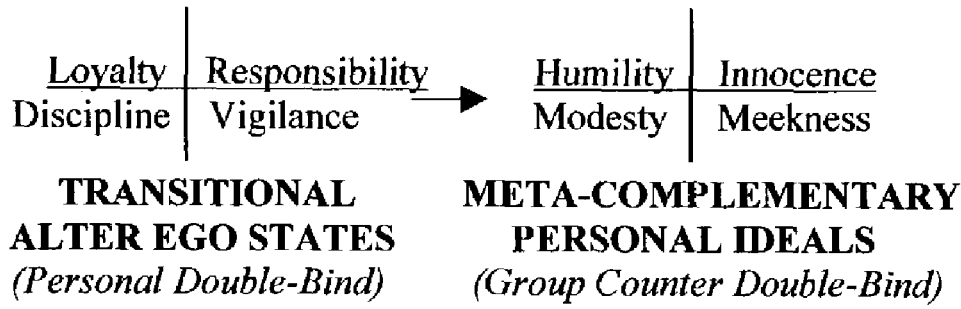
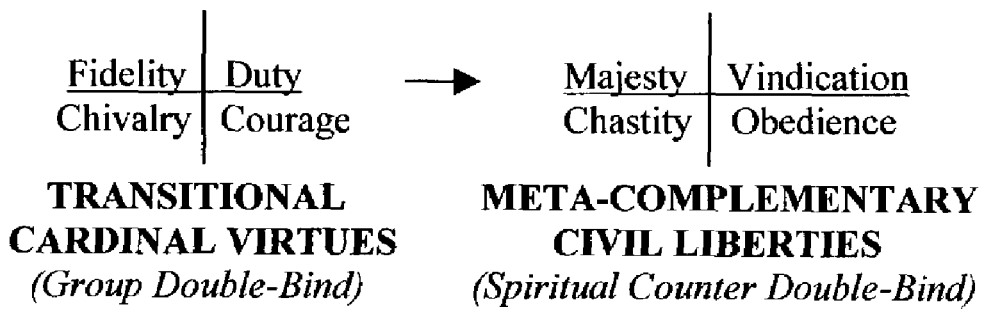
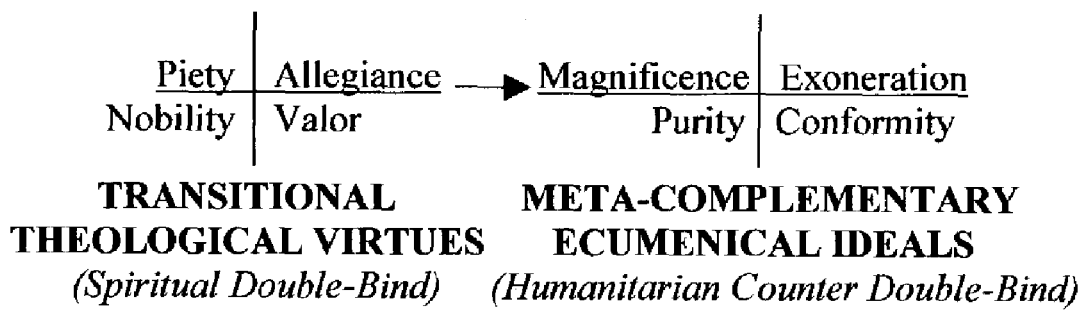
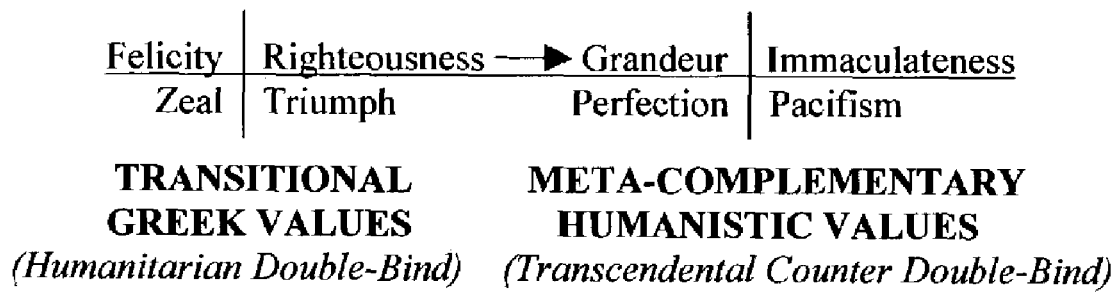
Fig. 2-A

| LOYALTY | HUMILITY |
|---|---|
| Previously, I (as group authority) have gloriously acted in a nostalgic fashion, in response to the worshipful treatment of the personal follower.<br><br>But now, you (as new personal follower) will *loyally* act in a worshipful fashion towards me: in anticipation of my (as established GA) gloriously-nostalgic treatment of you. | Previously, you (as new personal follower) have loyally acted in a worshipful fashion towards me: in anticipation of my (as established GA) glorious sense of nostalgia.<br><br>But now, I (as reluctant group authority) will *humbly* <u>deny</u> acting gloriously towards you: averting your (as new PF) loyal treatment of me. |
| FIDELITY | MAJESTY |
| Previously, I (as spiritual authority) have gloriously acted in a provident fashion, in response to the prudent-worship of the group representative.<br>But now, you (as new group representative) will loyally act with *fidelity* towards me: in anticipation of my (as established SA) gloriously-provident treatment of you. | Previously, you (as new group representative) have loyally acted with fidelity towards me: in anticipation of my (as established SA) gloriously-provident treatment of you.<br>But now, I (as reluctant spiritual authority) will humbly act in a *majestic* fashion towards you: averting your (as new GR) loyal sense of fidelity. |
| PIETY | MAGNIFICENCE |
| Previously, I (as humanitarian authority) have providently acted in a graceful fashion, in response to the prudent-faith of the spiritual disciple.<br><br>But now, you (as new spiritual disciple) will *piously* act with fidelity towards me: in anticipation of my (as established HA) providently-graceful treatment of you. | Previously, you (as new spiritual disciple) have piously acted with fidelity towards me: in anticipation of my (as established HA) providently-graceful treatment of you.<br>But now, I (as reluctant humanitarian authority) will majestically react in a *magnificent* fashion towards you: averting your (as new SD) pious treatment of me. |
| FELICITY | GRANDEUR |
| Previously, I (as transcendental authority) have tranquilly acted in a graceful fashion, in response to the beauteous-faith of the representative member of humanity<br>But now, you (as new representative member of humanity) will piously act *felicitously* towards me: in anticipation of my (as established TA) tranquil sense of gracefulness. | Previously, you (as new representative member of humanity) have piously acted felicitously towards me: in anticipation of my (as established TA) tranquil sense of gracefulness.<br>But now, I (as reluctant transcendental authority) will magnificently react in a *grand* fashion towards you: averting your (as new RH) felicitous treatment of me. |

Fig. 2-B

| RESPONSIBILITY | INNOCENCE |
|---|---|
| Previously, I (as group authority) have honorably acted in a guilty fashion towards you, in response to the blameful treatment of the personal follower.<br>But now, you (as new personal follower) will blamefully seek a sense of *responsibility* from me: in anticipation of my (as established GA) honorable sense of guilt. | Previously, you (as new personal follower) have blamefully sought a sense of responsibility from me: in anticipation of my (as established GA) honorable sense of guilt.<br>But now, I (as reluctant group authority) will *innocently* <u>deny</u> acting honorably towards you: opposing your (as new PF) blameful quest for responsibility. |
| DUTY | VINDICATION |
| Previously, I (as spiritual authority) have honorably acted in a libertarian fashion, in response to the just-blaming of the group representative.<br><br>But now, you (as new group representative) will *dutifully* seek a sense of responsibility from me: in anticipation of my (as established SA) libertarian sense of honor. | Previously, you (as new group representative) have dutifully sought a sense of responsibility from me: in anticipation of my (as established SA) libertarian sense of honor.<br>But now, I (as reluctant spiritual authority) will innocently act in a *vindicated* fashion towards you: opposing your (as new GR) dutiful quest for responsibility. |
| ALLEGIANCE | EXONERATION |
| Previously, I (as humanitarian authority) have freely-willed acted in a libertarian fashion, in response to the blameful-hope for justice expressed by the spiritual disciple.<br>But now, you (as new spiritual disciple) will dutifully act in an *allegiant* fashion towards me: in anticipation of my (as established HA) libertarian sense of free will. | Previously, you (as new spiritual disciple) have dutifully acted in an allegiant fashion towards me: in anticipation of my (as established HA) libertarian sense of free will.<br>But now, I (as reluctant humanitarian authority) will vindicatingly act in an *exonerated* fashion towards you: opposing your (as new SD) dutiful sense of allegiance. |
| RIGHTEOUSNESS | IMMACULATENESS |
| Previously, I (as transcendental authority) have freely-willed acted in an egalitarian fashion, in response to the just-hope for the truth of the representative member of humanity.<br>But now, you (as new representative member of humanity) will allegiantly act *righteously* towards me: in anticipation of my (as established TA) egalitarian treatment of you. | Previously, you (as new representative member of humanity) have allegiantly acted righteously towards me: in anticipation of my (as established TA) egalitarian treatment of you.<br>But now, I (as reluctant transcendental authority) will exoneratingly act in an *immaculate* fashion towards you: opposing your (as new RH) righteous treatment of me. |

Fig. 2-C

| DISCIPLINE | MODESTY |
|---|---|
| Previously, you (as group authority) have dignifiedly acted in a desirous fashion, in response to the approving treatment of the personal follower.<br><br>But now, I (as new personal follower) will approvingly act in a *disciplined* fashion towards you: in anticipation of your (as established GA) dignified-desire for me. | Previously, I (as new personal follower) have approvingly acted in a disciplined fashion towards you: in anticipation of your (as established GA) dignified-desire for me.<br>But now, you (as reluctant group authority) will *modestly* <u>deny</u> dignifiedly-desiring me: averting my (as new PF) disciplined treatment of you. |
| CHIVALRY | CHASTITY |
| Previously, you (as spiritual authority) have dignifiedly acted in a civil fashion, in response to the temperate-approval of the group representative.<br>But now, I (as new group representative) will *chivalrously* act in a disciplined fashion towards you: in anticipation of your (as established SA) civilly-dignified treatment of me. | Previously, I (as new group representative) have chivalrously acted in a disciplined fashion towards you: in anticipation of your (as established SA) civilly-dignified treatment of me.<br>But now, you (as reluctant spiritual authority) will modestly act in a *chaste* fashion towards me: averting my (as new GR) chivalrous sense of discipline. |
| NOBILITY | PURITY |
| Previously, you (as humanitarian authority) have civilly behaved in a magnanimous fashion, in response to the temperate sense of charitableness of the spiritual disciple.<br>But now, I (as new spiritual disciple) will chivalrously act in a *noble* fashion towards you: in anticipation of your (as established HA) civilly-magnanimous treatment of me. | Previously, I (as new spiritual disciple) have chivalrously acted in a noble fashion towards you: in anticipation of your (as established HA) civilly-magnanimous treatment of me.<br>But now, you (as reluctant humanitarian authority) will chastely act in a *pure* fashion towards me: averting my (as new SD) noble treatment of you. |
| ZEAL | PERFECTION |
| Previously, you (as transcendental authority) have magnanimously acted lovingly, in response to the charitable sense of goodness of the representative member of humanity.<br>But now, I (as new representative member of humanity) will nobly act in a *zealous* fashion towards you: in anticipation of your (as established TA) loving treatment of me. | Previously, I (as new representative member of humanity) have nobly acted in a zealous fashion towards you: in anticipation of your (as established TA) loving treatment of me.<br>But now, you (as reluctant transcendental authority) will *perfectly* act in a pure fashion towards me: averting my (as new RH) noble sense of zeal. |

Fig. 2-D

| | |
|---|---|
| VIGILANCE<br>Previously, you (as group authority) have worrisomely acted with integrity, in response to the concerned treatment of the personal follower.<br><br>But now, I (as new personal follower) will *vigilantly* act in a concerned fashion towards you: in anticipation of your (as established GA) worrisome sense of integrity. | MEEKNESS<br>Previously, I (as new personal follower) have vigilantly acted in a concerned fashion towards you: in anticipation of your (as established GA) worrisome sense of integrity.<br>But now, you (as reluctant group authority) will *meekly* deny acting with integrity towards me: opposing my (as new PF) vigilant treatment of you. |
| COURAGE<br>Previously, you (as spiritual authority) have austerely acted with integrity, in response to the fortitudinous-concern of the group representative.<br><br>But now, I (as new group representative) will vigilantly act in a *courageous* fashion towards you: in anticipation of your (as established SA) austere sense of integrity. | OBEDIENCE<br>Previously, I (as new group representative) have vigilantly acted in a courageous fashion towards you: in anticipation of your (as established SA) austere sense of integrity.<br>But now, you (as reluctant spiritual authority) will meekly act in an *obedient* fashion towards me: opposing my (as new GR) vigilant sense of courage. |
| VALOR<br>Previously, you (as humanitarian authority) have austerely acted with equanimity, in response to the fortitudinous sense of decency of the spiritual disciple.<br>But now, I (as new spiritual disciple) will courageously act in a *valiant* fashion towards you: in anticipation of your (as established HA) austere sense of equanimity. | CONFORMITY<br>Previously, I (as new spiritual disciple) have courageously acted in a valiant fashion towards you: in anticipation of your (as established HA) austere sense of equanimity.<br>But now, you (as reluctant humanitarian authority) will obediently act in a *conformist* fashion towards me: opposing my (as new SD) valiant treatment of you. |
| TRIUMPH<br>Previously, you (as transcendental authority) have peacefully acted with equanimity, in response to the decent sense of wisdom of the representative member of humanity.<br>But now, I (as new representative member of humanity) will valiantly act *triumphantly* towards you: in anticipation of your (as established TA) peaceful treatment of me. | PACIFISM<br>Previously, I (as new representative member of humanity) have valiantly acted in triumphantly towards you: in anticipation of your (as established TA) peaceful treatment of me.<br>But now, you (as reluctant transcendental authority) will conformingly act in a *pacifistic* fashion towards me: opposing my (as new RH) triumphant treatment of you. |

Fig. 2-E

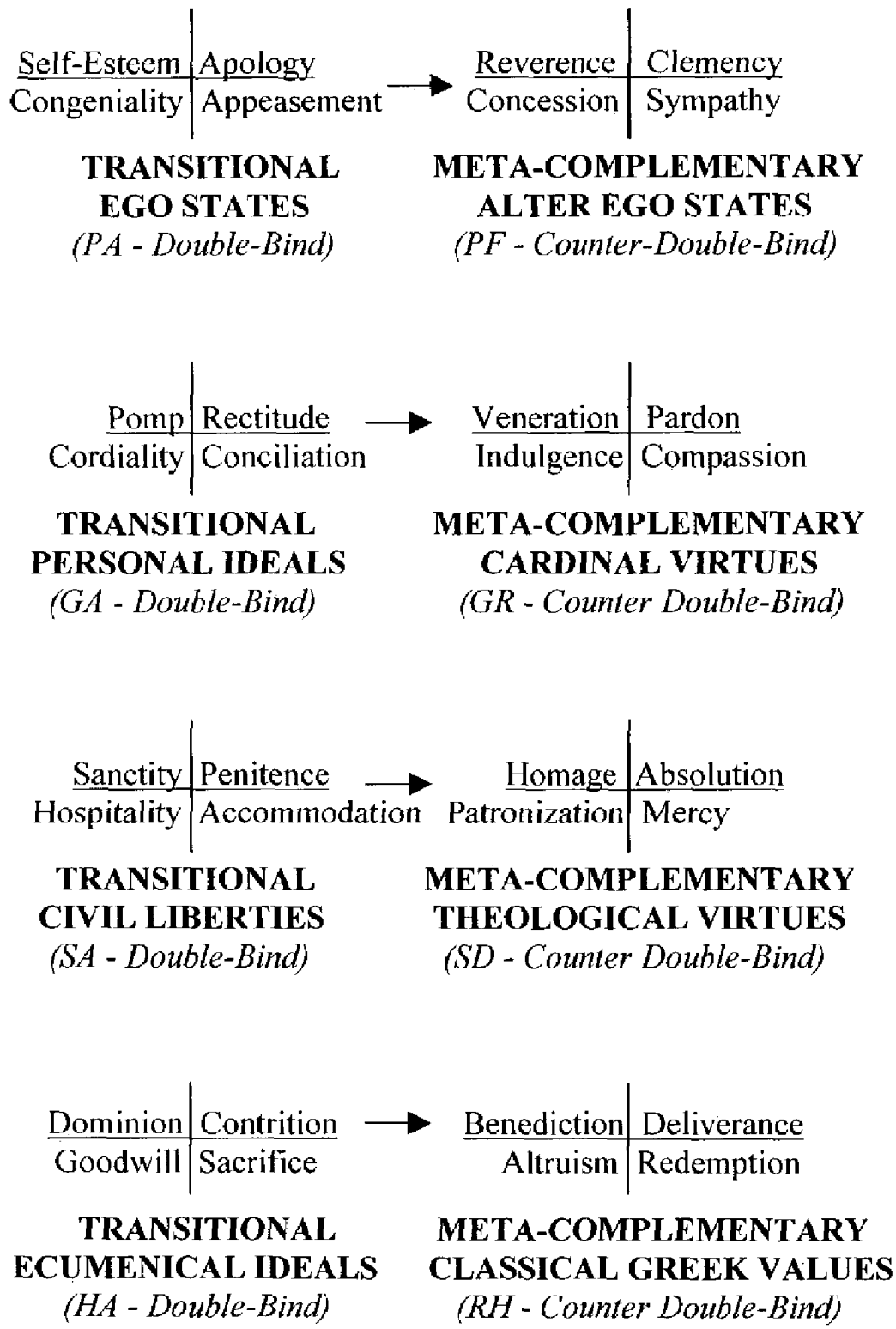
Fig. 3-A

| | |
|---|---|
| SELF-ESTEEM<br>Previously, you (as personal follower) have rewardingly acted worshipfully, in response to the nostalgic treatment of the personal authority.<br><br>But now, I (as new personal authority) will nostalgically act with *self-esteem* towards you: in anticipation of your (as established PF) worshipful treatment of me. | REVERENCE<br>Previously, I (as new personal authority) have nostalgically acted with self-esteem towards you: in anticipation of your (as established PF) worshipful treatment of me.<br>But now, you (as reluctant personal follower) will *reverently* <u>deny</u> acting worshipfully towards me: averting my (as new PA) nostalgic sense of self-esteem. |
| POMP<br>Previously, you (as group representative) have prudently acted in a worshipful fashion, in response to the gloriously-nostalgic treatment of the group authority.<br>But now, I (as new group authority) will *pompously* act with self-esteem towards you: in anticipation of your (as established GR) prudent-worship of me. | VENERATION<br>Previously, I (as new group authority) have pompously acted with self-esteem towards you: in anticipation of your (as established GR) prudent-worship of me.<br>But now, you (as reluctant group representative) will reverently act in a *venerable* fashion towards me: averting my (as new GA) pompous treatment of you. |
| SANCTITY<br>Previously, you (as spiritual disciple) have prudently acted in a faithful fashion, in response to the gloriously-provident treatment of the spiritual authority.<br>But now, I (as new spiritual authority) will pompously act in a *sanctified* fashion towards you: in anticipation of your (as established SD) prudent-faith in me. | HOMAGE<br>Previously, I (as new spiritual authority) have pompously acted in a sanctified fashion towards you: in anticipation of your (as established SD) prudent-faith in me.<br><br>But now, you (as reluctant spiritual disciple) will venerably express *homage* towards me: averting my (as new SA) sanctified treatment of you. |
| DOMINION<br>Previously, you (as representative member of humanity) have beauteously acted in a faithful fashion, in response to the provident sense of grace of the humanitarian authority.<br>But now, I (as new humanitarian authority) will sanctifiedly express a sense of *dominion* towards you: in anticipation of your (as established RH) beauteous-faith in me. | BENEDICTION<br>Previously, I (as new humanitarian authority) have sanctifiedly expressed a sense of dominion towards you: in anticipation of your (as established RH) beauteous-faith in me.<br>But now, you (as reluctant representative member of humanity) will homagefully express *benediction* towards me: averting my (as new HA) sanctified sense of dominion. |

Fig. 3-B

| APOLOGY | CLEMENCY |
|---|---|
| Previously, you (as personal follower) have blamefully acted in a lenient fashion, in response to the guilty treatment of the personal authority.<br>But now, I (as new personal authority) will guiltily act in an *apologetic* fashion towards you: in anticipation of your (as established PF) blameful treatment of me. | Previously, I (as new personal authority) have guiltily acted in an apologetic fashion towards you: in anticipation of your (as established PF) blameful treatment of me.<br>But now, you (as reluctant personal follower) will *clemently* deny acting blamefully towards me: opposing my (as new PA) apologetic treatment of you. |
| RECTITUDE | PARDON |
| Previously, you (as group representative) have blamefully acted in a just fashion, in response to the honorable sense of guilt of the group authority.<br><br>But now, I (as new group authority) will apologetically act in a *rectitudinous* fashion towards you: in anticipation of your (as established GR) just-blaming of me. | Previously, I (as new group authority) have apologetically acted in a rectitudinous fashion towards you: in anticipation of your (as established GR) just-blaming of me.<br><br>But now, you (as reluctant group representative) will clemently-*pardon* me: opposing my (as new GA) apologetic sense of rectitude. |
| PENITENCE | ABSOLUTION |
| Previously, you (as spiritual disciple) have blamefully-hoped for justice, in response to the libertarian sense of honor of the spiritual authority.<br><br>But now, I (as new spiritual authority) will *penitently* act in a rectitudinous fashion towards you: in anticipation of your (as established SD) blameful-hope for justice. | Previously, I (as new spiritual authority) have penitently acted in a rectitudinous fashion towards you: in anticipation of your (as established SD) blameful hope for justice.<br>But now, you (as reluctant spiritual disciple) will pardoningly express *absolution* towards me: opposing my (as new SA) penitent treatment of you. |
| CONTRITION | DELIVERANCE |
| Previously, you (as representative member of humanity) have justly hoped for the truth, in response to the libertarian sense of free will of the humanitarian authority.<br>But now, I (as new humanitarian authority) will penitently act in a *contrite* fashion towards you: in anticipation of your (as established RH) just-hope for the truth. | Previously, I (as new humanitarian authority) have penitently acted in a contrite fashion towards you: in anticipation of your (as established RH) just-hope for the truth.<br>But now, you (as reluctant representative member of humanity) will absolvingly act with *deliverance* towards me: opposing my (as new HA) penitent sense of contrition. |

Fig. 3-C

| CONGENIALITY | CONCESSION |
|---|---|
| Previously, I (as personal follower) have rewardingly acted in an approving fashion, in response to the desirous treatment of the personal authority.<br>But now, you (as new personal authority) will *congenially* act in a desirous fashion towards me: in anticipation of my (as established PF) approving treatment of you. | Previously, you (as new personal authority) have congenially acted in a desirous fashion towards me: in anticipation of my (as established PF) approving treatment of you.<br>But now, I (as reluctant personal follower) will *concessionally* deny acting approvingly towards you: averting your (as new PA) congenial treatment of me. |
| CORDIALITY | INDULGENCE |
| Previously, I (as group representative) have temperately acted in an approving fashion, in response to the dignified-desire of the group authority.<br>But now, you (as new group authority) will congenially act in a *cordial* fashion towards me: in anticipation of my (as established GR) temperate-approval of you. | Previously, you (as new group authority) have congenially acted in a cordial fashion towards me: in anticipation of my (as established GR) temperate-approval of you.<br>But now, I (as reluctant group representative) will concessionally act in an *indulgent* fashion towards you: averting your (as new GA) cordial treatment of me. |
| HOSPITALITY | PATRONIZATION |
| Previously, I (as spiritual disciple) have temperately acted in a charitable fashion, in response to the civilly-dignified treatment of the spiritual authority.<br>But now, you (as new spiritual authority) will cordially act in a *hospitable* fashion towards me: in anticipation of my (as established SD) charitable treatment of you. | Previously, you (as new spiritual authority) have cordially acted in a hospitable fashion towards me: in anticipation of my (as established SD) charitable treatment of you.<br>But now, I (as reluctant spiritual disciple) will indulgently act in a *patronizing* fashion towards you: averting your (as new SA) cordial sense of hospitality. |
| GOODWILL | ALTRUISM |
| Previously, I (as representative member of humanity) have charitably acted with goodness, in response to the civilly-magnanimous treatment of the humanitarian authority.<br>But now, you (as new humanitarian authority) will hospitably act with *goodwill* towards me: in anticipation of my (as established RH) charitable sense of goodness. | Previously, you (as new humanitarian authority) have hospitably acted with goodwill towards me: in anticipation of my (as established RH) charitable sense of goodness.<br>But now, I (as reluctant representative member of humanity) will patronizingly act in an *altruistic* fashion towards you: averting your (as new HA) hospitable sense of goodwill. |

Fig. 3-D

| APPEASEMENT | SYMPATHY |
|---|---|
| Previously, I (as personal follower) have leniently acted in a concerned fashion, in response to the worrisome treatment of the personal authority.<br>But now, you (as new personal authority) will worrisomely act in an *appeasement* fashion towards me: in anticipation of my (as established PF) lenient sense of concern. | Previously, you (as new personal authority) have worrisomely acted in an appeasement fashion towards me: in anticipation of my (as established PF) lenient sense of concern.<br>But now, I (as reluctant personal follower) will *sympathetically* deny acting with concern towards you: opposing your (as new PA) worrisome sense of appeasement. |
| CONCILIATION | COMPASSION |
| Previously, I (as group representative) have fortitudinously acted in a concerned fashion, in response to the worrisome sense of integrity of the group authority.<br>But now, you (as new group authority) will appeasingly act in a *conciliatory* fashion towards me: in anticipation of my (as established GR) fortitudinous sense of concern. | Previously, you (as new group authority) have appeasingly acted in a conciliatory fashion towards me: in anticipation of my (as established GR) fortitudinous sense of concern.<br>But now, I (as reluctant group representative) will sympathetically act in a *compassionate* fashion towards you: opposing your (as new GA) conciliatory treatment of me. |
| ACCOMMODATION | MERCY |
| Previously, I (as spiritual disciple) have fortitudinously acted in a decent fashion, in response to the austere sense of integrity of the spiritual authority.<br>But now, you (as new spiritual authority) will conciliatingly act in an *accommodating* fashion towards me: in anticipation of my (as established SD) decent treatment of you. | Previously, you (as new spiritual authority) have conciliatingly acted in an accommodating fashion towards me: in anticipation of my (as established SD) decent treatment of you.<br>But now, I (as reluctant spiritual disciple) will compassionately act in a *merciful* fashion towards you: opposing your (as new SA) accommodating treatment of me. |
| SACRIFICE | REDEMPTION |
| Previously, I (as representative member of humanity) have decently acted in a wise fashion, in response to the austere sense of equanimity of the humanitarian authority.<br>But now, you (as new humanitarian authority) will accommodatingly act in a *sacrificial* fashion towards me: in anticipation of my (as established RH) decent sense of wisdom. | Previously, you (as new humanitarian authority) have accommodatingly acted in a sacrificial fashion towards me: in anticipation of my (as estab. RH) decent sense of wisdom.<br>But now, I (as reluctant representative member of humanity) will mercifully act in a *redemptive* fashion towards you: opposing your (as new HA) sacrificial treatment of me. |

Fig. 3-E

| t-Treachery | t-Vindictiveness | d-Infamy | d-Dishonor |
|---|---|---|---|
| t-Spite | t-Malice →  | d-Foolishness | d-Capriciousness |

ANTISOCIAL PERSONALITY     TRICKERY
Transitional (PF)     Meta-Complementary (GA)
*(Personal Double-Bind)*     *(Group Counter Double-Bind)*

| t-Insurgency | t-Vengeance | d-Prodigality | d-Slavery |
|---|---|---|---|
| t-Gluttony | t-Cowardice → | d-Vulgarity | d-Cruelty |

CRIMINALITY     CHICANERY
Transitional (GR)     Meta-Complementary (SA)
*(Group Double-Bind)*     *(Spiritual Counter Double-Bind)*

| t-Betrayal | t-Despair → | d-Wrath | d-Tyranny |
|---|---|---|---|
| t-Avarice | t-Antagonism | d-Oppression | d-Persecution |

SACRILEGE     ARTIFICE
Transitional (SD)     Meta-Complementary (HA)
*(Spiritual Double-Bind)*     *(Humanitarian Counter Double-Bind)*

| t-Ugliness | t-Hypocrisy → | d-Anger | d-Prejudice |
|---|---|---|---|
| t-Evil | t-Cunning | d-Hatred | d-Belligerence |

TERRORISM     STRATAGEM
Transitional (RH)     Meta-Complementary (TA)
*(Humanit. Double-Bind)*     *(Transcendental Counter Double-Bind)*

Fig. 4-A

| | |
|---|---|
| CRIMINAL TREACHERY<br>Previously, I (as group authority) have infamously acted in a lazy fashion, in response to the treacherous treatment of the personal follower.<br>But now, you (as new personal follower) will *treacherously* act in a punitive fashion towards me: in anticipation of my (as established GA) infamously-lazy treatment of you. | DISQUALIFIED INFAMY<br>Previously, you (as new personal follower) have treacherously acted in a punitive fashion towards me: in anticipation of my (as established GA) infamously-lazy treatment of you.<br>But now, I (as reluctant group authority) will deny *infamously* acting in a lazy fashion towards you: scorning your (as new PF) treacherous treatment of me. |
| CRIMINAL INSURGENCY<br>Previously, I (as spiritual authority) have infamously acted in a prodigal fashion, in response to the insurgent-treachery of the group representative.<br>But now, you (as new group representative) will *insurgently* act in a treacherous fashion towards me: in anticipation of my (as established SA) infamous sense of prodigality. | DISQUALIFIED PRODIGALITY<br>Previously, you (as new group representative) have insurgently acted in a treacherous fashion towards me: in anticipation of my (as established SA) infamous sense of prodigality.<br>But now, I (as reluctant spiritual authority) will deny infamously acting in a *prodigal* fashion towards you: scorning your (as new GR) insurgently-treacherous treatment of me. |
| CRIMINAL BETRAYAL<br>Previously, I (as humanitarian authority) have prodigally acted in a wrathful fashion, in response to the Insurgent-betrayal of the spiritual disciple.<br><br>But now, you (as new spiritual disciple) will insurgently-*betray* me: in anticipation of my (as established HA) prodigal sense of wrathfulness. | DISQUALIFIED WRATH<br>Previously, you (as new spiritual disciple) have insurgently-betrayed me: in anticipation of my (as established HA) prodigal sense of wrathfulness.<br><br>But now, I (as reluctant humanitarian authority) will deny prodigally acting *wrathfully* towards you: scorning your (as new SD) insurgent-betrayal of me. |
| CRIMINAL UGLINESS<br>Previously, I (as transcendental authority) have wrathfully acted in an angry fashion, in response to the ugly-betrayal of the representative member of humanity.<br>But now, you (as new representative member of humanity) will betrayingly act in an *ugly* fashion towards me: in anticipation of my (as established TA) wrathful sense of anger. | DISQUALIFIED ANGER<br>Previously, you (as new representative member of humanity) have betrayingly acted in an ugly fashion towards me: in anticipation of my (as established TA) angry sense of wrath<br>But now, I (as reluctant transcendental authority) will deny wrathfully acting *angrily* towards you: scorning your (as new RH) ugly-betrayal of me. |

Fig. 4-B

| | |
|---|---|
| CRIMINAL VINDICTIVENESS<br>Previously, I (as group authority) have negligently acted in a dishonorable fashion, in response to the vindictive treatment of the personal follower.<br>But now, you (as new personal follower) will *vindictively* act in a punitive fashion towards me: in anticipation of my (as established GA) negligently-dishonorable treatment of you. | DISQUALIFIED DISHONOR<br>Previously, you (as new personal follower) have vindictively acted punitively towards me: in anticipation of my (as established GA) negligently-dishonorable treatment of you.<br>But now, I (as reluctant group authority) will deny negligently acting *dishonorably* towards you: scorning your (as new PF) vindictive treatment of me. |
| CRIMINAL VENGEANCE<br>Previously, I (as spiritual authority) have dishonorably acted in a slavish fashion, in response to the vengeful-vindictiveness of the group representative.<br>But now, you (as new group representative) will *vengefully* act in a vindictive fashion towards me: in anticipation of my (as established SA) dishonorable-enslavement of you. | DISQUALIFIED SLAVERY<br>Previously, you (as new group representative) have vengefully acted in a vindictive fashion towards me: in anticipation of my (as established SA) dishonorable-enslavement of you.<br>But now, I (as reluctant spiritual authority) will deny dishonorably-*enslaving* you: scorning your (as new GR) vengefully-vindictive treatment of me. |
| CRIMINAL DESPAIR<br>Previously, I (as humanitarian authority) have tyrannically acted in a slavish fashion, in response to the vengeful sense of despair of the spiritual disciple.<br>But now, you (as new spiritual disciple) will vengefully act in a *despairing* fashion towards me: in anticipation of my (as established HA) tyrannical-enslavement of you. | DISQUALIFIED TYRANNY<br>Previously, you (as new spiritual disciple) have vengefully acted depairingly towards me: in anticipation of my (as established HA) tyrannical-enslavement of you.<br><br>But now, I (as reluctant humanitarian authority) will deny *tyrannically*-enslaving you: scorning your (as new SD) vengeful sense of despair. |
| CRIMINAL HYPOCRISY<br>Previously, I (as transcendental authority) have tyrannically acted in a prejudicial fashion, in response to the hypocritical sense of despair of the representative member of humanity.<br>But now, you (as new representative member of humanity) will despairingly act *hypocritically* towards me: in anticipation of my (as established TA) prejudicial treatment of you. | DISQUALIFIED PREJUDICE<br>Previously, you (as new representative member of humanity) have despairingly acted hypocritically towards me: in anticipation of my (as est.TA) prejudicial treatment of you.<br>But now, I (as reluctant transcendental authority) will deny tyrannically acting *prejudicially* towards you: scorning your (as new RH) hypocritical sense of despair. |

Fig. 4-C

| CRIMINAL SPITE | DISQUALIFIED FOOLISHNESS |
|---|---|
| Previously, you (as group authority) have foolishly acted in an apathetic fashion, in response to the spiteful treatment of the personal follower.<br><br>But now, I (as new personal follower) will *spitefully* act in a punitive fashion towards you: in anticipation of your (as established GA) foolishly-apathetic treatment of me. | Previously, I (as new personal follower) have spitefully acted in a punitive fashion towards you: in anticipation of your (as established GA) foolishly-apathetic treatment of me.<br>But now, you (as reluctant group authority) will deny *foolishly* acting apathetically towards me: scorning my (as new PF) spiteful treatment of you. |
| CRIMINAL GLUTTONY | DISQUALIFIED VULGARITY |
| Previously, you (as spiritual authority) have foolishly acted in a vulgar fashion, in response to the gluttonously-spiteful treatment of the group representative.<br>But now, I (as new group representative) will *gluttonously* act spitefully towards you: in anticipation of your (as established SA) foolishly-vulgar treatment of me. | Previously, I (as new group representative) have gluttonously acted in a spiteful fashion towards you: in anticipation of your (as established SA) foolishly-vulgar treatment of me.<br>But now, you (as reluctant spiritual authority) will deny foolishly acting in a *vulgar* fashion towards me: scorning my (as new GR) gluttonously-spiteful treatment of you. |
| CRIMINAL AVARICE | DISQUALIFIED OPPRESSION |
| Previously, you (as humanitarian authority) have vulgarly acted in an oppressive fashion, in response to the avaricious treatment of the spiritual disciple.<br>But now, I (as new spiritual disciple) will gluttonously act in an *avaricious* fashion towards you: in anticipation of your (as established HA) vulgarly-oppressive treatment of me. | Previously, I (as new spiritual disciple) have gluttonously acted avariciously towards you: in anticipation of your (as established HA) vulgarly-oppressive treatment of me.<br>But now, you (as reluctant humanitarian authority) will deny vulgarly acting in an *oppressive* fashion towards me: scorning my (as new SD) avaricious treatment of you. |
| CRIMINAL EVIL | DISQUALIFIED HATRED |
| Previously, you (as transcendental authority) have oppressively acted in a hateful fashion, in response to the avaricious sense of evil of the representative member of humanity.<br>But now, I (as new representative member of humanity) will avariciously act in an *evil* fashion towards you: in anticipation of your (as established TA) hateful treatment of me | Previously, I (as new representative member of humanity) have avariciously acted evilly towards you: in anticipation of your (as established TA) hateful treatment of me.<br>But now, you (as reluctant transcendental authority) will oppressively deny acting in a *hateful* fashion towards me: scorning my (as new RH) evil treatment of you. |

Fig. 4-D

| CRIMINAL MALICE | DISQUALIFIED CAPRICIOUSNESS |
|---|---|
| Previously, you (as group authority) have capriciously acted in an indifferent fashion, in response to the malicious treatment of the personal follower.<br>But now, I (as new personal follower) will punitively act in a *malicious* fashion towards you: in anticipation of your (as established GA) capricious sense of indifference. | Previously, I (as new personal follower) have punitively acted in a malicious fashion towards you: in anticipation of your (as established GA) capricious sense of indifference.<br>But now, you (as reluctant group authority) will deny *capriciously* acting indifferently towards me: scorning my (as new PF) malicious treatment of you. |
| CRIMINAL COWARDICE | DISQUALIFIED CRUELTY |
| Previously, you (as spiritual authority) have capriciously acted in a cruel fashion, in response to the cowardly-malicious treatment of the group representative.<br>But now, I (as new group representative) will *cowardly* act in a malicious fashion towards you: in anticipation of your (as established SA) cruel treatment of me. | Previously, I (as new group representative) have cowardly acted in a malicious fashion towards you: in anticipation of your (as established SA) cruel treatment of me.<br>But now, you (as reluctant spiritual authority) will deny capriciously acting in a *cruel* fashion towards me: scorning my (as new GR) cowardly-malicious treatment of you. |
| CRIMINAL ANTAGONISM | DISQUALIFIED PERSECUTION |
| Previously, you (as humanitarian authority) have cruelly acted with persecution, in response to the cowardly-antagonistic treatment of the spiritual disciple.<br>But now, I (as new spiritual disciple) will cowardly act in an *antagonistic* fashion towards you: in anticipation of your (as established HA) cruel-persecution of me. | Previously, I (as new spiritual disciple) have cowardly acted in an antagonistic fashion towards you: in anticipation of your (as established HA) cruel-persecution of me.<br>But now, you (as reluctant humanitarian authority) will deny cruelly-*persecuting* me: scorning my (as new SD) cowardly-antagonistic treatment of you. |
| CRIMINAL CUNNING | DISQUALIFIED BELLIGERENCE |
| Previously, you (as transcendental authority) have belligerently acted with persecution, in response to the antagonistic sense of cunning of the representative member of humanity.<br>But now, I (as new representative member of humanity) will antagonistically act *cunningly* towards you: in anticipation of your (as established TA) belligerent-persecution of me. | Previously, I (as new representative member of humanity) have antagonistically acted cunningly towards you: in anticipation of your (as established TA) belligerent-persecution of me.<br>But now, you (as reluctant transcendental authority) will deny *belligerently*-persecuting me: scorning my (as new RH) antagonistic sense of cunning. |

Fig. 4-E

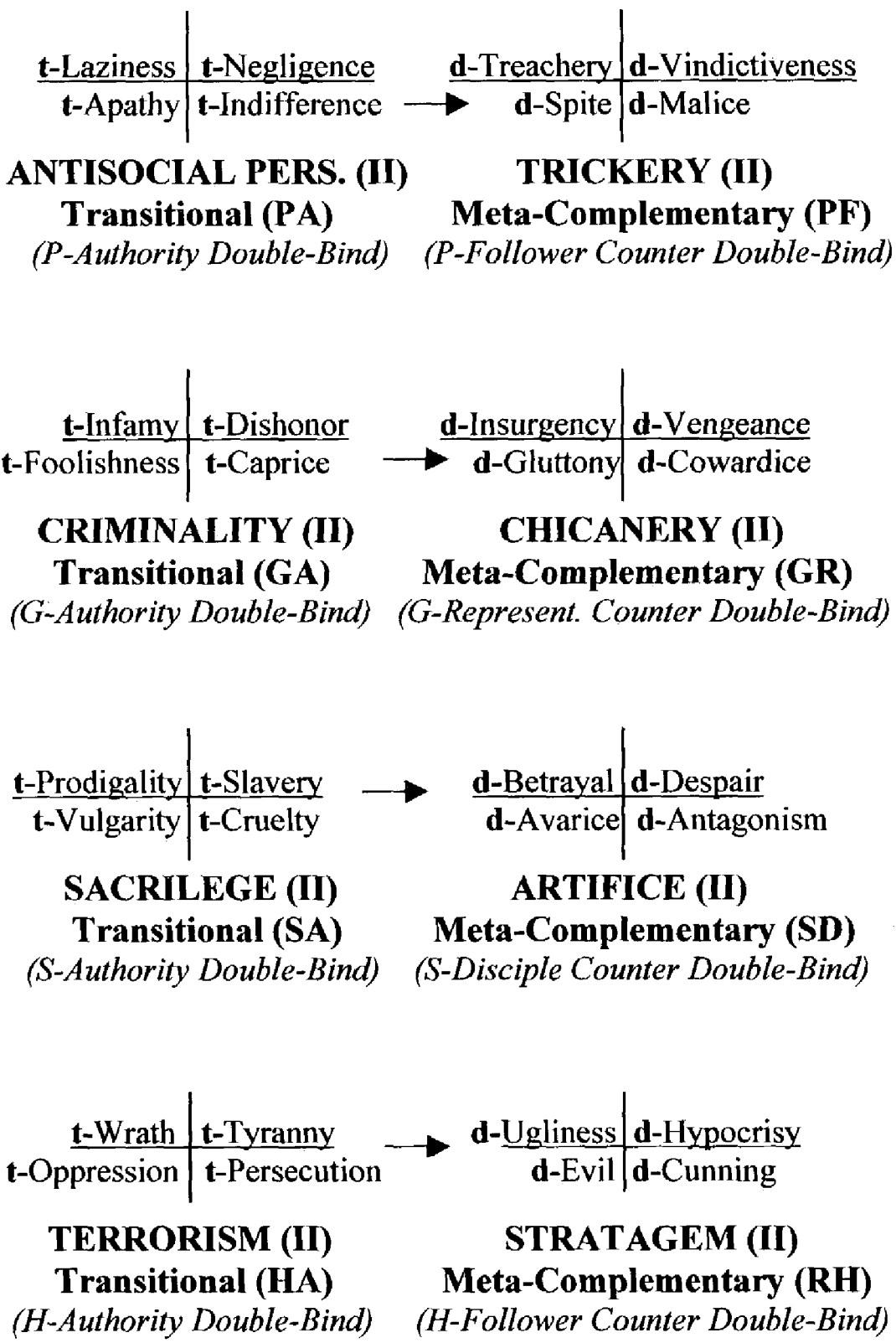
Fig. 5-A

| CRIMINAL LAZINESS | DISQUALIFIED TREACHERY |
|---|---|
| Previously, you (as personal follower) have treacherously refused to act rewardingly, in response to the lazy treatment of the personal authority.<br>But now, I (as new personal authority) will *lazily* fail to act solicitously towards you: in anticipation of your (as established PF) treacherous treatment me. | Previously, I (as new personal authority) have lazily failed to act solicitously towards you: in anticipation of your (as established PF) treacherous treatment of me.<br>But now, you (as reluctant personal follower) will deny *treacherously* refusing to act rewardingly towards me: scorning my (as new PA) lazy treatment of you. |
| CRIMINAL INFAMY | DISQUALIFIED INSURGENCY |
| Previously, you (as group representative) have insurgently acted in a treacherous fashion, in response to the infamously-lazy treatment of the group authority.<br>But now, I (as new group authority) will *infamously* act in a lazy fashion towards you: in anticipation of your (as established GR) insurgently-treacherous treatment of me. | Previously, I (as new group authority) have infamously acted in a lazy fashion towards you: in anticipation of your (as established GR) insurgently-treacherous treatment of me.<br>But now, you (as reluctant group representative) deny *insurgently* acting treacherously towards me: scorning my (as new GA) infamously-lazy treatment of you. |
| CRIMINAL PRODIGALITY | DISQUALIFIED BETRAYAL |
| Previously, you (as spiritual disciple) have insurgently acted in a betraying fashion, in response to the infamously-prodigal treatment of the spiritual authority.<br>But now, I (as new spiritual authority) will infamously act in a *prodigal* fashion towards you: in anticipation of your (as established SD) insurgent-betrayal of me. | Previously, I (as new spiritual authority) have infamously acted in a prodigal fashion towards you: in anticipation of your (as established SD) insurgent-betrayal of me.<br>But now, you (as reluctant spiritual disciple) will deny insurgently-*betraying* me: scorning my (as new SA) infamously-prodigal treatment of you. |
| CRIMINAL WRATHFULNESS | DISQUALIFIED UGLINESS |
| Previously, you (as representative member of humanity) have betrayingly acted in a ugly fashion, in response to the prodigal sense of wrath of the humanitarian authority.<br>But now, I (as new humanitarian authority) will prodigally act in a *wrathful* fashion towards you: in anticipation of your (as established RH) ugly-betrayal of me. | Previously, I (as new humanitarian authority) have prodigally acted in a wrathful fashion towards you: in anticipation of your (as established RH) ugly-betrayal of me.<br>But now, you (as reluctant representative member of humanity) will deny betrayingly acting in an *ugly* fashion towards me: scorning my (as new HA) wrathful treatment of you. |

Fig. 5-B

| CRIMINAL NEGLIGENCE | DISQUALIFIED VINDICTIVENESS |
|---|---|
| Previously, you (as personal follower) have vindictively refused to act leniently, in response to the negligent treatment of the personal authority.<br>But now, I (as new personal authority) will *negligently* fail to act submissively towards you: in anticipation of your (as established PF) vindictive treatment of me. | Previously, I (as new personal authority) have negligently failed to act submissively towards you: in anticipation of your (as established PF) vindictive treatment of me.<br>But now, you (as reluctant personal follower) will deny *vindictively* refusing to act leniently towards me: scorning my (as new PA) negligent treatment of you. |
| CRIMINAL DISHONOR | DISQUALIFIED VENGEANCE |
| Previously, you (as group representative) have vengefully acted in a vindictive fashion, in response to the negligently-dishonorable treatment of the group authority.<br>But now, I (as new group authority) will negligently act in a *dishonorable* fashion towards you: in anticipation of your (as established GR) vengefully-vindictive treatment of me. | Previously, I (as new group authority) have negligently acted in a dishonorable fashion towards you: in anticipation of your (as established GR) vengefully-vindictive treatment of me.<br>But now, you (as reluctant group representative) will deny *vengefully* acting vindictively towards me: scorning my (as new GA) negligently-honorable treatment of you. |
| CRIMINAL SLAVERY | DISQUALIFIED DESPAIR |
| Previously, you (as spiritual disciple) have vengefully acted in a despairing fashion, in response to the dishonorable-enslavement of the spiritual authority.<br><br>But now, I (as new spiritual authority) will dishonorably-*enslave* you: in anticipation of your (as established SD) vengeful sense of despair. | Previously, I (as new spiritual authority) have dishonorably-enslaved you: in anticipation of your (as established SD) vengeful sense of despair.<br><br>But now, you (as reluctant spiritual disciple) will deny vengefully acting in a *despairing* fashion towards me: scorning my (as new SA) dishonorable-enslavement of you. |
| CRIMINAL TYRANNY | DISQUALIFIED HYPOCRISY |
| Previously, you (as representative member of humanity) have despairingly acted in a hypocritical fashion, in response to tyrannical-enslavement of the humanitarian authority.<br>But now, I (as new humanitarian authority) will *tyrannically*-enslave you: in anticipation of your (as established RH) hypocritical treatment of me. | Previously, I (as new humanitarian authority) have tyrannically-enslaved you: in anticipation of your (as established RH) hypocritical treatment of me.<br>But now, you (as reluctant represent. member of humanity) will deny despairingly acting *hypocritically* towards me: scorning my (as new HA) tyrannical-enslavement of you. |

Fig. 5-C

| CRIMINAL APATHY | DISQUALIFIED SPITE |
|---|---|
| Previously, I (as personal follower) have spitefully refused to act rewardingly, in response to the apathetic treatment of the personal authority.<br>But now, you (as new personal authority) will *apathetically* fail to act solicitously towards me: in anticipation of my (as established PF) spiteful treatment of you. | Previously, you (as new personal authority) have apathetically failed to act solicitously towards me: in anticipation of my (as established PF) spiteful treatment of you.<br>But now, I (as reluctant personal follower) will deny *spitefully* refusing to act rewardingly towards you: scorning your (as new PA) apathetic treatment of me. |
| CRIMINAL FOOLISHNESS | DISQUALIFIED GLUTTONY |
| Previously, I (as group representative) have gluttonously acted in a spiteful fashion, in response to the foolishly-apathetic treatment of the group authority.<br>But now, you (as new group authority) will *foolishly* act in an apathetic fashion towards me: in anticipation of my (as established GR) gluttonously-spiteful treatment of you. | Previously, you (as new group authority) have foolishly acted apathetically towards me: in anticipation of my (as established GR) gluttonously-spiteful treatment of you.<br>But now, I (as reluctant group representative) will deny *gluttonously* acting spitefully towards you: scorning your (as new GA) foolishly-apathetic treatment of me. |
| CRIMINAL VULGARITY | DISQUALIFIED AVARICE |
| Previously, I (as spiritual disciple) have gluttonously acted in an avaricious fashion, in response to the foolishly-vulgar treatment of the spiritual authority.<br>But now, you (as new spiritual authority) will foolishly act in a *vulgar* fashion towards me: in anticipation of my (as established SD) avaricious treatment of you. | Previously, you (as new spiritual authority) have foolishly acted in a vulgar fashion towards me: in anticipation of my (as established SD) avaricious treatment of you.<br>But now, I (as reluctant spiritual disciple) will deny gluttonously acting *avariciously* towards you: scorning your (as new SA) foolishly-vulgar treatment of me. |
| CRIMINAL OPPRESSION | DISQUALIFIED EVIL |
| Previously, I (as representative member of humanity) have avariciously acted with evil, in response to the vulgarly-oppressive treatment of the humanitarian authority.<br>But now, you (as new humanitarian authority) will vulgarly act *oppressively* towards me: in anticipation of my (as established RH) avaricious sense of evil. | Previously, you (as new humanitarian authority) have vulgarly acted oppressively towards me: in anticipation of my (as established RH) avaricious sense of evil.<br>But now, I (as reluctant representative member of humanity) will deny avariciously acting *evilly* towards you: scorning your (as new HA) vulgarly-oppressive treatment of me. |

Fig. 5-D

| CRIMINAL INDIFFERENCE | DISQUALIFIED MALICE |
|---|---|
| Previously, I (as personal follower) have maliciously refused to act leniently, in response to the indifferent treatment of the personal authority. But now, you (as new personal authority) will *indifferently* fail to act submissively towards me: in anticipation of my (as established PF) malicious treatment of you. | Previously, you (as new personal authority) have indifferently failed to act submissively towards me: in anticipation of my (as established PF) malicious treatment of you. But now, I (as reluctant personal follower) will deny *maliciously* refusing to act leniently towards you: scorning your (as new PA) indifferent treatment of me. |
| CRIMINAL CAPRICIOUSNESS | DISQUALIFIED COWARDICE |
| Previously, I (as group representative) have cowardly acted in a malicious fashion, in response to the capricious sense of indifference of the group authority. But now, you (as new group authority) will *capriciously* act in an indifferent fashion towards me: in anticipation of my (as established GR) cowardly-malicious treatment of you. | Previously, you (as new group authority) have capriciously acted indifferently towards me: in anticipation of my (as established GR) cowardly-malicious treatment of you. But now, I (as reluctant group representative) will deny *cowardly* acting maliciously towards you: scorning your (as new GA) capricious sense of indifference. |
| CRIMINAL CRUELTY | DISQUALIFIED ANTAGONISM |
| Previously, I (as spiritual disciple) have cowardly acted in an antagonistic fashion, in response to the capricious sense of cruelty of the spiritual authority. But now, you (as new spiritual authority) will capriciously act *cruelly* towards me: in anticipation of my (as established SD) cowardly-antagonistic treatment of you. | Previously, you (as new spiritual authority) have capriciously acted cruelly towards me: in anticipation of my (as established SD) cowardly-antagonistic treatment of you. But now, I (as reluctant spiritual disciple) will deny cowardly acting *antagonistically* towards you: scorning your (as new SA) capricious sense of cruelty. |
| CRIMINAL PERSECUTION | DISQUALIFIED CUNNING |
| Previously, I (as representative member of humanity) have antagonistically acted cunningly, in response to the cruel-persecution of the humanitarian authority. But now, you (as new humanitarian authority) will cruelly-*persecute* me: in anticipation of my (as established RH) antagonistic sense of cunning. | Previously, you (as new humanitarian authority) have cruelly-persecuted me: in anticipation of my (as established RH) antagonistic sense of cunning. But now, I (as reluctant representative member of humanity) will deny antagonistically acting *cunningly* towards you: scorning your (as new HA) cruel-persecution of me. |

Fig. 5-E

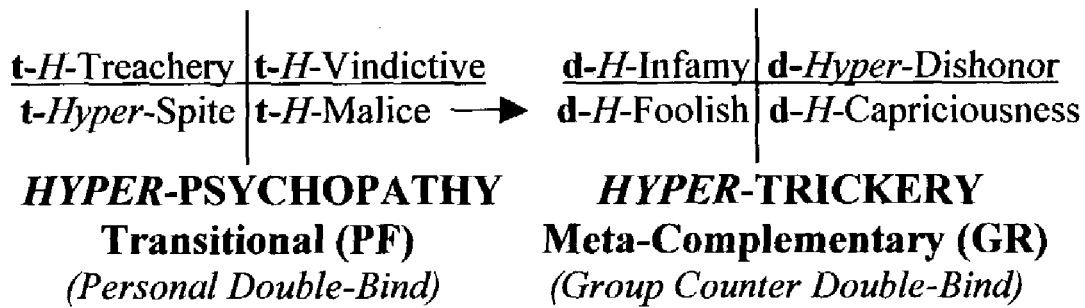

HYPER-PSYCHOPATHY
Transitional (PF)
*(Personal Double-Bind)*

HYPER-TRICKERY
Meta-Complementary (GR)
*(Group Counter Double-Bind)*

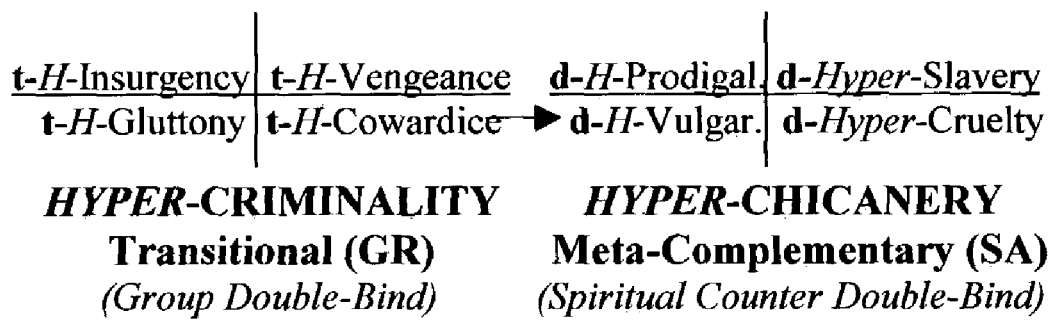

HYPER-CRIMINALITY
Transitional (GR)
*(Group Double-Bind)*

HYPER-CHICANERY
Meta-Complementary (SA)
*(Spiritual Counter Double-Bind)*

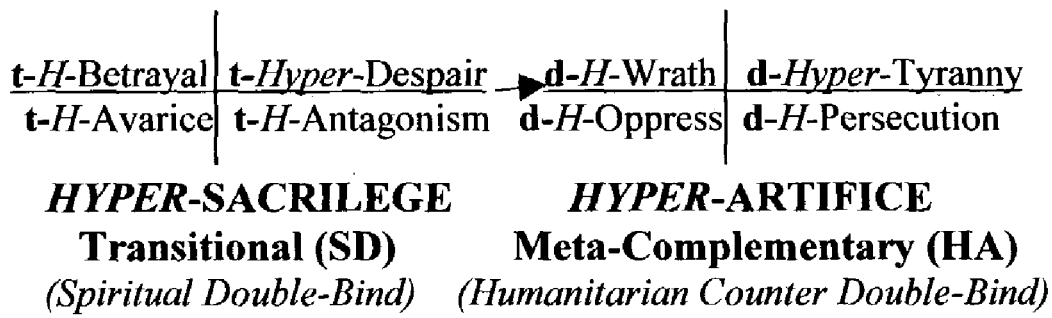

HYPER-SACRILEGE
Transitional (SD)
*(Spiritual Double-Bind)*

HYPER-ARTIFICE
Meta-Complementary (HA)
*(Humanitarian Counter Double-Bind)*

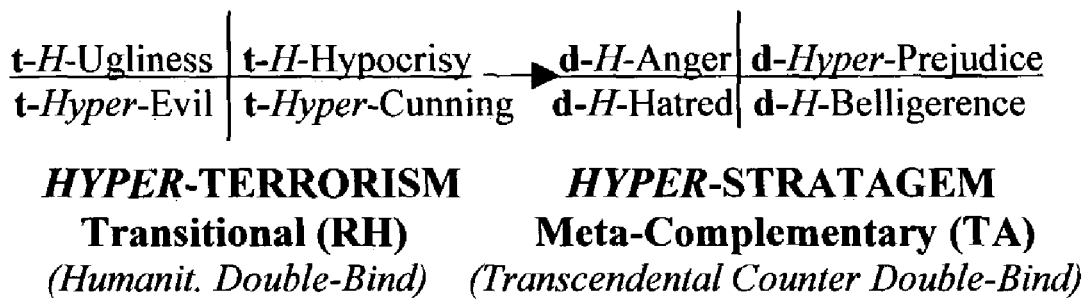

HYPER-TERRORISM
Transitional (RH)
*(Humanit. Double-Bind)*

HYPER-STRATAGEM
Meta-Complementary (TA)
*(Transcendental Counter Double-Bind)*

Fig. 6-A

| CRIMINAL *HYPER*-TREACHERY | DISQUALIFIED *HYPER*-INFAMY |
|---|---|
| Previously, I (as group authority) have extremely acted in an infamous fashion, in response to the excessively treacherous treatment of the personal follower.<br>But now, you (as new personal follower) will *treacherously* act in a hyperviolent fashion towards me: in anticipation of my (as established GA) extreme sense of infamy. | Previously, you (as new personal follower) have treacherously acted in a hyperviolent fashion towards me: in anticipation of my (as established GA) extreme sense of infamy.<br>But now, I (as reluctant group authority) will deny *infamously* acting in a hyperviolent fashion towards you: scorning your (as new PF) excessive sense of treachery. |
| CRIMINAL *HYPER*-INSURGENCY | DISQUALIFIED *H*-PRODIGALITY |
| Previously, I (as spiritual authority) have extremely acted in a prodigal fashion, in response to the excessively insurgent treatment of the group representative.<br>But now, you (as new group representative) will *insurgently* act in a hyperviolent fashion towards me: in anticipation of my (as established SA) extreme sense of prodigality. | Previously, you (as new group representative) have insurgently acted in a hyperviolent fashion towards me: in anticipation of my (as established SA) extreme sense of prodigality.<br>But now, I (as reluctant spiritual authority) will deny *prodigally* acting in a hyperviolent fashion towards you: scorning your (as new GR) excessive sense of insurgency. |
| CRIMINAL *HYPER*-BETRAYAL | DISQUALIFIED *HYPER*-WRATH |
| Previously, I (as humanitarian authority) have extremely acted in a wrathful fashion, in response to the excessive betrayal of the spiritual disciple.<br>But now, you (as new spiritual disciple) will *betray* me in a hyperviolent fashion: in anticipation of my (as established HA) extreme sense of wrathfulness. | Previously, you (as new spiritual disciple) have betrayingly acted in a hyperviolent fashion towards me: in anticipation of my (as established HA) extreme sense of wrathfulness.<br>But now, I (as reluctant humanitarian authority) will deny *wrathfully* acting hyperviolently towards you: scorning your (as new SD) excessive betrayal of me. |
| CRIMINAL *HYPER*-UGLINESS | DISQUALIFIED *HYPER*-ANGER |
| Previously, I (as transcendental authority) have extremely acted in an angry fashion, in response to the excessively ugly treatment of the representative member of humanity.<br>But now, you (as new representative member of humanity) will hyperviolently act in an *ugly* fashion towards me: in anticipation of my (as established TA) extreme sense of anger. | Previously, you (as new representative member of humanity) have hyperviolently acted in an ugly fashion: in anticipation of my (as established TA) extreme sense of anger.<br>But now, I (as reluctant transcendental authority) will deny *angrily* acting hyperviolently towards you: scorning your (as new RH) excessive sense of ugliness. |

Fig. 6-B

| CRIMINAL *H*-VINDICTIVENESS | DISQUALIFIED *HYPER*-DISHONOR |
|---|---|
| Previously, I (as group authority) have extremely acted in a dishonorable fashion, in response to the excessively vindictive treatment of the personal follower.<br>But now, you (as new personal follower) will *vindictively* act hyperviolently towards me: in anticipation of my (as established GA) extremely dishonorable treatment of you. | Previously, you (as new personal follower) have vindictively acted hyperviolently towards me: in anticipation of my (as established GA) extreme sense of dishonor.<br>But now, I (as reluctant group authority) will deny *dishonorably* acting hyperviolently towards you: scorning your (as new PF) excessively vindictive treatment of me. |
| CRIMINAL *HYPER*-VENGEANCE | DISQUALIFIED *HYPER*-SLAVERY |
| Previously, I (as spiritual authority) have extremely acted in a slavish fashion, in response to the excessively vengeful treatment of the group representative.<br>But now, you (as new group representative) will *vengefully* act hyperviolently towards me: in anticipation of my (as established SA) extreme enslavement of you. | Previously, you (as new group representative) have vengefully acted hyperviolently towards me: in anticipation of my (as established SA) extreme enslavement of you.<br>But now, I (as reluctant spiritual authority) will deny hyperviolently *enslaving* you: scorning your (as new GR) excessively vengeful treatment of me. |
| CRIMINAL *HYPER*-DESPAIR | DISQUALIFIED *HYPER*-TYRANNY |
| Previously, I (as humanitarian authority) have extremely acted in a tyrannical fashion, in response to the excessive sense of despair of the spiritual disciple.<br>But now, you (as new spiritual disciple) will *despairingly* act hyperviolently towards me: in anticipation of my (as established HA) extreme sense of tyranny. | Previously, you (as new spiritual disciple) have depairingly acted hyperviolently towards me: in anticipation of my (as established HA) extreme sense of tyranny<br>But now, I (as reluctant humanitarian authority) will deny *tyrannically* acting hyperviolently towards you: scorning your (as new SD) excessively despairing treatment of me. |
| CRIMINAL *HYPER*-HYPOCRISY | DISQUALIFIED *H*-PREJUDICE |
| Previously, I (as transcendental authority) have extremely acted in a prejudicial fashion, in response to the excessive sense of hypocrisy of the representative member of humanity.<br>But now, you (as new representative member of humanity) will *hypocritically* act hyperviolently towards me: in anticipation of my (as established TA) extreme sense of prejudice | Previously, you (as new representative member of humanity) have hypocritically acted hyperviolently towards me: in anticipation of my (as est.TA) extreme sense of prejudice.<br>But now, I (as reluctant transcendental authority) will deny *prejudicially* acting hyperviolently towards you: scorning your (as new RH) excessive sense of hypocrisy. |

Fig. 6-C

| CRIMINAL *HYPER*-SPITE | DISQUALIFIED *H*-FOOLISHNESS |
|---|---|
| Previously, you (as group authority) have excessively acted in a foolish fashion, in response to the extremely spiteful treatment of the personal follower.<br>But now, I (as new personal follower) will *spitefully* act in a hyperviolent fashion towards you: in anticipation of your (as established GA) excessively foolish treatment of me. | Previously, I (as new personal follower) have spitefully acted hyperviolently towards you: in anticipation of your (as established GA) excessively foolish treatment of me.<br>But now, you (as reluctant group authority) will deny *foolishly* acting hyperviolently towards me: scorning my (as new PF) extremely spiteful treatment of you. |
| CRIMINAL *HYPER*-GLUTTONY | DISQUALIFIED *H*-VULGARITY |
| Previously, you (as spiritual authority) have excessively acted in a vulgar fashion, in response to the extremely gluttonous treatment of the group representative.<br>But now, I (as new group representative) will *gluttonously* act hyperviolently towards you: in anticipation of your (as established SA) excessively vulgar treatment of me. | Previously, I (as new group representative) have gluttonously acted hyperviolently towards you: in anticipation of your (as established SA) excessively vulgar treatment of me.<br>But now, you (as reluctant spiritual authority) will deny *vulgarly* acting hyperviolently towards me: scorning my (as new GR) extreme sense of gluttony |
| CRIMINAL *HYPER*-AVARICE | DISQUALIFIED *H*-OPPRESSION |
| Previously, you (as humanitarian authority) have excessively acted in an oppressive fashion, in response to the extremely avaricious treatment of the spiritual disciple.<br>But now, I (as new spiritual disciple) will *avariciously* act in a hyperviolent fashion towards you: in anticipation of your (as established HA) excessively oppressive treatment of me. | Previously, I (as new spiritual disciple) have avariciously acted hyperviolently towards you: in anticipation of your (as established HA) excessively oppressive treatment of me.<br>But now, you (as reluctant humanitarian authority) will deny *oppressively* acting hyperviolently towards me: scorning my (as new SD) extreme sense of avarice. |
| CRIMINAL *HYPER*-EVIL | DISQUALIFIED *HYPER*-HATRED |
| Previously, you (as transcendental authority) have excessively acted in a hateful fashion, in response to the extreme sense of evil of the representative member of humanity.<br>But now, I (as new representative member of humanity) will *evilly* act hyperviolently towards you: in anticipation of your (as established TA) excessively hateful treatment of me. | Previously, I (as new representative member of humanity) have evilly acted hyperviolently towards you: in anticipation of your (as established TA) excessive sense of hatred.<br>But now, you (as reluctant transcendental authority) will deny *hatefully* acting hyperviolently towards me: scorning my (as new RH) extreme sense of evil. |

Fig. 6-D

| CRIMINAL *HYPER*-MALICE | DISQUALIFIED *HYPER*-CAPRICE |
|---|---|
| Previously, you (as group authority) have excessively acted capriciously, in response to the extremely malicious treatment of the personal follower.<br>But now, I (as new personal follower) will *maliciously* act hyperviolently towards you: in anticipation of your (as established GA) excessive sense of capriciousness. | Previously, I (as new personal follower) have maliciously acted hyperviolently towards you: in anticipation of your (as established GA) excessive sense of capriciousness.<br>But now, you (as reluctant group authority) will deny *capriciously* acting hyperviolently towards me: scorning my (as new PF) extremely malicious treatment of you. |
| **CRIMINAL *HYPER*-COWARDICE** | **DISQUALIFIED *HYPER*-CRUELTY** |
| Previously, you (as spiritual authority) have excessively acted in a cruel fashion, in response to the extremely cowardly treatment of the group representative.<br>But now, I (as new group representative) will *cowardly* act in a hyperviolent fashion towards you: in anticipation of your (as established SA) excessive sense of cruelty. | Previously, I (as new group representative) have cowardly acted in a hyperviolent fashion towards you: in anticipation of your (as established SA) excessive sense of cruelty.<br>But now, you (as reluctant spiritual authority) will deny *cruelly* acting hyperviolently towards me: scorning my (as new GR) extreme sense of cowardice. |
| **CRIMINAL *HYPER*-ANTAGONISM** | **DISQUALIFIED *H*-PERSECUTION** |
| Previously, you (as humanitarian authority) have excessively acted with persecution, in response to the extremely antagonistic treatment of the spiritual disciple.<br>But now, I (as new spiritual disciple) will *antagonistically* act in a hyperviolent fashion towards you: in anticipation of your (as established HA) excessive persecution of me. | Previously, I (as new spiritual disciple) have antagonistically acted hyperviolently towards you: in anticipation of your (as established HA) excessive persecution of me.<br>But now, you (as reluctant humanitarian authority) will deny hyperviolently *persecuting* me: scorning my (as new SD) extremely antagonistic treatment of you. |
| **CRIMINAL *HYPER*-CUNNING** | **DISQUALIFIED *H*-BELLIGERENCE** |
| Previously, you (as transcendental authority) have excessively acted belligerently, in response to the extreme sense of cunning of the representative member of humanity.<br>But now, I (as new representative member of humanity) will *cunningly* act hyperviolently towards you: in anticipation of your (as established TA) excessive sense of belligerence. | Previously, I (as new representative member of humanity) have cunningly acted hyperviolently towards you: in anticipation of your (as established TA) excessive sense of belligerence.<br>But now, you (as reluctant transcendental authority) will deny *belligerently* acting hyperviolently towards me: scorning my (as new RH) extreme sense of cunning. |

Fig. 6-E

| t-*H*-Laziness | t-*H*-Negligence | d-*H*-Treachery | d-*H*-Vindictiveness |
|---|---|---|---|
| t-*Hyper*-Apathy | t-*H*-Indiffer. ⟶ | d-*H*-Spite | d-*Hyper*-Malice |

HYPER-PSYCHOPATHY II    HYPER-TRICKERY II
Transitional (PA)    Meta-Complementary (PF)
*(P-Authority Double-Bind)*    *(P-Follower Counter Double-Bind)*

| t-*Hyper*-Infamy | t-*H*-Dishonor | d-*H*-Insurgency | d-*Hyper*-Vengeance |
|---|---|---|---|
| t-*Hyper*-Foolish | t-*H*-Caprice ⟶ | d-*H*-Gluttony | d-*Hyper*-Cowardice |

HYPER-CRIMINALITY II    HYPER-CHICANERY II
Transitional (GA)    Meta-Complementary (GR)
*(G-Authority Double-Bind)*    *(G-Represent. Counter Double-Bind)*

| t-*H*-Prodigality | t-*H*-Slavery ⟶ | d-*H*-Betrayal | d-*Hyper*-Despair |
|---|---|---|---|
| t-*H*-Vulgarity | t-*Hyper*-Cruelty | d-*H*-Avarice | d-*H*-Antagonism |

HYPER-SACRILEGE II    HYPER-ARTIFICE II
Transitional (SA)    Meta-Complementary (SD)
*(S-Authority Double-Bind)*    *(S-Disciple Counter Double-Bind)*

| t-*Hyper*-Wrath | t-*H*-Tyranny | d-*H*-Ugliness | d-*Hyper*-Hypocrisy |
|---|---|---|---|
| t-*H*-Oppression | t-*H*-Persecution ⟶ | d-*Hyper*-Evil | d-*Hyper*-Cunning |

HYPER-TERRORISM II    HYPER-STRATAGEM II
Transitional (HA)    Meta-Complementary (RH)
*(H-Authority Double-Bind)*    *(H-Follower Counter Double-Bind)*

Fig. 7-A

| CRIMINAL HYPER-LAZINESS | DISQUALIFIED H-TREACHERY |
|---|---|
| Previously, you (as personal follower) have excessively acted in a treacherous fashion, in response to the extremely lazy treatment of the personal authority.<br>But now, I (as new personal authority) will *lazily* act hyperviolently towards you: in anticipation of your (as established PF) excessively treacherous treatment me. | Previously, I (as new personal authority) have lazily acted hyperviolently towards you: in anticipation of your (as established PF) excessively treacherous treatment of me.<br>But now, you (as reluctant personal follower) will deny *treacherously* acting hyperviolently towards me: scorning my (as new PA) extremely lazy treatment of you. |
| CRIMINAL HYPER-INFAMY | DISQUALIFIED H-INSURGENCY |
| Previously, you (as group representative) have excessively acted in an insurgent fashion, in response to the extremely infamous treatment of the group authority.<br>But now, I (as new group authority) will *infamously* act in a hyperviolent fashion towards you: in anticipation of your (as established GR) excessively insurgent treatment of me. | Previously, I (as new group authority) have infamously acted hyperviolently towards you: in anticipation of your (as established GR) excessively insurgent treatment of me.<br>But now, you (as reluctant group representative) deny *insurgently* acting hyperviolently towards me: scorning my (as new GA) extremely infamous treatment of you. |
| CRIMINAL HYPER-PRODIGALITY | DISQUALIFIED HYPER-BETRAYAL |
| Previously, you (as spiritual disciple) have excessively acted in a betraying fashion, in response to the extremely prodigal treatment of the spiritual authority.<br>But now, I (as new spiritual authority) will *prodigally* act hyperviolently towards you: in anticipation of your (as established SD) excessive betrayal of me. | Previously, I (as new spiritual authority) have prodigally acted hyperviolently towards you: in anticipation of your (as established SD) excessive betrayal of me.<br>But now, you (as reluctant spiritual disciple) will deny *betrayingly* acting hyperviolently towards me: scorning my (as new SA) extremely prodigal treatment of you. |
| CRIMINAL H-WRATHFULNESS | DISQUALIFIED HYPER-UGLINESS |
| Previously, you (as representative member of humanity) have excessively acted in a ugly fashion, in response to the extreme sense of wrath of the humanitarian authority.<br>But now, I (as new humanitarian authority) will *wrathfully* act in hyperviolent fashion towards you: in anticipation of your (as established RH) excessively ugly treatment of me. | Previously, I (as new humanitarian authority) have wrathfully acted in a hyperviolent fashion towards you: in anticipation of your (as establ. RH) excessively ugly treatment of me.<br>But now, you (as reluctant representative member of humanity) will deny hyperviolently acting in an *ugly* fashion towards me: scorning my (as new HA) extreme sense of wrath. |

Fig. 7-B

| CRIMINAL NEGLIGENCE | DISQUALIFIED VINDICTIVENESS |
|---|---|
| Previously, you (as personal follower) have excessively acted in a vindictive fashion, in response to the extremely negligent treatment of the personal authority.<br>But now, I (as new personal authority) will *negligently* act hyperviolently towards you: in anticipation of your (as established PF) excessively vindictive treatment of me. | Previously, I (as new personal authority) have negligently acted hyperviolently towards you: in anticipation of your (as established PF) excessive sense of vindictiveness.<br>But now, you (as reluctant personal follower) will deny *vindictively* acting hyperviolently towards me: scorning my (as new PA) extremely negligent treatment of you. |
| CRIMINAL DISHONOR | DISQUALIFIED VENGEANCE |
| Previously, you (as group representative) have excessively acted in a vengeful fashion, in response to the extremely dishonorable treatment of the group authority.<br>But now, I (as new group authority) will *dishonorably* act in a hyperviolent fashion towards you: in anticipation of your (as established GR) excessively vengeful treatment of me. | Previously, I (as new group authority) have dishonorably acted hyperviolently towards you: in anticipation of your (as established GR) excessively vengeful treatment of me.<br>But now, you (as reluctant group representative) will deny *vengefully* acting hyperviolently towards me: scorning my (as new GA) extremely dishonorable treatment of you. |
| CRIMINAL SLAVERY | DISQUALIFIED DESPAIR |
| Previously, you (as spiritual disciple) have excessively acted in a despairing fashion, in response to the extreme enslavement of the spiritual authority.<br>But now, I (as new spiritual authority) will *enslave* you in a hyperviolent fashion: in anticipation of your (as established SD) excessive sense of despair. | Previously, I (as new spiritual authority) have enslaved you in a hyperviolent fashion: in anticipation of your (as established SD) excessive sense of despair.<br>But now, you (as reluctant spiritual disciple) will deny *despairing* acting in a hyperviolent fashion towards me: scorning my (as new SA) extreme enslavement of you. |
| CRIMINAL TYRANNY | DISQUALIFIED HYPOCRISY |
| Previously, you (as representative member of humanity) have excessively acted in a hypocritical fashion, in response to the extreme sense of tyranny of the humanitarian authority.<br>But now, I (as new humanitarian authority) will *tyrannically* act hyperviolently towards you: in anticipation of your (as established RH) excessively hypocritical treatment of me. | Previously, I (as new humanitarian authority) have tyrannically acted hyperviolently towards you: in anticipation of your (as establ. RH) excessively hypocritical treatment of me.<br>But now, you (as reluctant represent. member of humanity) will deny *hypocritically* acting hyperviolently towards me: scorning my (as new HA) extreme sense of tyranny. |

Fig. 7-C

| CRIMINAL HYPER-APATHY | DISQUALIFIED HYPER-SPITE |
|---|---|
| Previously, I (as personal follower) have extremely acted in a spiteful fashion, in response to the excessively apathetic treatment of the personal authority.<br>But now, you (as new personal authority) will *apathetically* act hyperviolently towards me: in anticipation of my (as established PF) extremely spiteful treatment of you. | Previously, you (as new personal authority) have apathetically acted hyperviolently towards me: in anticipation of my (as established PF) extremely spiteful treatment of you.<br>But now, I (as reluctant personal follower) will deny *spitefully* acting hyperviolently towards you: scorning your (as new PA) excessively apathetic treatment of me. |
| CRIMINAL HYPER-FOOLISHNESS | DISQUALIFIED H-GLUTTONY |
| Previously, I (as group representative) have extremely acted in gluttonous fashion, in response to the excessively foolish treatment of the group authority.<br>But now, you (as new group authority) will *foolishly* act hyperviolently towards me: in anticipation of my (as established GR) extremely gluttonous treatment of you. | Previously, you (as new group authority) have foolishly acted hyperviolently towards me: in anticipation of my (as established GR) extremely gluttonous treatment of you.<br>But now, I (as reluctant group representative) will deny *gluttonously* acting hyperviolently towards you: scorning your (as new GA) excessively foolish treatment of me. |
| CRIMINAL HYPER-VULGARITY | DISQUALIFIED HYPER-AVARICE |
| Previously, I (as spiritual disciple) have extremely acted in an avaricious fashion, in response to the excessively vulgar treatment of the spiritual authority.<br>But now, you (as new spiritual authority) will *vulgarly* act hyperviolently towards me: in anticipation of my (as established SD) extremely avaricious treatment of you. | Previously, you (as new spiritual authority) have vulgarly acted hyperviolently towards me: in anticipation of my (as established SD) extremely avaricious treatment of you.<br>But now, I (as reluctant spiritual disciple) will deny *avariciously* acting hyperviolently towards you: scorning your (as new SA) excessively vulgar treatment of me. |
| CRIMINAL HYPER-OPPRESSION | DISQUALIFIED HYPER-EVIL |
| Previously, I (as representative member of humanity) have extremely acted evilly, in response to the excessively oppressive treatment of the humanitarian authority.<br>But now, you (as new humanitarian authority) will *oppressively* act hyperviolently towards me: in anticipation of my (as established RH) extreme sense of evil. | Previously, you (as new humanitarian authority) have oppressively acted hyperviolently towards me: in anticipation of my (as established RH) extreme sense of evil.<br>But now, I (as reluctant representative member of humanity) will deny *evilly* acting hyperviolently towards you: scorning your (as new HA) excessive sense of oppressiveness. |

Fig. 7-D

| CRIMINAL HYPER-INDIFFERENCE | DISQUALIFIED HYPER-MALICE |
|---|---|
| Previously, I (as personal follower) have extremely acted in a malicious fashion, in response to the excessively indifferent treatment of the personal authority. But now, you (as new personal authority) will *indifferently* act hyperviolently towards me: in anticipation of my (as established PF) extremely malicious treatment of you. | Previously, you (as new personal authority) have indifferently acted hyperviolently towards me: in anticipation of my (as established PF) extremely malicious treatment of you. But now, I (as reluctant personal follower) will deny *maliciously* acting hyperviolently towards you: scorning your (as new PA) excessively indifferent treatment of me. |
| CRIMINAL H-CAPRICIOUSNESS | DISQUALIFIED H-COWARDICE |
| Previously, I (as group representative) have cowardly acted in an extreme fashion, in response to the excessively capricious treatment of the group authority. But now, you (as new group authority) will *capriciously* act hyperviolently towards me: in anticipation of my (as established GR) extreme sense of cowardice. | Previously, you (as new group authority) have capriciously acted hyperviolently towards me: in anticipation of my (as established GR) extreme sense of cowardice. But now, I (as reluctant group representative) will deny *cowardly* acting hyperviolently towards you: scorning your (as new GA) excessively capricious treatment of me. |
| CRIMINAL HYPER-CRUELTY | DISQUALIFIED H-ANTAGONISM |
| Previously, I (as spiritual disciple) have extremely acted in an antagonistic fashion, in response to the excessive sense of cruelty of the spiritual authority. But now, you (as new spiritual authority) will *cruelly* act hyperviolently towards me: in anticipation of my (as established SD) extremely antagonistic treatment of you. | Previously, you (as new spiritual authority) have cruelly acted hyperviolently towards me: in anticipation of my (as established SD) extremely antagonistic treatment of you. But now, I (as reluctant spiritual disciple) will deny *antagonistically* acting hyperviolently towards you: scorning your (as new SA) excessive sense of cruelty. |
| CRIMINAL HYPER-PERSECUTION | DISQUALIFIED HYPER-CUNNING |
| Previously, I (as representative member of humanity) have extremely acted cunningly, in response to the excessive persecution of the humanitarian authority. But now, you (as new humanitarian authority) will *persecute* me in a hypervioIent fashion: in anticipation of my (as established RH) extreme sense of cunning. | Previously, you (as new humanitarian authority) have persecuted me in a hyperviolent fashion: in anticipation of my (as established RH) extreme sense of cunning. But now, I (as reluctant representative member of humanity) will deny *cunningly* acting hyperviolently towards you: scorning your (as new HA) excessive persecution of me. |

Fig. 7-E

| | | | |
|---|---|---|---|
| Narcissistic Personality | Borderline Personality | Obsession Neurosis | Phobia Neurosis |
| Dependent Personality | Avoidant Personality | Compulsion Neurosis | Anxiety Neurosis |

PERSONALITY DISORDERS (A)
*(Personal Double-Bind)*

NEUROSIS (A)
*(Personal Counter Double-Bind)*

| | | | |
|---|---|---|---|
| Confabulatory Euphoria | Suspicious Depression | Confabulatory Paraphrenia | Fantastic Paraphrenia |
| Pure Mania | Pure Melancholy | Expansive Paraphrenia | Incoherent Paraphrenia |

MOOD DISORDERS (I)
*(Group Double-Bind)*

PARANOID SCHIZOPHRENIA
*(Group Counter Double-Bind)*

| | | | |
|---|---|---|---|
| Enthusiastic Euphoria | Self-Torturing Depression | Proskinetic Catatonia | Negativistic Catatonia |
| Unproductive Euphoria | Harried Depression | Parakinetic Catatonia | Affected Catatonia |

MOOD DISORDERS (II)
*(Spiritual Double-Bind)*

CATATONIC SCHIZOPHRENIA
*(Spiritual Counter Double-Bind)*

| | | | |
|---|---|---|---|
| Non-Participatory Euphoria | Non-Participatory Depression | Silly Hebephrenia | Insipid Hebephrenia |
| Hypochondriacal Euphoria | Hypochondriacal Depression | Eccentric Hebephrenia | Autistic Hebephrenia |

MOOD DISORDERS (III)
*(Humanitarian Double-Bind)*

HEBEPHRENIC SCHIZOPHRENIA
*(Humanit. Counter Double-Bind)*

Fig. 8-A

| NARCISSISTIC PERSONALITY | OBSESSION NEUROSIS |
|---|---|
| Previously, you (as personal follower) have flatteringly acted rewardingly, in response to the prideful treatment of the personal authority.<br>But now, I (as new personal authority) will pridefully act in a *narcissistic* fashion towards you: in anticipation of your (as established PF) flattering treatment of me. | Previously, I (as new personal authority) have pridefully acted in a narcissistic fashion towards you: in anticipation of your (as established PF) flattering treatment of me.<br>But now, you (as reluctant personal follower) will *obsessively* deny acting flatteringly towards me: scorning my (as new PA) narcissistic treatment of you. |
| CONFABULATORY EUPHORIA | CONFABULATORY PARAPHREN. |
| Previously, you (as group representative) have flatteringly expressed adulation, in response to the vain sense of pride of the group authority.<br><br>But now, I (as new group authority) will narcissistically act in a *confabulatory* fashion towards you: in anticipation of your (as established GR) adulatory treatment of me. | Previously, I (as new group authority) have narcissistically acted in a confabulatory fashion towards you: in anticipation of your (as established GR) adulatory treatment of me.<br>But now, you (as reluctant group representative) will obsessively act in a *confabulatory* fashion towards me: scorning my (as new GA) narcissistic sense of confabulation. |
| ENTHUSIASTIC EUPHORIA | PROSKINETIC CATATONIA |
| Previously, you (as spiritual disciple) have flatteringly acted in a patronizing fashion, in response to the vain sense of conceit of the spiritual authority.<br>But now, I (as new spiritual authority) will *enthusiastically* act in a confabulatory fashion towards you: in anticipation of your (as established SD) patronizing treatment of me. | Previously, I (as new spiritual authority) have enthusiastically acted in a confabulatory fashion towards you: in anticipation of your (as established SD) patronizing treatment of me.<br>But now, you (as reluctant spiritual disciple) will *proskinetically* act in a confabulatory fashion towards me: scorning my (as new SA) enthusiastic treatment of you. |
| NON-PARTICIPATORY EUPHORIA | SILLY HEBEPHRENIA |
| Previously, you (as representative member of humanity) have patronizingly acted in an indulgent fashion, in response to the pretentious treatment of the humanitarian authority.<br>But now, I (as new humanitarian authority) will enthusiastically act in a *non-participatory* fashion towards you: in anticipation of your (as established RH) indulgent treatment of me. | Previously, I (as new humanitarian authority) have enthusiastically acted non-participatorily towards you: in anticipation of your (as established RH) indulgent treatment of me.<br>But now, you (as reluctant represent. member of humanity) will proskinetically act in a *silly* fashion towards me: scorning my (as new HA) non-participatory treatment of you. |

Fig. 8-B

| BORDERLINE PERSONALITY | PHOBIA NEUROSIS |
|---|---|
| Previously, you (as my personal follower) have critically acted in an excessively blameful fashion, in response to the shameful treatment of the personal authority.<br>But now, I (as new personal authority) will shamefully act in a *borderline* fashion towards you: in anticipation of your (as established PF) critical treatment of me. | Previously, I (as new personal authority) have shamefully acted in a borderline fashion towards you: in anticipation of your (as established PF) critical treatment of me.<br>But now, you (as reluctant personal follower) will *phobically* deny acting critically towards me: scorning my (as new PA) borderline sense of shame. |
| SUSPICIOUS DEPRESSION | FANTASTIC PARAPHRENIA |
| Previously, you (as group representative) have critically acted in a ridiculing fashion, in response to the shameful sense of humiliation of the group authority.<br>But now, I (as new group authority) will *suspiciously* act in a borderline fashion towards you: in anticipation of your (as established GR) critical-ridiculing of me. | Previously, I (as new group authority) have suspiciously acted in a borderline fashion towards you: in anticipation of your (as established GR) critical-ridiculing of me.<br>But now, you (as reluctant group representative) will phobically act in a *fantastical* fashion towards me: scorning my (as new GA) suspicious treatment of you. |
| SELF-TORTURING DEPRESSION | NEGATIVISTIC CATATONIA |
| Previously, you (as spiritual disciple) have scornfully acted in a ridiculing fashion, in response to the mortified treatment of the spiritual authority<br>But now, I (as new spiritual authority) will suspiciously act in a *self-torturing* fashion towards you: in anticipation of your (as established SD) scornful treatment of me. | Previously, I (as new spiritual authority) have suspiciously acted in a self-torturing fashion towards you: in anticipation of your (as established SD) scornful-ridiculing of me.<br>But now, you (as reluctant spiritual disciple) will fantastically act in a *negativistic* fashion towards me: scorning my (as new SA) self-torturing treatment of you. |
| NON-PARTICIPATORY DEPRESS. | INSIPID HEBEPHRENIA |
| Previously, you (as representative member of humanity) have scornfully acted in a mocking fashion, in response to the anguished treatment of the humanitarian authority<br>But now, I (as new humanitarian authority) will self-torturingly act in a *non-participatory* fashion towards you: in anticipation of your (as established RH) scornful-mockery of me. | Previously, I (as new humanitarian authority) have self-torturingly acted in a non-participatory fashion towards you: in anticipation of your (as establ. RH) scornful-mockery of me.<br>But now, you (as reluctant representative member of humanity) will *insipidly* act negativistically towards me: scorning my (as new HA) non-participatory treatment of you. |

Fig. 8-C

| DEPENDENT PERSONALITY | COMPULSION NEUROSIS |
|---|---|
| Previously, I (as personal follower) have enviously acted in an excessively approving fashion, in response to the impudent treatment of the personal authority.<br>But now, you (as new personal authority) will impudently act in a *dependent* fashion towards me: in anticipation of my (as established PF) envious treatment of you. | Previously, you (as new personal authority) have impudently acted in a dependent fashion towards me: in anticipation of my (as established PF) envious treatment of you.<br>But now, I (as reluctant personal follower) will *compulsively* deny acting enviously towards you: scorning your (as new PA) dependent treatment of me. |
| PURE MANIA | EXPANSIVE PARAPHRENIA |
| Previously, I (as group representative) have enviously acted in a jealous fashion, in response to the impudently-arrogant treatment of the group authority.<br>But now, you (as new group authority) will *manically* act in a dependent fashion towards me: in anticipation of my (as established GR) envious sense of jealousy. | Previously, you (as new group authority) have manically acted in a dependent fashion towards me: in anticipation of my (as established GR) envious sense of jealousy.<br>But now, I (as reluctant group representative) will compulsively act in an *expansive* fashion towards you: scorning your (as new GA) manic treatment of me. |
| UNPRODUCTIVE EUPHORIA | PARAKINETIC CATATONIA |
| Previously, I (as spiritual disciple) have jealously acted in a covetous fashion, in response to the arrogant sense of impetuosity of the spiritual authority.<br>But now, you (as new spiritual authority) will manically act in an *unproductive* fashion towards me: in anticipation of my (as established SD) covetous treatment of you. | Previously, you (as new spiritual authority) have manically acted in an unproductive fashion towards me: in anticipation of my (as established SD) covetous treatment of you.<br>But now, I (as reluctant spiritual disciple) will expansively act in a *parakinetic* fashion towards you: scorning your (as new SA) unproductive treatment of me. |
| HYPOCHONDRIACAL EUPHORIA | ECCENTRIC HEBEPHRENIA |
| Previously, I (as representative member of humanity) have covetously acted longingly, in reaction to the impetuous sense of presumption of the humanitarian authority.<br>But now, you (as new humanitarian authority) will unproductively act in a *hypochondriacal* fashion towards me: in anticipation of my (as established RH) covetous sense of longing. | Previously, you (as new humanitarian authority) have unproductively acted in a hypochondriacal fashion towards me: in anticipation of my (as est. RH) covetous sense of longing.<br>But now, I (as reluctant representative member of humanity) will *eccentrically* act in a parakinetic fashion towards you: scorning your (as new HA) hypochondriacal treatment of me |

Fig. 8-D

| AVOIDANT PERSONALITY | ANXIETY NEUROSIS |
|---|---|
| Previously, I (as personal follower) have disdainfully acted in an excessively concerned fashion, in response to the insolent treatment of the personal authority.<br>But now, you (as new personal authority) will insolently act in an *avoidant* fashion towards me: in anticipation of my (as established PF) disdainful treatment of you. | Previously, you (as new personal authority) have insolently acted in an avoidant fashion towards me: in anticipation of my (as established PF) disdainful treatment of you.<br>But now, I (as reluctant personal follower) will *anxiously* deny acting disdainfully towards you: scorning your (as new PA) avoidant treatment of me. |
| PURE MELANCHOLY | INCOHERENT PARAPHRENIA |
| Previously, I (as group representative) have disdainfully acted in a contemptuous fashion, in response to the insolent sense of audacity of the group authority.<br>But now, you (as new group authority) will avoidantly act in a *melancholic* fashion towards me: in anticipation of my (as established GR) disdainful sense of contempt. | Previously, you (as new group authority) have avoidantly acted in a melancholic fashion towards me: in anticipation of my (as established GR) disdainful sense of contempt.<br>But now, I (as reluctant group representative) will anxiously act in an *incoherent* fashion towards you: scorning your (as new GA) melancholic treatment of me. |
| HARRIED DEPRESSION | AFFECTED CATATONIA |
| Previously, I (as spiritual disciple) have contemptuously acted in a reproachful fashion, in response to the audacious sense of rashness of the spiritual authority.<br>But now, you (as new spiritual authority) will *harriedly* act in a melancholic fashion towards me: in anticipation of my (as established SD) contemptuous sense of reproach. | Previously, you (as new spiritual authority) have harriedly acted in a melancholic fashion towards me: in anticipation of my (as established SD) reproachful treatment of you.<br>But now, I (as reluctant spiritual disciple) will incoherently act in an *affected* fashion towards you: scorning your (as new SA) harried treatment of me. |
| HYPOCHONDRIACAL DEPRESS. | AUTISTIC HEBREPHRENIA |
| Previously, I (as representative member of humanity) have reproachfully acted in a chagrined fashion, in response to the rash sense of boldness of the humanitarian authority.<br>But now, you (as new humanitarian authority) will harriedly act in a *hypochondriacal* fashion towards me: in anticipation of my (as established RH) chagrined treatment of you. | Previously, you (as new humanitarian authority) have harriedly acted in a hypochondriacal fashion towards me: in anticipation of my (as establ. RH) chagrined treatment of you.<br>But now, I (as reluctant representative member of humanity) will affectedly act in an *autistic* fashion towards you: scorning your (as new HA) hypochondriacal treatment of me. |

Fig. 8-E

| Histrionic Personality | Paranoid Personality |
|---|---|
| Passive-Aggressive Personality | Schizoid Personality Disorder |

PERSONALITY DISORDERS (II)
*Personal Follower
Double-Bind*

| Dissociative Hysteria | Depersonalization Neurosis |
|---|---|
| Conversion Hysteria | Neuraesthenic Neurosis |

HYSTERIA NEUROSIS
*Group Authority
Counter Double-Bind*

| Happiness Psychosis | Anxiety Psychosis |
|---|---|
| Manic-(depressive) Disease | (manic-) Depressive Disease |

CYCLOID PSYCHOSES (I)
*Group Representative
Double-Bind*

| Confabulatory Affect/Laden Paraphrenia | Fantastic Affect/Laden Paraphrenia |
|---|---|
| Manic Affect/Laden Paraphrenia | Confused Affect/Laden Paraphrenia |

UNSYSTEMATIC PARAPHRENIA
*Spiritual Authority
Counter Double-Bind*

| Excited Confusion Psychosis | Inhibited Confusion Psychosis |
|---|---|
| Hyperkinetic Motility Psychosis | Akinetic Motility Psychosis |

CYCLOID PSYCHOSES (II)
*Spiritual Disciple
Double-Bind*

| Excited Cataphasia | Inhibited Cataphasia |
|---|---|
| Hyperkinetic Periodic Catatonia | Akinetic Periodic Catatonia |

UNSYSTEMATIC CATATONIA
*Humanitarian Authority
Counter Double-Bind*

Fig. 9-A

| HISTRIONIC PERSONALITY | DISSOCIATIVE HYSTERIA |
|---|---|
| Previously, I (as group authority) have vainly acted in a prideful fashion, in response to the flatterous attentions of the personal follower.<br><br>But now, you (as new personal follower) will *histrionically* act in a flattering fashion towards me: in anticipation of my (as established GA) vain sense of pride. | Previously, you (as new personal follower) have histrionically acted in a flattering fashion towards me: in anticipation of my (as established GA) vain sense of pride.<br>But now, I (as reluctant group authority) will hysterically act in a *dissociative* fashion towards you: scorning your (as new PF) histrionic treatment of me. |
| HAPPINESS PSYCHOSIS | A/L PARAPHRENIA (CONFAB.) |
| Previously, I (as spiritual authority) have vainly acted in a conceited fashion, in response to the flatterous-adulation of the group representative.<br><br>But now, you (as new group representative) will histrionically act in a *happy* fashion towards me: in anticipation of my (as established SA) vain sense of conceit. | Previously, you (as new group representative) have histrionically acted in a happy fashion towards me: in anticipation of my (as established SA) vain sense of conceit.<br>But now, I (as reluctant spiritual authority) will dissociatingly act in a *confabulatory* fashion towards you: scorning your (as new GR) histrionic sense of happiness. |
| EXCITED CONFUSION PSYCH. | EXCITED CATAPHASIA |
| Previously, I (as humanitarian authority) have pretentiously acted in a conceited fashion, in response to the patronizing sense of flattery of the spiritual disciple.<br>But now, you (as new spiritual disciple) will *excitedly* act in a happy fashion towards me: in anticipation of my (as established HA) pretentious sense of conceit. | Previously, you (as new spiritual disciple) have excitedly acted in a happy fashion towards me: in anticipation of my (as established HA) pretentious sense of conceit.<br>But now, I (as reluctant humanitarian authority) will confabulatingly act in a *schizophasic* fashion towards you: scorning your (as new SD) excited treatment of me. |

Fig. 9-B

| PARANOID PERSONALITY | DEPERSONALIZATION NEUR. |
|---|---|
| Previously, I (as group authority) have shamefully acted in a humiliated fashion, in response to the critical treatment of the personal follower.<br><br>But now, you (as new personal follower) will critically act in a *paranoid* fashion towards me: in anticipation of my (as established GA) shameful sense of humiliation. | Previously, you (as new personal follower) have critically acted in a paranoid fashion towards me: in anticipation of my (as established GA) shameful sense of humiliation.<br><br>But now, I (as reluctant group authority) will neurotically act in a *depersonalized* fashion towards you: scorning your (as new PA) paranoid treatment of me. |
| ANXIETY PSYCHOSIS | A/L PARAPHREN.(FANTASTIC) |
| Previously, I (as spiritual authority) have humiliatingly acted in a mortified fashion, in response to the critical-ridiculing of the group representative.<br><br>But now, you (as new group representative) will *anxiously* act in a paranoid fashion towards me: in anticipation of my (as established SA) mortified treatment of you. | Previously, you (as new group representative) have anxiously acted in a paranoid fashion towards me: in anticipation of my (as established SA) mortified treatment of you.<br><br>But now, I (as reluctant spiritual authority) will *fantastically* act in a depersonalized fashion towards you: scorning your (as new GR) anxious treatment of me. |
| INHIBITED CONFUSION PSY. | INHIBITED CATAPHASIA |
| Previously, I (as humanitarian authority) have mortifiedly acted in an anguished fashion, in response to the scornful-ridicule of the spiritual disciple.<br><br>But now, you (as new spiritual disciple) will anxiously act in a *confused* fashion towards me: in anticipation of my (as established HA) mortified sense of anguish. | Previously, you (as new spiritual disciple) have anxiously acted in a confused fashion towards me: in anticipation of my (as established HA) mortified sense of anguish.<br><br>But now, I (as reluctant humanitarian authority) will fantastically act in a *schizophasic* fashion towards you: scorning your (as new SD) confused treatment of me. |

Fig. 9-C

| PASSIVE-AGGRESSIVE PERS. | CONVERSION HYSTERIA |
|---|---|
| Previously, you (as group authority) have impudently acted in an arrogant fashion, in response to the envious treatment of the personal follower.<br>But now, I (as new personal follower) will enviously act in a *passive-aggressive* fashion towards you: in anticipation of your (as established GA) impudently-arrogant treatment of me. | Previously, I (as new personal follower) have enviously acted passive-aggressively towards you: in anticipation of your (as established GA) impudently-arrogant treatment of me.<br>But now, you (as reluctant group authority) will hysterically act in a *conversion* fashion towards me: scorning my (as new PF) passive-aggressive treatment of you. |
| MANIC/DEPRESSIVE DISEASE | A/L PARAPHRENIA (MANIC) |
| Previously, you (as spiritual authority) have arrogantly acted impetuously, in response to the envious sense of jealousy of the group representative.<br>But now, I (as new group representative) will *manically* act in a passive-aggressive fashion towards you: in anticipation of your (as established SA) arrogant sense of impetuousity. | Previously, I (as new group representative) have manically acted in a passive-aggressive fashion towards you: in anticipation of your (as established SA) impetuous treatment of me.<br>But now, you (as reluctant spiritual authority) will *manically* act in a conversion fashion towards me: scorning my (as new GR) passive-aggressive treatment of you. |
| HYPERKINET. MOTILITY PSY. | PERIODIC CATA. HYPERKIN. |
| Previously, you (as humanitarian authority) have impetuously acted in a presumptuous fashion, in response to the covetous treatment of the spiritual disciple.<br>But now, I (as new spiritual disciple) will manically act in a *hyperkinetic* fashion towards you: in anticipation of your (as established HA) presumptuous treatment of me. | Previously, I (as new spiritual disciple) have manically acted hyperkinetically towards you: in anticipation of your (as estab.HA) presumptuous treatment of me.<br>But now, you (as reluctant humanitarian authority) will *periodically* act manically towards me: scorning my (as new SD) hyperkinetic treatment of you. |

Fig. 9-D

| SCHIZOID PERSONALITY | NEURAESTHENIC NEUROSIS |
|---|---|
| Previously, you (as group authority) have insolently acted in an audacious fashion, in response to the disdainful treatment of the personal follower.<br>But now, I (as new personal follower) will disdainfully act in a *schizoid* fashion towards you: in anticipation of your (as established GA) insolent sense of audacity. | Previously, I (as new personal follower) have disdainfully acted in a schizoid fashion towards you: in anticipation of your (as established GA) insolent sense of audacity.<br>But now, you (as reluctant group authority) will neurotically act in a *neuraesthenic* fashion towards me: scorning my (as new PF) schizoid treatment of you. |
| MANIC/DEPRESSIVE DISEASE | A/L PARAPHREN.(CONFUSED) |
| Previously, you (as spiritual authority) have audaciously acted in a rash fashion, in response to the disdainful sense of contempt of the group representative.<br><br>But now, I (as new group representative) will *depressively* act in a schizoid fashion towards you: in anticipation of your (as established SA) rash treatment of me. | Previously, I (as new group representative) have depressively acted in a schizoid fashion towards you: in anticipation of your (as established SA) rash treatment of me.<br>But now, you (as reluctant spiritual authority) will neuraesthenically act in a *confused* fashion towards me: scorning my (as new GR) depressive treatment of you. |
| AKINETIC MOTILITY PSYCH. | PERIODIC CATA. (AKINETIC) |
| Previously, you (as humanitarian authority) have rashly acted in a bold fashion, in response to the contemptuous sense of reproach of the spiritual disciple.<br><br>But now, I (as new spiritual disciple) will depressively act in an *akinetic* fashion towards you: in anticipation of your (as established HA) bold treatment of me. | Previously, I (as new spiritual disciple) have depressively acted in an akinetic fashion towards you: in anticipation of your (as estab. HA) bold treatment of me.<br>But now, you (as reluctant humanitarian authority) will *catatonically* act in a confused fashion towards me: scorning my (as new SD) akinetic treatment of you. |

Fig. 9-E

| ACCESSORY LOYALTY | ACCESSORY HUMILITY |
|---|---|
| Previously, you (as group authority) have poignantly acted in an exalted fashion, in response to the adoring treatment of the personal follower.  But now, I (as new personal follower) will *adoringly* act rewardingly towards you: in anticipation of your (as established GA) poignantly-exalted treatment of me. | Previously, I (as new personal follower) have adoringly acted rewardingly towards you: in anticipation of your (as established GA) poignantly-exalted treatment of me.  But now, you (as reluctant group authority) will deny poignantly acting exaltedly towards me: averting my (as new PF) adoring treatment of you. |
| ACCESSORY FIDELITY | ACCESSORY MAJESTY |
| Previously, you (as spiritual authority) have exaltedly acted in a bountiful fashion, in response to the circumspective-adoration of the group representative. But now, I (as new group representative) will *circumspectively* act in an adoring fashion towards you: in anticipation of your (as established SA) bountiful treatment of me. | Previously, I (as new group representative) have circumspectively acted in an adoring fashion towards you: in anticipation of your (as established SA) bountiful treatment of me. But now, you (as reluctant spiritual authority) will deny exaltedly acting in a *bountiful* fashion towards me: averting my (as new GR) circumspective-adoration of you. |
| ACCESSORY PIETY | ACCESSORY MAGNIFICENCE |
| Previously, you (as humanitarian authority) have bountifully acted in a blessing fashion, in response to the circumspective-devotion of the spiritual disciple. But now, I (as new spiritual disciple) will circumspectively act in a *devoted* fashion towards you: in anticipation of your (as established HA) bountiful-blessing of me. | Previously, I (as new spiritual disciple) have circumspectively acted in a devoted fashion towards you: in anticipation of your (as established HA) bountiful-blessing of me.  But now, you (as reluctant humanitarian authority) will deny bountifully-blessing me: averting my (as new SD) circumspective-devotion for you. |
| ACCESSORY FELICITY | ACCESSORY GRANDEUR |
| Previously, you (as transcendental authority) have serenely acted blessingly, in response to the charming-devotion of the representative member of humanity. But now, I (as new representative member of humanity) will *charmingly* act devotedly towards you: in anticipation of your (as established TA) serene-blessing of me. | Previously, I (as new representative member of humanity) have charmingly acted devotedly towards you: in anticipation of your (as established TA) serene-blessing of me. But now, you (as reluctant transcendental authority) will deny *serenely*-blessing me: averting my (as new RH) charming sense of devotion. |

Fig. 10-A

| ACCESSORY RESPONSIBILITY | ACCESSORY INNOCENCE |
|---|---|
| Previously, you (as group authority) have culpably acted in an upright fashion, in response to the censuring treatment of the personal follower.<br><br>But now, I (as new personal follower) will *censuringly* act leniently towards you: in anticipation of your (as established GA) culpable sense of uprightness. | Previously, I (as new personal follower) have censuringly acted leniently towards you: in anticipation of your (as established GA) culpable sense of uprightness.<br>But now, you (as reluctant group authority) will deny culpably acting in an *upright* fashion towards me: opposing my (as new PF) censuring treatment of you. |
| ACCESSORY DUTY | ACCESSORY VINDICATION |
| Previously, you (as spiritual authority) have freely acted in an upright fashion, in response to the equitable-censuring of the group representative.<br><br>But now, I (as new group representative) will *equitably*-censure you: in anticipation of your (as established SA) free sense of uprightness. | Previously, I (as new group representative) have equitably-censured you: in anticipation of your (as established SA) free sense of uprightness.<br><br>But now, you (as reluctant spiritual authority) will deny *freely* acting in an upright fashion towards me: opposing my (as new GR) equitable-censuring of you. |
| ACCESSORY ALLEGIANCE | ACCESSORY EXONERATION |
| Previously, you (as humanitarian authority) have freely acted in a conscientious fashion, in response to the equitable sense of fairness of the spiritual disciple.<br>But now, I (as new spiritual disciple) will equitably act *fairly* towards you: in anticipation of your (as established HA) conscientious treatment of me. | Previously, I (as new spiritual disciple) have equitably acted fairly towards you: in anticipation of your (as established HA) conscientious treatment of me.<br>But now, you (as reluctant humanitarian authority) will deny freely acting *conscientiously* towards me: opposing my (as new SD) equitable sense of fairness. |
| ACCESSORY RIGHTEOUSNESS | ACCESSORY IMMACULATENESS |
| Previously, you (as transcendental authority) have conscientiously acted in a brotherly fashion, in response to the fair sense of credence of the representative member of humanity.<br>But now, I (as new representative member of humanity) will fairly express a sense of *credence* in you: in anticipation of your (as establ. TA) conscientious sense of brotherhood. | Previously, I (as new representative member of humanity) have fairly expressed credence in you: in anticipation of your (as established TA) conscientious sense of brotherhood.<br>But now, you (as reluctant transcendental authority) will deny conscientiously acting with *brotherhood* towards me: opposing my (as new RH) fair sense of credence. |

Fig. 10-B

| ACCESSORY DISCIPLINE | ACCESSORY MODESTY |
|---|---|
| Previously, I (as group authority) have passionately acted in a respectful fashion, in response to the admiring treatment of the personal follower.<br>But now, you (as new personal follower) will rewardingly act in an *admiring* fashion towards me: in anticipation of my (as established GA) passionate-respect for you. | Previously, you (as new personal follower) have rewardingly acted in an admiring fashion towards me: in anticipation of my (as established GA) passionate-respect for you.<br>But now, I (as reluctant group authority) will deny passionately acting *respectfully* towards you: averting your (as new PF) admiring treatment of me. |
| ACCESSORY CHIVALRY | ACCESSORY CHASTITY |
| Previously, I (as spiritual authority) have courteously acted in a respectful fashion, in response to the continently-admiring treatment of the group representative.<br>But now, you (as new group representative) will *continently* act in an admiring fashion towards me: in anticipation of my (as established SA) courteous-respect for you. | Previously, you (as new group representative) have continently acted in an admiring fashion towards me: in anticipation of my (as established SA) courteous-respect for you.<br>But now, I (as reluctant spiritual authority) will deny *courteously* acting respectfully towards you: averting your (as new GR) continently-admiring treatment of me. |
| ACCESSORY NOBILITY | ACCESSORY PURITY |
| Previously, I (as humanitarian authority) have courteously acted in a gracious fashion, in response to the continent sense of kindness of the spiritual disciple.<br>But now, you (as new spiritual disciple) will continently act with *kindness* towards me: in anticipation of my (as established HA) courteously-gracious treatment of you. | Previously, you (as new spiritual disciple) have continently acted with kindness towards me: in anticipation of my (as established HA) courteously-gracious treatment of you.<br>But now, I (as reluctant humanitarian authority) will deny courteously acting *graciously* towards you: averting your (as new SD) continent sense of kindness. |
| ACCESSORY ZEAL | ACCESSORY PERFECTION |
| Previously, I (as transcendental authority) have graciously acted affectionately, in response to the benevolent sense of kindness of the representative member of humanity<br>But now, you (as new representative member of humanity) will *benevolently* act with kindness towards me: in anticipation of my (as established TA) affectionate treatment of you. | Previously, you (as new represent. member of humanity) have benevolently acted with kindness towards me: in anticipation of my (as establ. TA) affectionate treatment of you.<br>But now, I (as reluctant transcendental authority) will deny graciously acting *affectionately* towards you: averting your (as new RH) benevolent sense of kindness. |

Fig. 10-C

| ACCESSORY VIGILANCE | ACCESSORY MEEKNESS |
|---|---|
| Previously, I (as group authority) have apprehensively acted with probity, in response to the caring treatment of the personal follower.<br><br>But now, you (as new personal follower) will leniently act in a *caring* fashion towards me: in anticipation of my (as established GA) apprehensive sense of probity. | Previously, you (as new personal follower) have leniently acted in a caring fashion towards me: in anticipation of my (as established GA) apprehensive sense of probity.<br><br>But now, I (as reluctant group authority) will deny apprehensively acting with *probity* towards you: opposing your (as new PF) caring treatment of me. |
| ACCESSORY COURAGE | ACCESSORY OBEDIENCE |
| Previously, I (as spiritual authority) have forbearingly acted with probity, in response to the brave sense of caring of the group representative.<br><br>But now, you (as new group representative) will *bravely* act in a caring fashion towards me: in anticipation of my (as established SA) forbearing sense of probity. | Previously, you (as new group representative) have bravely acted in a caring fashion towards me: in anticipation of my (as established SA) forbearing sense of probity.<br><br>But now, I (as reluctant spiritual authority) will deny *forbearingly* acting with probity towards you: opposing your (as new GR) brave treatment of me. |
| ACCESSORY VALOR | ACCESSORY CONFORMITY |
| Previously, I (as humanitarian authority) have forbearingly acted in a patient fashion, in response to the scrupulous sense of bravery of the spiritual disciple.<br>But now, you (as new spiritual disciple) will *scrupulously* act in a brave fashion towards me: in anticipation of my (as established HA) patient treatment of you. | Previously, you (as new spiritual disciple) have scrupulously acted in a brave fashion towards me: in anticipation of my (as established HA) patient treatment of you.<br>But now, I (as reluctant humanitarian authority) will deny forbearingly acting in a *patient* fashion towards you: opposing your (as new SD) scrupulous treatment of me. |
| ACCESSORY TRIUMPH | ACCESSORY PACIFISM |
| Previously, I (as transcendental authority) have forbearingly acted amicably, in response to the scrupulous sense of shrewdness of the representative member of humanity.<br>But now, you (as new representative member of humanity) will scrupulously act *shrewdly* towards me: in anticipation of my (as established TA) amicable treatment of you. | Previously, you (as new representative member of humanity) have scrupulously acted shrewdly towards me: in anticipation of my (as established TA) amicable treatment of you.<br>But now, I (as reluctant transcendental authority) will deny forbearingly acting *amicably* towards you: opposing your (as new RH) scrupulous sense of shrewdness. |

Fig. 10-D

| ACCESSORY SELF-ESTEEM | ACCESSORY REVERENCE |
|---|---|
| Previously, I (as personal follower) have adoringly acted in a rewarding fashion, in response to the poignant treatment of the personal authority.<br><br>But now, you (as new personal authority) will *poignantly* act solicitously towards me: in anticipation of my (as established PF) adoring treatment of you. | Previously, you (as new personal authority) have poignantly acted solicitously towards me: in anticipation of my (as established PF) adoring treatment of you.<br>But now, I (as reluctant personal follower) will deny *adoringly* acting rewardingly towards you: averting your (as new PA) poignant treatment of me. |
| ACCESSORY POMP | ACCESSORY VENERATION |
| Previously, I (as group representative) have circumspectively acted in an adoring fashion, in response to the poignantly-exalted treatment of the group authority.<br>But now, you (as new group authority) will poignantly act in an *exalted* fashion towards me: in anticipation of my (as established GR) circumspective-adoration of you. | Previously, you (as new group authority) have poignantly acted in an exalted fashion towards me: in anticipation of my (as established GR) circumspective-adoration of you.<br>But now, I (as reluctant group representative) will deny *circumspectively* acting adoringly towards you: averting your (as new GA) poignantly-exalted treatment of me. |
| ACCESSORY SANCTITY | ACCESSORY HOMAGE |
| Previously, I (as spiritual disciple) have circumspectively acted in a devoted fashion, in response to the exalted sense of bountifulness of the spiritual authority.<br>But now, you (as new spiritual authority) will exaltedly act in a *bountiful* fashion towards me: in anticipation of my (as established SD) circumspective-devotion for you. | Previously, you (as new spiritual authority) have exaltedly acted bountifully towards me: in anticipation of my (as established SD) circumspective-devotion for you.<br>But now, I (as reluctant spiritual disciple) will deny circumspectively acting *devotedly* towards you: averting your (as new SA) bountiful treatment of me. |
| ACCESSORY DOMINION | ACCESSORY BENEDICTION |
| Previously, I (as representative member of humanity) have charmingly acted in a devoted fashion, in response to the bountiful-blessing of the humanitarian authority.<br><br>But now, you (as new humanitarian authority) will bountifully-*bless* me: in anticipation of my (as established RH) charming sense of devotion. | Previously, you (as new humanitarian authority) have bountifully-blessed me: in anticipation of my (as est. RH) charming sense of devotion.<br><br>But now, I (as reluctant representative member of humanity) will deny *charmingly* acting devotedly towards you: averting your (as new HA) bountiful-blessing of me. |

Fig. 11-A

| ACCESSORY APOLOGY | ACCESSORY CLEMENCY |
|---|---|
| Previously, I (as personal follower) have censuringly acted in a lenient fashion, in response to the culpable treatment of the personal authority.<br>But now, you (as new personal authority) will *culpably* act in a submissive fashion towards me: in anticipation of my (as established PF) censuring treatment of you. | Previously, you (as new personal authority) have culpably acted in a submissive fashion towards me: in anticipation of my (as established PF) censuring treatment of you.<br>But now, I (as reluctant personal follower) will deny *censuringly* acting leniently towards you: opposing your (as new PA) culpable treatment of me. |
| ACCESSORY RECTITUDE | ACCESSORY PARDON |
| Previously, I (as group representative) have equitably acted in a censuring fashion, in response to the culpable sense of uprightness of the group authority.<br>But now, you (as new group authority) will culpably act in an *upright* fashion towards me: in anticipation of my (as established GR) equitable-censuring of you. | Previously, you (as new group authority) have culpably acted in an upright fashion towards me: in anticipation of my (as established GR) equitable-censuring of you.<br>But now, I (as reluctant group representative) will deny *equitably-*censuring you: opposing your (as new GA) culpable sense of uprightness. |
| ACCESSORY PENITENCE | ACCESSORY ABSOLUTION |
| Previously, I (as spiritual disciple) have equitably acted in a fair fashion, in response to the free sense of uprightness of the spiritual authority.<br>But now, you (as new spiritual authority) will *freely* act in an upright fashion towards me: in anticipation of my (as established SD) equitable sense of fairness. | Previously, you (as new spiritual authority) have freely acted in an upright fashion towards me: in anticipation of my (as established SD) equitable sense of fairness.<br><br>But now, I (as reluctant spiritual disciple) will deny equitably acting *fairly* towards you: opposing your (as new SA) free sense of uprightness. |
| ACCESSORY CONTRITION | ACCESSORY DELIVERANCE |
| Previously, I (as representative member of humanity) have fairly expressed credence, in response to the free sense of conscientiousness of the humanitarian authority.<br>But now, you (as new humanitarian authority) will freely act in a *conscientious* fashion towards me: in anticipation of my (as established RH) fair sense of credence. | Previously, you (as new humanitarian authority) have freely acted conscientiously towards me: in anticipation of my (as established RH) fair sense of credence.<br>But now, I (as reluctant representative member of humanity) will deny fairly expressing a sense of *credence* in you: opposing your (as new HA) conscientious treatment of me. |

Fig. 11-B

| ACCESSORY CONGENIALITY | ACCESSORY CONCESSION |
|---|---|
| Previously, you (as personal follower) have admiringly acted rewardingly, in response to the passionate treatment of the personal authority.<br>But now, I (as new personal authority) will *passionately* act solicitously towards you: in anticipation of your (as established PF) admiring treatment of me. | Previously, I (as new personal authority) have passionately acted solicitously towards you: in anticipation of your (as established PF) admiring treatment of me.<br>But now, you (as reluctant personal follower) will deny *admiringly* acting rewardingly towards me: averting my (as new PA) passionate treatment of you. |
| ACCESSORY CORDIALITY | ACCESSORY INDULGENCE |
| Previously, you (as group representative) have continently acted admiringly, in response to the passionate-respect of the group authority.<br><br>But now, I (as new group authority) will passionately act in a *respectful* fashion towards you: in anticipation of your (as established GR) continently-admiring treatment of me. | Previously, I (as new group authority) have passionately acted respectfully towards you: in anticipation of your (as established GR) continently-admiring treatment of me.<br>But now, you (as reluctant group representative) will deny *continently* acting admiringly towards me: averting my (as new GA) passionate-respect for you. |
| ACCESSORY HOSPITALITY | ACCESSORY PATRONIZATION |
| Previously, you (as spiritual disciple) have continently acted in a kind fashion, in response to the courteous-respect of the spiritual authority.<br><br>But now, I (as new spiritual authority) will *courteously* act respectfully towards you: in anticipation of your (as established SD) continent sense of kindness. | Previously, I (as new spiritual authority) have courteously acted respectfully towards you: in anticipation of your (as established SD) continent sense of kindness.<br>But now, you (as reluctant spiritual disciple) will deny continently acting with *kindness* towards me: averting my (as new SA) courteous-respect for you. |
| ACCESSORY GOODWILL | ACCESSORY ALTRUISM |
| Previously, you (as represent. member of humanity) have benevolently acted with kindness, in response to the courteously-gracious treatment of the humanitarian authority.<br>But now, I (as new humanitarian authority) will courteously act *graciously* towards you: in anticipation of your (as established RH) benevolent sense of kindness. | Previously, I (as new humanitarian authority) have courteously acted graciously towards you: in anticipation of your (as established RH) benevolent sense of kindness.<br>But now, you (as reluctant representative member of humanity) will deny *benevolently* acting kindly towards me: averting my (as new HA) courteous sense of graciousness. |

Fig. 11-C

| | |
|---|---|
| ACCESSORY APPEASEMENT<br>Previously, you (as personal follower) have leniently acted in a caring fashion, in response to the apprehensive treatment of the personal authority.<br>But now, I (as new personal authority) will *apprehensively* act submissively towards you: in anticipation of your (as established PF) caring treatment of me. | ACCESSORY SYMPATHY<br>Previously, I (as new personal authority) have apprehensively acted submissively towards you: in anticipation of your (as established PF) caring treatment of me.<br>But now, you (as reluctant personal follower) will deny *caringly* acting leniently towards me: opposing my (as new PA) apprehensive treatment of you. |
| ACCESSORY CONCILIATION<br>Previously, you (as group representative) have bravely acted in a caring fashion, in response to the apprehensive sense of probity of the group authority.<br>But now, I (as new group authority) will apprehensively act with *probity* towards you: in anticipation of your (as established GR) brave sense of caring. | ACCESSORY COMPASSION<br>Previously, I (as new group authority) have apprehensively acted with probity towards you: in anticipation of your (as established GR) brave sense of caring.<br>But now, you (as reluctant group representative) will deny *bravely* acting caringly towards me: opposing my (as new GA) apprehensive sense of probity |
| ACCESSORY ACCOMMODATION<br>Previously, you (as spiritual disciple) have scrupulously acted in a brave fashion, in response to the forbearing sense of probity of the spiritual authority.<br>But now, I (as new spiritual authority) will *forbearingly* act with probity towards you: in anticipation of your (as established SD) scrupulous treatment of me. | ACCESSORY MERCY<br>Previously, I (as new spiritual authority) have forbearingly acted with probity towards you: in anticipation of your (as established SD) scrupulous treatment of me.<br>But now, you (as reluctant spiritual disciple) will deny *scrupulously* acting bravely towards me: opposing my (as new SA) forbearing treatment of you. |
| ACCESSORY SACRIFICE<br>Previously, you (as representative member of humanity) have scrupulously acted shrewdly, in response to the forbearing sense of patience of the humanitarian authority.<br>But now, I (as new humanitarian authority) will forbearingly act *patiently* towards you: in anticipation of your (as established RH) scrupulous sense of shrewdness. | ACCESSORY REDEMPTION<br>Previously, I (as new humanitarian authority) have forbearingly acted patiently towards you: in anticipation of your (as established RH) scrupulous sense of shrewdness.<br>But now, you (as reluctant representative member of humanity) will deny scrupulously acting *shrewdly* towards me: opposing my (as new HA) patient treatment of you. |

Fig. 11-D

| | |
|---|---|
| CRIMINAL MUTINY<br>Previously, you (as group authority) have slothfully acted in a notorious fashion, in response to the mutinous treatment of the personal follower.<br><br>But now, I (as new personal follower) will *mutinously* act in a punitive fashion towards you: in anticipation of your (as established GA) slothful sense of notoriety. | DISQUALIFIED NOTORIETY<br>Previously, I (as new personal follower) have mutinously acted in a punitive fashion towards you: in anticipation of your (as established GA) slothful sense of notoriety.<br>But now, you (as reluctant group authority) will deny slothfully acting *notoriously* towards me: scorning my (as new PF) mutinous treatment of you. |
| CRIMINAL REBELLION<br>Previously, you (as spiritual authority) have notoriously acted in a scandalous fashion, in response to the mutinous-rebellion of the group representative.<br>But now, I (as new group representative) will mutinously-*rebel* against you: in anticipation of your (as established SA) scandalous sense of notoriety. | DISQUALIFIED SCANDAL<br>Previously, I (as new group representative) have mutinously-rebelled against you: in anticipation of your (as established SA) scandalous sense of notoriety.<br>But now, you (as reluctant spiritual authority) will deny notoriously acting *scandalously* towards me: scorning my (as new GR) mutinous-rebellion against you. |
| CRIMINAL TREASON<br>Previously, you (as humanitarian authority) have scandalously acted in a disgraceful fashion, in response to the treasonous-rebellion of the spiritual disciple.<br>But now, I (as new spiritual disciple) will *treasonously*-rebel against you: in anticipation of your (as established HA) scandalous sense of disgracefulness. | DISQUALIFIED DISGRACE<br>Previously, I (as new spiritual disciple) have treasonously rebelled against you: in anticipation of your (as established HA) scandalous sense of disgracefulness.<br>But now, you (as reluctant humanitarian authority) will deny scandalously acting *disgracefully* towards me: scorning my (as new SD) treasonous-rebellion against you. |
| CRIMINAL VILENESS<br>Previously, you (as transcendental authority) have furiously acted in a disgraceful fashion, in response to the vile sense of treason of the representative member of humanity.<br>But now, I (as new representative member of humanity) will treasonously act in a *vile* fashion towards you: in anticipation of your (as established TA) furious treatment of me. | DISQUALIFIED FURY<br>Previously, I (as new representative member of humanity) have treasonously acted in a vile fashion towards you: in anticipation of your (as established TA) furious treatment of me.<br>But now, you (as reluctant transcendental authority) will deny *furiously* acting disgracefully towards me: scorning my (as new RH) vile sense of treason. |

Fig. 12-A

| CRIMINAL RETALIATION | DISQUALIFIED IGNOMINY |
|---|---|
| Previously, you (as group authority) have ignominiously acted in a careless fashion, in response to the retaliatory treatment of the personal follower.<br>But now, I (as new personal follower) will punitively act in a *retaliatory* fashion towards you: in anticipation of your (as established GA) ignominious sense of carelessness. | Previously, I (as new personal follower) have punitively acted in a retaliatory fashion towards you: in anticipation of your (as established GA) ignominious sense of carelessness.<br>But now, you (as reluctant group authority) will deny *ignominiously* acting carelessly towards me: scorning my (as new PF) retaliatory treatment of you. |
| CRIMINAL RETRIBUTION | DISQUALIFIED BONDAGE |
| Previously, you (as spiritual authority) have ignominiously expressed a sense of bondage, in response to the retaliatory quest for retribution of the group representative.<br>But now, I (as new group representative) will retaliatively seek *retribution* against you: in anticipation of your (as established SA) ignominious sense of bondage. | Previously, I (as new group representative) have retaliatively sought retribution towards you: in anticipation of your (as established SA) ignominious sense of bondage.<br>But now, you (as reluctant spiritual authority) will deny ignominiously maintaining me in *bondage*: scorning my (as new GR) retaliatory quest for retribution. |
| CRIMINAL DESPERATION | DISQUALIFIED SUBJUGATION |
| Previously, you (as humanitarian authority) have subjugated in bondage, in response to the desperate quest for retribution of the spiritual disciple.<br>But now, I (as new spiritual disciple) will *desperately* seek retribution against you: in anticipation of your (as established HA) subjugation of me in bondage. | Previously, I (as new spiritual disciple) have desperately sought retribution against you: in anticipation of your (as established HA) subjugation of me in bondage.<br>But now, you (as reluctant humanitarian authority) will deny *subjugating* me in bondage: scorning my (as new SD) desperate quest for retribution. |
| CRIMINAL MENDACITY | DISQUALIFIED BIGOTRY |
| Previously, you (as transcendental authority) have bigotedly acted in a subjugating fashion, in response to the desperate sense of mendacity of the represent. member of humanity.<br>But now, I (as new representative member of humanity) will desperately act in a *mendacious* fashion towards you: in anticipation of your (as established TA) bigoted treatment of me. | Previously, I (as new representative member of humanity) have desperately acted mendaciously towards you: in anticipation of your (as established TA) bigoted treatment of me.<br>But now, you (as reluctant transcendental authority) will deny subjugating me in a *bigoted* fashion: scorning my (as new RH) desperate sense of mendacity. |

Fig. 12-B

| | |
|---|---|
| CRIMINAL GRUDGINGNESS<br>Previously, I (as group authority) have crassly acted in a dispassionate fashion, in response to the grudging treatment of the personal follower.<br>But now, you (as new personal follower) will *grudgingly* act in a punitive fashion towards me: in anticipation of my (as established GA) crassly-dispassionate treatment of you. | DISQUALIFIED CRASSNESS<br>Previously, you (as new personal follower) have grudgingly acted punitively towards me: in anticipation of my (as established GA) crassly-dispassionate treatment of you.<br>But now, I (as reluctant group authority) will deny *crassly* acting dispassionately towards you: scorning your (as new PF) grudging treatment of me. |
| CRIMINAL LECHERY<br>Previously, I (as spiritual authority) have crassly acted in a rude fashion, in response to the lecherously-grudging treatment of the group representative.<br>But now, you (as new group representative) will *lecherously* act in a grudging fashion towards me: in anticipation of my (as established SA) crassly-rude treatment of you. | DISQUALIFIED RUDENESS<br>Previously, you (as new group representative) have lecherously acted grudgingly towards me: in anticipation of my (as established SA) crassly-rude treatment of you.<br>But now, I (as reluctant spiritual authority) will deny crassly acting *rudely* towards you: scorning your (as new GR) lecherously-grudging treatment of me. |
| CRIMINAL GREED<br>Previously, I (as humanitarian authority) have brutally acted in a rude fashion, in response to the lecherously-greedy treatment of the spiritual disciple.<br>But now, you (as new spiritual disciple) will lecherously act in a *greedy* fashion towards me: in anticipation of my (as established HA) brutally-rude treatment of you. | DISQUALIFIED BRUTALITY<br>Previously, you (as new spiritual disciple) have lecherously acted greedily towards me: in anticipation of my (as established HA) brutally-rude treatment of you.<br>But now, I (as reluctant humanitarian authority) will deny *brutally* acting rudely towards you: scorning your (as new SD) lecherous sense of greed. |
| CRIMINAL WICKEDNESS<br>Previously, I (as transcendental authority) have brutally acted in a mean fashion, in response to the wicked sense of greed of the representative member of humanity.<br>But now, you (as new representative member of humanity) will *wickedly* act in a greedy fashion towards me: in anticipation of my (as established TA) brutal sense of meanness. | DISQUALIFIED MEANNESS<br>Previously, you (as new representative member of humanity) have wickedly acted greedily towards me: in anticipation of my (as established TA) brutal sense of meanness.<br>But now, I (as reluctant transcendental authority) will deny brutally acting in a *mean* fashion towards you: scorning your (as new RH) wicked sense of greed. |

Fig. 12-C

| | |
|---|---|
| CRIMINAL MALEVOLENCE<br>Previously, I (as group authority) have callously acted in a fickle fashion, in response to the malevolent treatment of the personal follower.<br>But now, you (as new personal follower) will *malevolently* act in a punitive fashion towards me: in anticipation of my (as established GA) callous sense of fickleness. | DISQUALIFIED FICKLENESS<br>Previously, you (as new personal follower) have malevolently acted punitively towards me: in anticipation of my (as established GA) callous sense of fickleness.<br>But now, I (as reluctant group authority) will deny callously acting *ficklely* towards you: scorning your (as new PF) malevolent treatment of me. |
| CRIMINAL PUSILLANIMITY<br>Previously, I (as spiritual authority) have ficklely acted in a wanton fashion, in response to the malevolent sense of pusillanimity of the group representative.<br>But now, you (as new group representative) will malevolently act in a *pusillanimous* fashion towards me: in anticipation of my (as established SA) wanton treatment of you. | DISQUALIFIED WANTONNESS<br>Previously, you (as new group representative) have malevolently acted in a pusillanimous fashion towards me: in anticipation of my (as established SA) wanton treatment of you.<br>But now, I (as reluctant spiritual authority) will deny ficklely acting in a *wanton* fashion towards you: scorning your (as new GR) malevolent sense of pusillanimity |
| CRIMINAL CONTENTION<br>Previously, I (as humanitarian authority) have wantonly acted in a tormenting fashion, in response to the pusillanimous sense of contentiousness of the spiritual disciple.<br>But now, you (as new spiritual disciple) will pusillanimously act *contentiously* towards me: in anticipation of my (as established HA) tormentful treatment of you. | DISQUALIFIED TORMENT<br>Previously, you (as new spiritual disciple) have pusillanimously acted contentiously towards me: in anticipation of my (as established HA) tormentful treatment of you.<br>But now, I (as reluctant humanitarian authority) will deny wantonly *tormenting* you: scorning your (as new SD) contentious treatment of me. |
| CRIMINAL RUTHLESSNESS<br>Previously, I (as transcendental authority) have atrociously acted tormentingly, in response to the ruthless-contentiousness of the representative member of humanity.<br>But now, you (as new representative member of humanity) will *ruthlessly* act contentiously towards me: in anticipation of my (as established TA) atrocious treatment of you. | DISQUALIFIED ATROCITY<br>Previously, you (as new representative member of humanity) have ruthlessly acted contentiously towards me: in anticipation of my (as estab.TA) atrocious treatment of you.<br>But now, I (as reluctant transcendental authority) will deny *atrociously*-tormenting you: scorning your (as new RH) ruthless sense of contentiousness. |

Fig. 12-D

| CRIMINAL SLOTH | DISQUALIFIED MUTINY |
|---|---|
| Previously, I (as personal follower) have mutinously acted punitively, in response to the slothful treatment of the personal authority.<br><br>But now, you (as new personal authority) will *slothfully* fail to act solicitously towards me: in anticipation of my (as established PF) mutinous treatment of you. | Previously, you (as new personal authority) have slothfully failed to act solicitously towards me: in anticipation of my (as established PF) mutinous treatment of you.<br><br>But now, I (as reluctant personal follower) will deny *mutinously* acting punitively towards you: scorning your (as new PA) slothful treatment of me. |
| CRIMINAL NOTORIETY | DISQUALIFIED REBELLION |
| Previously, I (as group representative) have mutinously acted in a rebellious fashion, in response to the slothful sense of notoriety of the group authority.<br>But now, you (as new group authority) will slothfully act in a *notorious* fashion towards me: in anticipation of my (as established GR) mutinous-rebellion against you. | Previously, you (as new group authority) have slothfully acted in a notorious fashion towards me: in anticipation of my (as established GR) mutinous-rebellion against you.<br>But now, I (as reluctant group representative) will deny mutinously-*rebelling* against you: scorning your (as new GA) notorious treatment of me. |
| CRIMINAL SCANDALOUSNESS | DISQUALIFIED TREASON |
| Previously, I (as spiritual disciple) have treasonously acted in a rebellious fashion, in response to the scandalous sense of notoriety of the spiritual authority.<br>But now, you (as new spiritual authority) will notoriously act in a *scandalous* fashion towards me: in anticipation of my (as established SD) treasonous-rebellion against you | Previously, you (as new spiritual authority) have notoriously acted scandalously towards me: in anticipation of my (as established SD) treasonous-rebellion against you.<br>But now, I (as reluctant spiritual disciple) will deny *treasonously-*rebelling against you: scorning your (as new SA) scandalous sense of notoriety. |
| CRIMINAL DISGRACEFULNESS | DISQUALIFIED VILENESS |
| Previously, I (as representative member of humanity) have treasonously acted vilely, in response to the scandalous sense of disgracefulness of the humanitarian authority.<br>But now, you (as new humanitarian authority) will scandalously act *disgracefully* towards me: in anticipation of my (as established RH) vile sense of treason. | Previously, you (as new humanitarian authority) have scandalously acted disgracefully towards me: in anticipation of my (as established RH) vile sense of treason.<br>But now, I (as reluctant representative member of humanity) will deny treasonously acting in a *vile* fashion towards you: scorning your (as new HA) disgraceful treatment of me. |

Fig. 13-A

| CRIMINAL CARELESSNESS | DISQUALIFIED RETALIATION |
|---|---|
| Previously, I (as personal follower) have punitively acted in a retaliatory fashion, in response to the careless treatment of the personal authority.<br>But now, you (as new personal authority) will *carelessly* fail to act submissively towards me: in anticipation of my (as established PF) retaliatory treatment of you. | Previously, you (as new personal authority) have carelessly failed to act submissively towards me: in anticipation of my (as established PF) retaliatory treatment of you.<br><br>But now, I (as reluctant personal follower) will deny punitively *retaliating* against you: scorning your (as new PA) careless treatment of me. |
| CRIMINAL IGNOMINY | DISQUALIFIED RETRIBUTION |
| Previously, I (as group representative) have retaliatively sought retribution, in response to the ignominious sense of carelessness of the group authority.<br>But now, you (as new group authority) will *ignominiously* act in a careless fashion towards me: in anticipation of my (as established GR) retaliatory quest for retribution. | Previously, you (as new group authority) have ignominiously acted carelessly towards me: in anticipation of my (as established GR) retaliatory quest for retribution.<br>But now, I (as reluctant group representative) will deny retaliatively seeking *retribution* against you: scorning your (as new GA) ignominious treatment of me. |
| CRIMINAL BONDAGE | DISQUALIFIED DESPERATION |
| Previously, I (as spiritual disciple) have desperately sought retribution, in response to the ignominious sense of bondage of the spiritual authority.<br><br>But now, you (as new spiritual authority) will ignominiously maintain me in *bondage*: in anticipation of my (as established SD) desperate quest for retribution. | Previously, you (as new spiritual authority) have ignominiously maintained me in bondage: in anticipation of my (as established SD) desperate quest for retribution.<br>But now, I (as reluctant spiritual disciple) will deny *desperately* seeking retribution against you: scorning your (as new SA) ignominious sense sense of bondage. |
| CRIMINAL SUBJUGATION | DISQUALIFIED MENDACITY |
| Previously, I (as representative member of humanity) have desperately acted in a mendacious fashion, in response to the subjugating-bondage of the humanitarian authority.<br>But now, you (as new humanitarian authority) will *subjugate* me in bondage: in anticipation of my (as established RH) desperate sense of mendacity. | Previously, you (as new humanitarian authority) have subjugated me in bondage: in anticipation of my (as established RH) desperate sense of mendacity.<br>But now, I (as reluctant representative member of humanity) will deny desperately acting in a *mendacious* fashion towards you: scorning your (as new HA) subjugation of me. |

Fig. 13-B

| CRIMINAL DISPASSIONATENESS | DISQUALIFIED GRUDGINGNESS |
|---|---|
| Previously, you (as personal follower) have grudgingly acted punitively, in response to the dispassionate treatment of the personal authority.<br>But now, I (as new personal authority) will *dispassionately* fail to act solicitously towards you: in anticipation of your (as established PF) grudging treatment of me. | Previously, I (as new personal authority) have dispassionately failed to act solicitously towards you: in anticipation of your (as established PF) grudging treatment of me.<br>But now, you (as reluctant personal follower) will deny *grudgingly* acting punitively towards me: scorning my (as new PA) dispassionate treatment of you. |
| CRIMINAL CRASSNESS | DISQUALIFIED LECHERY |
| Previously, you (as group representative) have lecherously acted in a grudging fashion, in response to the crassly-dispassionate treatment of the group authority.<br>But now, I (as new group authority) will *crassly* act in a dispassionate fashion towards you: in anticipation of your (as established GR) lecherously-grudging treatment of me. | Previously, I (as new group authority) have crassly acted dispassionately towards you: in anticipation of your (as established GR) lecherously-grudging treatment of me.<br>But now, you (as reluctant group representative) deny *lecherously* acting grudgingly towards me: scorning my (as new GA) crassly-dispassionate treatment of |
| CRIMINAL RUDENESS | DISQUALIFIED GREED |
| Previously, you (as spiritual disciple) have lecherously acted in a greedy fashion, in response to the crassly-rude treatment of the spiritual authority.<br>But now, I (as new spiritual authority) will crassly act in a *rude* fashion towards you: in anticipation of your (as established SD) lecherously-greedy treatment of me. | Previously, I (as new spiritual authority) have crassly acted rudely towards you: in anticipation of your (as established SD) lecherously-greedy treatment of me.<br>But now, you (as reluctant spiritual disciple) will deny lecherously acting *greedily* towards me: scorning my (as new SA) crassly-rude treatment of you. |
| CRIMINAL BRUTALITY | DISQUALIFIED WICKEDNESS |
| Previously, you (as representative member of humanity) have wickedly acted in a greedy fashion, in response to the brutally-rude treatment of the humanitarian authority.<br>But now, I (as new humanitarian authority) will *brutally* act in a rude fashion towards you: in anticipation of your (as established RH) wicked sense of greed. | Previously, I (as new humanitarian authority) have brutally acted rudely towards you: in anticipation of your (as established RH) wicked sense of greed.<br>But now, you (as reluctant representative member of humanity) will deny *wickedly* acting greedily towards me: scorning my (as new HA) brutally-rude treatment of you. |

Fig. 13-C

| CRIMINAL CALLOUSNESS | DISQUALIFIED MALEVOLENCE |
|---|---|
| Previously, you (as personal follower) have malevolently acted punitively, in response to the callous treatment of the personal authority.<br><br>But now, I (as new personal authority) will *callously* fail to act submissively towards you: in anticipation of your (as established PF) malevolent treatment of me. | Previously, I (as new personal authority) have callously failed to act submissively towards you: in anticipation of your (as established PF) malevolent treatment of me.<br>But now, you (as reluctant personal follower) will deny *malevolently* acting punitively towards me: scorning my (as new PA) callous treatment of you. |
| CRIMINAL FICKLENESS | DISQUALIFIED PUSILLANIMITY |
| Previously, you (as group representative) have malevolently acted in a pusillanimous fashion, in response to the callous sense of fickleness of the group authority.<br>But now, I (as new group authority) will callously act in a *fickle* fashion towards you: in anticipation of your (as established GR) malevolent sense of pusillanimity. | Previously, I (as new group authority) have callously acted in a fickle fashion towards you: in anticipation of your (as established GR) malevolent sense of pusillanimity.<br>But now, you (as reluctant group representative) will deny malevolently acting with *pusillanimity* towards me: scorning my (as new GA) callous sense of fickleness. |
| CRIMINAL WANTONNESS | DISQUALIFIED CONTENTION |
| Previously, you (as spiritual disciple) have pusillanimously acted in a contentious fashion, in response to the wanton sense of fickleness of the spiritual authority.<br>But now, I (as new spiritual authority) will *wantonly* act in a fickle fashion towards you: in anticipation of your (as established SD) pusillanimous sense of contentiousness. | Previously, I (as new spiritual authority) have wantonly acted ficklely towards you: in anticipation of your (as established SD) pusillanimous sense of contentiousness.<br>But now, you (as reluctant spiritual disciple) will deny pusillanimously acting *contentiously* towards me: scorning my (as new SA) wanton sense of fickleness. |
| CRIMINAL TORMENT | DISQUALIFIED RUTHLESSNESS |
| Previously, you (as representative member of humanity) have ruthlessly acted contentiously, in response to the wanton sense of torment of the humanitarian authority.<br>But now, I (as new humanitarian authority) will wantonly-*torment* you: in anticipation of your (as established RH) ruthless sense of contentiousness. | Previously, I (as new humanitarian authority) have wantonly-tormented you: in anticipation of your (as established RH) ruthless sense of contentiousness.<br>But now, you (as reluctant represent. member of humanity) will deny *ruthlessly* acting contentiously towards me: scorning my (as new HA) tormentful treatment of you. |

Fig. 13-D

| CRIMINAL *HYPER*-MUTINY | DISQUALIFIED *H*-NOTORIETY |
|---|---|
| Previously, you (as group authority) have excessively acted in a notorious fashion, in response to the extremely mutinous treatment of the personal follower.<br>But now, I (as new personal follower) will *mutinously* act in a hyperviolent fashion towards you: in anticipation of your (as established GA) excessively notorious treatment of me. | Previously, I (as new personal follower) have mutinously acted hyperviolently towards you: in anticipation of your (as established GA) excessively notorious treatment of me.<br>But now, you (as reluctant group authority) will deny *notoriously* acting hyperviolently towards me: scorning my (as new PF) extremely mutinous treatment of you. |
| CRIMINAL *HYPER*-REBELLION | DISQUALIFIED *H*-SCANDAL |
| Previously, you (as spiritual authority) have excessively acted in a scandalous fashion, in response to the extremely rebellious treatment of the group representative.<br>But now, I (as new group representative) will *rebelliously* act hyperviolently towards you: in anticipation of your (as established SA) excessively scandalous treatment of me. | Previously, I (as new group representative) have rebelliously acted hyperviolently towards you: in anticipation of your (as establ. SA) excessively scandalous treatment of me.<br>But now, you (as reluctant spiritual authority) will deny *scandalously* acting hyperviolently towards me: scorning my (as new GR) extreme sense of rebellion. |
| CRIMINAL *HYPER*-TREASON | DISQUALIFIED *H*-DISGRACE |
| Previously, you (as humanitarian authority) have excessively acted in a disgraceful fashion, in response to the extremely treasonous treatment of the spiritual disciple.<br>But now, I (as new spiritual disciple) will *treasonously* act in a hyperviolent fashion towards you: in anticipation of your (as established HA) excessively disgraceful treatment of me. | Previously, I (as new spiritual disciple) have treasonously acted hyperviolently towards you: in anticipation of your (as established HA) excessively disgraceful treatment of me.<br>But now, you (as reluctant humanitarian authority) will deny *disgracefully* acting hyperviolently towards me: scorning my (as new SD) extreme sense of treason. |
| CRIMINAL *HYPER*-VILENESS | DISQUALIFIED *HYPER*-FURY |
| Previously, you (as transcendental authority) have excessively acted in a furious fashion, in response to the extreme sense of vileness of the representative member of humanity.<br>But now, I (as new representative member of humanity) will *vilely* act hyperviolently towards you: in anticipation of your (as established TA) excessively furious treatment of me. | Previously, I (as new representative member of humanity) have vilely acted hyperviolently towards you: in anticipation of your (as established TA) excessive sense of fury.<br>But now, you (as reluctant transcendental authority) will deny *furiously* acting hyperviolently towards me: scorning my (as new RH) extreme sense of vileness. |

Fig. 14-A

| CRIMINAL *HYPER*-RETALIATION | DISQUALIFIED *HYPER*-IGNOMINY |
|---|---|
| Previously, you (as group authority) have excessively acted ignominiously, in response to the extremely retaliatory treatment of the personal follower.<br>But now, I (as new personal follower) will *retaliatively* act hyperviolently towards you: in anticipation of your (as established GA) excessive sense of ignominy. | Previously, I (as new personal follower) have retaliatively acted hyperviolently towards you: in anticipation of your (as established GA) excessive sense of ignominy.<br>But now, you (as reluctant group authority) will deny *ignominiously* acting hyperviolently towards me: scorning my (as new PF) extremely retaliatory treatment of you. |
| **CRIMINAL *HYPER*-RETRIBUTION** | **DISQUALIFIED *HYPER*-BONDAGE** |
| Previously, you (as spiritual authority) have excessively acted in a bondageful fashion, in response to the extreme retribution of the group representative.<br>But now, I (as new group representative) will hyperviolently seek *retribution* towards you: in anticipation of your (as established SA) excessive sense of bondage. | Previously, I (as new group representative) have hyperviolently sought retribution towards you: in anticipation of your (as established SA) excessive sense of bondage.<br><br>But now, you (as reluctant spiritual authority) will deny hyperviolently *bondaging* me: scorning my (as new GR) extreme sense of retribution. |
| **CRIMINAL *HYPER*-DESPERATION** | **DISQUALIFIED *H*-SUBJUGATION** |
| Previously, you (as humanitarian authority) have excessively expressed subjugation, in response to the extremely desperate treatment of the spiritual disciple.<br>But now, I (as new spiritual disciple) will *desperately* act hyperviolently towards you: in anticipation of your (as established HA) excessive subjugation of me. | Previously, I (as new spiritual disciple) have desperately acted hyperviolently towards you: in anticipation of your (as established HA) excessive subjugation of me.<br>But now, you (as reluctant humanitarian authority) will deny hyperviolently *subjugating* me: scorning my (as new SD) extremely desperate treatment of you. |
| **CRIMINAL *HYPER*-MENDACITY** | **DISQUALIFIED *H*-BIGOTRY** |
| Previously, you (as transcendental authority) have excessively acted in a bigoted fashion, in response to the extreme sense of mendacity of the representative member of humanity.<br>But now, I (as new representative member of humanity) will *mendaciously* act hyperviolently towards you: in anticipation of your (as establ. TA) excessive sense of bigotry. | Previously, I (as new representative member of humanity) have mendaciously acted hyperviolently towards you: in anticipation of your (as establ. TA) excessive sense of bigotry.<br>But now, you (as reluctant transcendental authority) will deny *bigotedly* acting hyperviolently towards me: scorning my (as new RH) extreme sense of mendacity. |

Fig. 14-B

| CRIMINAL *HYPER*-GRUDGING | DISQUALIF. *HYPER*-CRASSNESS |
|---|---|
| Previously, I (as group authority) have extremely acted in a *crass* fashion, in response to the excessively grudging treatment of the personal follower.<br>But now, you (as new personal follower) will *grudgingly* act hyperviolently towards me: in anticipation of my (as established GA) extreme sense of crassness. | Previously, you (as new personal follower) have grudgingly acted hyperviolently towards me: in anticipation of my (as established GA) extreme sense of crassness.<br>But now, I (as reluctant group authority) will deny *crassly* acting in a hyperviolent fashion towards you: scorning your (as new PF) excessively grudging treatment of me |
| CRIMINAL *HYPER*-LECHERY | DISQUALIFIED *H*-RUDENESS |
| Previously, I (as spiritual authority) have extremely acted in a rude fashion, in response to the excessively lecherous treatment of the group representative.<br>But now, you (as new group representative) will *lecherously* act in a hyperviolent fashion towards me: in anticipation of my (as established SA) extreme sense of rudeness. | Previously, you (as new group representative) have lecherously acted in a hyperviolent fashion towards me: in anticipation of my (as established SA) extreme sense of rudeness.<br>But now, I (as reluctant spiritual authority) will deny *rudely* acting in a hyperviolent fashion towards you: scorning your (as new GR) excessive sense of lechery. |
| CRIMINAL *HYPER*-GREED | DISQUALIF. *HYPER*-BRUTALITY |
| Previously, I (as humanitarian authority) have extremely acted in a brutal fashion, in response to the excessively greedy treatment of the spiritual disciple.<br>But now, you (as new spiritual disciple) will *greedily* act in a hyperviolent fashion: in anticipation of my (as established HA) extreme sense of brutality. | Previously, you (as new spiritual disciple) have greedily acted in a hyperviolent fashion towards me: in anticipation of my (as established HA) extreme sense of brutality.<br>But now, I (as reluctant humanitarian authority) will deny *brutally* acting hyperviolently towards you: scorning your (as new SD) excessively greedy treatment of me. |
| CRIMINAL *HYPER*-WICKEDNESS | DISQUALIF. *HYPER*-MEANNESS |
| Previously, I (as transcendental authority) have extremely acted in a mean fashion, in response to the excessively wicked treatment of the representative member of humanity.<br>But now, you (as new representative member of humanity) will *wickedly* act hyperviolently towards me: in anticipation of my (as established TA) extreme sense of meanness. | Previously, you (as new representative member of humanity) have wickedly acted hyperviolently towards me: in anticipation of my (as establ. TA) extreme sense of meanness.<br>But now, I (as reluctant transcendental authority) will deny *meanly* acting hyperviolently towards you: scorning your (as new RH) excessively wicked treatment of me. |

Fig. 14-C

| CRIMINAL *H*-MALEVOLENCE | DISQUALIF. *HYPER*-FICKLENESS |
|---|---|
| Previously, I (as group authority) have extremely acted in a fickle fashion, in response to the excessively malevolent treatment of the personal follower.<br>But now, you (as new personal follower) will malevolently act hyperviolently towards me: in anticipation of my (as established GA) extremely fickle treatment of you. | Previously, you (as new personal follower) have malevolently acted hyperviolently towards me: in anticipation of my (as established GA) extremely fickle treatment of you.<br>But now, I (as reluctant group authority) will deny *ficklely* acting hyperviolently towards you: scorning your (as new PF) excessively malevolent treatment of me. |
| CRIMINAL *H*-PUSILLANIMITY | DISQUALIFIED *H*-WANTONNESS |
| Previously, I (as spiritual authority) have extremely acted in a wanton fashion, in response to the excessively pusillanimous treatment of the group representative.<br>But now, you (as new group representative) will pusillanimously act hyperviolently towards me: in anticipation of my (as established SA) extremely wanton treatment of you. | Previously, you (as new group representative) have pusillanimously acted hyperviolently towards me: in anticipation of my (as established SA) extremely wanton treatment of you.<br>But now, I (as reluctant spiritual authority) will deny *wantonly* acting hyperviolently towards you: scorning your (as new GR) excessively pusillanimous treatment of me. |
| CRIMINAL *HYPER*-CONTENTION | DISQUALIFIED *HYPER*-TORMENT |
| Previously, I (as humanitarian authority) have extremely acted in a tormentful fashion, in response to the excessively contentious treatment of the spiritual disciple.<br>But now, you (as new spiritual disciple) will contentiously act hyperviolently towards me: in anticipation of my (as established HA) extreme sense of torment. | Previously, you (as new spiritual disciple) have contentiously acted hyperviolently towards me: in anticipation of my (as established HA) extreme sense of torment.<br>But now, I (as reluctant humanitarian authority) will deny *tormentfully* acting hyperviolently towards you: scorning your (as new SD) excessively contentious treatment of me. |
| CRIMINAL *H*-RUTHLESSNESS | DISQUALIFIED *H*-ATROCITY |
| Previously, I (as transcendental authority) have extremely acted in an atrocious fashion, in response to the excessively ruthless treatment of the representative member of humanity.<br>But now, you (as new representative member of humanity) will ruthlessly act hyperviolently towards me: in anticipation of my (as established TA) extreme sense of atrocity. | Previously, you (as new representative member of humanity) have ruthlessly acted hyperviolently towards me: in anticipation of my (as establ.TA) extreme sense of atrocity.<br>But now, I (as reluctant transcendental authority) will deny *atrociously* acting hyperviolently towards you: scorning your (as new RH) excessively ruthless treatment of me. |

Fig. 14-D

| CRIMINAL *HYPER*-SLOTH | DISQUALIFIED *HYPER*-MUTINY |
|---|---|
| Previously, I (as personal follower) have extremely acted in a mutinous fashion, in response to the excessively slothful treatment of the personal authority.<br>But now, you (as new personal authority) will *slothfully* act hyperviolently towards me: in anticipation of my (as established PF) extremely mutinous treatment of you. | Previously, you (as new personal authority) have slothfully acted hyperviolently towards me: in anticipation of my (as established PF) extremely mutinous treatment of you.<br>But now, I (as reluctant personal follower) will deny *mutinously* acting hyperviolently towards you: scorning your (as new PA) excessively slothful treatment of me. |
| CRIMINAL *HYPER*-NOTORIETY | DISQUALIFIED *H*-REBELLION |
| Previously, I (as group representative) have extremely acted in rebellious fashion, in response to the excessively notorious treatment of the group authority.<br>But now, you (as new group authority) will *notoriously* act hyperviolently towards me: in anticipation of my (as established GR) extremely rebellious treatment of you. | Previously, you (as new group authority) have notoriously acted hyperviolently towards me: in anticipation of my (as established GR) extremely rebellious treatment of you.<br>But now, I (as reluctant group representative) will deny *rebelliously* acting hyperviolently towards you: scorning your (as new GA) excessively notorious treatment of me. |
| CRIMINAL *HYPER*-SCANDAL | DISQUALIFIED *HYPER*-TREASON |
| Previously, I (as spiritual disciple) have extremely acted in a treasonous fashion, in response to the excessively scandalous treatment of the spiritual authority.<br>But now, you (as new spiritual authority) will *scandalously* act hyperviolently towards me: in anticipation of my (as established SD) extremely treasonous treatment of you. | Previously, you (as new spiritual authority) have scandalously acted hyperviolently towards me: in anticipation of my (as established SD) extremely treasonous treatment of you.<br>But now, I (as reluctant spiritual disciple) will deny *treasonously* acting hyperviolently towards you: scorning your (as new SA) excessively scandalous treatment of me. |
| CRIMINAL *HYPER*-DISGRACE | DISQUALIFIED *HYPER*-VILENESS |
| Previously, I (as representative member of humanity) have extremely acted in a vile fashion, in response to the excessively disgraceful treatment of the humanitarian authority.<br>But now, you (as new humanitarian authority) will *disgracefully* act hyperviolently towards me: in anticipation of my (as established RH) extremely vile treatment of you. | Previously, you (as new humanitarian authority) have disgracefully acted hyperviolently towards me: in anticipation of my (as established RH) extremely vile treatment of you.<br>But now, I (as reluctant representative member of humanity) will deny *vilely* acting hyperviolently towards you: scorning your (as new HA) excessively disgraceful treatment of me |

Fig. 15-A

| CRIMINAL *H*-CARELESSNESS | DISQUALIFIED *H*-RETALIATION |
|---|---|
| Previously, I (as personal follower) have extremely acted in a retaliatory fashion, in response to the excessively careless treatment of the personal authority.<br>But now, you (as new personal authority) will *carelessly* act hyperviolently towards me: in anticipation of my (as established PF) extreme retaliation against you. | Previously, you (as new personal authority) have carelessly acted hyperviolently towards me: in anticipation of my (as established PF) extreme retaliation against you.<br>But now, I (as reluctant personal follower) will deny hyperviolently *retaliating* against you: scorning your (as new PA) excessively careless treatment of me. |
| CRIMINAL *HYPER*-IGNOMINY | DISQUALIFIED *H*-RETRIBUTION |
| Previously, I (as group representative) have extremely acted in a retributive fashion, in response to the excessively ignominious treatment of the group authority.<br>But now, you (as new group authority) will *ignominiously* act hyperviolently towards me: in anticipation of my (as established GR) extreme sense of retribution. | Previously, you (as new group authority) have ignominiously acted hyperviolently towards me: in anticipation of my (as established GR) extreme sense of retribution.<br>But now, I (as reluctant group representative) will deny hyperviolently seeking *retribution* against you: scorning your (as new GA) excessively ignominious treatment of me. |
| CRIMINAL *HYPER*-BONDAGE | DISQUALIFIED *H*-DESPERATION |
| Previously, I (as spiritual disciple) have extremely acted in a desperate fashion, in response to the excessive sense of bondage of the spiritual authority.<br>But now, you (as new spiritual authority) will hyperviolently maintain me in *bondage*: in anticipation of my (as established SD) extremely desperate treatment of you. | Previously, you (as new spiritual authority) have hyperviolently maintained me in bondage: in anticipation of my (as established SD) extremely desperate treatment of you.<br>But now, I (as reluctant spiritual disciple) will deny *desperately* acting hyperviolently towards you: scorning your (as new SA) excessive sense of bondage. |
| CRIMINAL *HYPER*-SUBJUGATION | DISQUALIFIED *H*-MENDACITY |
| Previously, I (as representative member of humanity) have extremely acted mendaciously, in response to the excessive subjugation of the humanitarian authority.<br>But now, you (as new humanitarian authority) will *subjugate* me in a hyperviolent fashion: in anticipation of my (as established RH) extreme sense of mendacity. | Previously, you (as new humanitarian authority) have subjugated me in a hyperviolent fashion: in anticipation of my (as established RH) extreme sense of mendacity.<br>But now, I (as reluctant representative member of humanity) will deny *mendaciously* acting hyperviolently towards you: scorning your (as new HA) excessive subjugation of me. |

Fig. 15-B

| CRIMINAL *HYPER*-DISPASSION | DISQUALIF. *H*-GRUDGINGNESS |
|---|---|
| Previously, you (as personal follower) have excessively acted in a grudging fashion, in response to the extremely dispassionate treatment of the personal authority.<br>But now, I (as new personal authority) will *dispassionately* act hyperviolently towards you: in anticipation of your (as established PF) excessively grudging treatment me. | Previously, I (as new personal authority) have dispassionately acted hyperviolently towards you: in anticipation of your (as establ. PF) excessively grudging treatment of me.<br>But now, you (as reluctant personal follower) will deny *grudgingly* acting hyperviolently towards me: scorning my (as new PA) extremely dispassionate treatment of you. |
| CRIMINAL *HYPER*-CRASSNESS | DISQUALIFIED *HYPER*-LECHERY |
| Previously, you (as group representative) have excessively acted in a lecherous fashion, in response to the extremely crass treatment of the group authority.<br>But now, I (as new group authority) will *crassly* act in a hyperviolent fashion towards you: in anticipation of your (as established GR) excessively lecherous treatment of me. | Previously, I (as new group authority) have crassly acted hyperviolently towards you: in anticipation of your (as established GR) excessively lecherous treatment of me.<br>But now, you (as reluctant group representative) will deny *lecherously* acting hyperviolently towards me: scorning my (as new GA) extremely crass treatment of you. |
| CRIMINAL *HYPER*-RUDENESS | DISQUALIFIED *HYPER*-GREED |
| Previously, you (as spiritual disciple) have excessively acted in a greedy fashion, in response to the extremely rude treatment of the spiritual authority.<br>But now, I (as new spiritual authority) will *rudely* act hyperviolently towards you: in anticipation of your (as established SD) excessively greedy treatment of me. | Previously, I (as new spiritual authority) have rudely acted hyperviolently towards you: in anticipation of your (as established SD) excessively greedy treatment of me.<br>But now, you (as reluctant spiritual disciple) will deny *greedily* acting hyperviolently towards me: scorning my (as new SA) extremely rude treatment of you. |
| CRIMINAL *HYPER*-BRUTALITY | DISQUALIFIED *H*-WICKEDNESS |
| Previously, you (as representative member of humanity) have excessively acted wickedly, in response to the extremely brutal treatment of the humanitarian authority.<br>But now, I (as new humanitarian authority) will *brutally* act in hyperviolent fashion towards you: in anticipation of your (as established RH) excessively wicked treatment of me. | Previously, I (as new humanitarian authority) have brutally acted hyperviolently towards you: in anticipation of your (as established RH) excessively wicked treatment of me.<br>But now, you (as reluctant representative member of humanity) will deny *wickedly* acting hyperviolently towards me: scorning my (as new HA) extreme sense of brutality. |

Fig. 15-C

| CRIMINAL *HYPER*-CALLOUSNESS | DISQUALIFIED *H*-MALEVOLENCE |
|---|---|
| Previously, you (as personal follower) have excessively acted in a malevolent fashion, in response to the extremely callous treatment of the personal authority.<br>But now, I (as new personal authority) will *callously* act hyperviolently towards you: in anticipation of your (as established PF) excessively malevolent treatment of me. | Previously, I (as new personal authority) have callously acted hyperviolently towards you: in anticipation of your (as established PF) excessively malevolent treatment of me<br>But now, you (as reluctant personal follower) will deny *malevolently* acting hyperviolently towards me: scorning my (as new PA) extremely callous treatment of you. |
| **CRIMINAL *HYPER*-FICKLENESS** | **DISQUALIFIED *H*-PUSILLANIMITY** |
| Previously, you (as group representative) have excessively acted in a pusillanimous fashion, in response to the extremely fickle treatment of the group authority.<br>But now, I (as new group authority) will *ficklely* act in a hyperviolent fashion towards you: in anticipation of your (as established GR) excessively pusillanimous treatment of me. | Previously, I (as new group authority) have ficklely acted hyperviolently towards you: in anticipation of your (as established GR) excessively pusillanimous treatment of me.<br>But now, you (as reluctant group representative) will deny *pusillanimously* acting hyperviolently towards me: scorning my (as new GA) extremely fickle treatment of you. |
| **CRIMINAL *HYPER*-WANTONNESS** | **DISQUALIFIED *H*-CONTENTION** |
| Previously, you (as spiritual disciple) have excessively acted in a contentious fashion, in response to the extremely wanton treatment of the spiritual authority.<br>But now, I (as new spiritual authority) will *wantonly* act hyperviolently towards you: in anticipation of your (as established SD) excessively contentious treatment of me. | Previously, I (as new spiritual authority) have wantonly acted hyperviolently towards you: in anticipation of your (as established SD) excessively contentious treatment of me.<br>But now, you (as reluctant spiritual disciple) will deny *contentiously* acting hyperviolently towards me: scorning my (as new SA) extremely wanton treatment of you. |
| **CRIMINAL *HYPER*-TORMENT** | **DISQUALIFIED *H*-RUTHLESSNESS** |
| Previously, you (as representative member of humanity) have excessively acted ruthlessly, in response to the extreme sense of torment of the humanitarian authority.<br>But now, I (as new humanitarian authority) will *tormentingly* act hyperviolently towards you: in anticipation of your (as established RH) excessively ruthless treatment of me. | Previously, I (as new humanitarian authority) have tormentingly acted hyperviolently towards you: in anticipation of your (as established RH) excessively ruthless treatment of me.<br>But now, you (as reluctant represent. member of humanity) will deny *ruthlessly* acting hyperviolently towards me: scorning my (as new HA) extreme sense of torment. |

Fig. 15-D

| NARCISSISTIC PERSONALITY (B) | OBSESSION NEUROSIS (B) |
|---|---|
| Previously, I (as personal follower) have flatteringly acted in an excessively adoring fashion, in response to the prideful treatment of the personal authority.<br>But now, you (as new personal authority) will *pridefully* act in an extremely poignant fashion towards me: in anticipation of my (as established PF) flatterous treatment of you | Previously, you (as new personal authority) have pridefully acted in an extremely poignant fashion towards me: in anticipation of my (as establ. PF) flatterous treatment of you.<br>But now, I (as reluctant personal follower) will deny *flatteringly* acting in an excessively adoring fashion towards you: scorning your (as new PA) prideful treatment of me. |
| CONFABULATORY EUPHORIA (B) | CONFABULATORY PARAPHR. (B) |
| Previously, I (as group representative) have flatteringly acted in an adulatory fashion, in response to the vain sense of pride of the group authority.<br>But now, you (as new group authority) will *vainly* act in a prideful fashion towards me: in anticipation of my (as established GR) flattering sense of adulation. | Previously, you (as new group authority) have vainly acted pridefully towards me: in anticipation of my (as established GR) flattering sense of adulation.<br>But now, I (as reluctant group representative) will deny flatteringly expressing *adulation* towards you: scorning your (as new GA) vain sense of pride. |
| ENTHUSIASTIC EUPHORIA (B) | PROSKINETIC CATATONIA (B) |
| Previously, I (as spiritual disciple) have patronizingly expressed adulation, in response to the vain sense of conceit of the spiritual authority.<br><br>But now, you (as new spiritual authority) will vainly act in a *conceited* fashion towards me: in anticipation of my (as established SD) patronizing treatment of you. | Previously, you (as new spiritual authority) have vainly acted in a conceited fashion towards me: in anticipation of my (as established SD) patronizing treatment of you.<br>But now, I (as reluctant spiritual disciple) will deny *patronizingly* expressing adulation towards you: scorning your (as new SA) vain sense of conceit. |
| NON-PARTICIPATORY EUPH. (B) | SILLY HEBEPHRENIA (B) |
| Previously, I (as representative member of humanity) have indulgently acted patronizingly, in response to the pretentious sense of conceit of the humanitarian authority.<br>But now, you (as new humanitarian authority) will *pretentiously* act in a conceited fashion towards me: in anticipation of my (as established RH) indulgent treatment of you. | Previously, you (as new humanitarian authority) have pretentiously acted in a conceited fashion towards me: in anticipation of my (as est. RH) indulgent treatment of you.<br>But now, I (as reluctant represent. member of humanity) will deny *indulgently* acting patronizingly towards you: scorning your (as new HA) pretentious sense of conceit. |

Fig. 16-A

| BORDERLINE PERSONALITY (B) | PHOBIA NEUROSIS (B) |
|---|---|
| Previously, I (as personal follower) have critically acted in an extremely censuring fashion, in response to the shameful treatment of the personal authority.<br>But now, you (as new personal authority) will *shamefully* act in an excessively culpable fashion towards me: in anticipation of my (as established PF) critical treatment of you. | Previously, you (as new personal authority) have shamefully acted in an excessively culpable fashion towards me: in anticipation of my (as establ. PF) critical treatment of you.<br>But now, I (as reluctant personal follower) will deny *critically* acting in an extremely censuring fashion towards you: scorning your (as new PA) shameful treatment of me. |
| SUSPICIOUS DEPRESSION (B) | FANTASTIC PARAPHRENIA (B) |
| Previously, I (as group representative) have critically acted in a ridiculing fashion, in response to the shameful sense of humiliation of the group authority.<br>But now, you (as new group authority) will shamefully act in a *humiliated* fashion towards me: in anticipation of my (as established GR) critical-ridiculing of you. | Previously, you (as new group authority) have shamefully acted in a humiliated fashion towards me: in anticipation of my (as established GR) critical-ridiculing of you.<br><br>But now, I (as reluctant group representative) will deny critical-*ridiculing* you: scorning your (as new GA) shameful sense of humiliation. |
| SELF-TORTURING DEPRESS. (B) | NEGATIVISTIC CATATONIA (B) |
| Previously, I (as spiritual disciple) have scornfully acted in a ridiculing fashion, in response to the humiliated sense of mortification of the spiritual authority.<br>But now, you (as new spiritual authority) will humiliatingly act in a *mortified* fashion towards me: in anticipation of my (as established SD) scornful-ridiculing of you. | Previously, you (as new spiritual authority) have humiliatingly acted in a mortified fashion towards me: in anticipation of my (as established SD) scornful-ridiculing of you.<br><br>But now, I (as reluctant spiritual disciple) will deny *scornfully*-ridiculing you: scorning your (as new SA) mortified treatment of me. |
| NON-PARTICIPATORY DEPRE. (B) | INSIPID HEBREPHRENIA (B) |
| Previously, I (as representative member of humanity) have scornfully acted in a mocking fashion, in response to the mortified sense of anguish of the humanitarian authority.<br>But now, you (as new humanitarian authority) will mortifiedly act in an *anguished* fashion towards me: in anticipation of my (as established RH) scornful-mocking of you. | Previously, you (as new humanitarian authority) have mortifiedly acted in an anguished fashion towards me: in anticipation of my (as established RH) scornful-mocking of you.<br>But now, I (as reluctant representative member of humanity) will deny scornfully-*mocking* you: scorning your (as new HA) mortified sense of anguish. |

Fig. 16-B

| DEPENDENT PERSONALITY (B) | COMPULSION NEUROSIS (B) |
|---|---|
| Previously, you (as personal follower) have enviously acted in an excessively admiring fashion, in response to the impudent treatment of the personal authority.<br>But now, I (as new personal authority) will *impudently* act in an extremely passionate fashion towards you: in anticipation of your (as established PF) envious treatment of me. | Previously, I (as new personal authority) have impudently acted in an extremely passionate fashion towards you: in anticipation of your (as establ. PF) envious treatment of me.<br>But now, you (as reluctant personal follower) will deny *enviously* acting excessively admiringly towards me: scorning my (as new PA) impudent treatment of you. |
| PURE MANIA (B) | EXPANSIVE PARAPHRENIA (B) |
| Previously, you (as group representative) have enviously acted in a jealous fashion, in response to the impudent sense of arrogance of the group authority.<br>But now, I (as new group authority) will impudently act in an *arrogant* fashion towards you: in anticipation of your (as established GR) envious sense of jealousy. | Previously, I (as new group authority) have impudently acted in an arrogant fashion towards you: in anticipation of your (as established GR) envious sense of jealousy.<br>But now, you (as reluctant group representative) will deny enviously acting *jealously* towards me: scorning my (as new GA) impudent sense of arrogance. |
| UNPRODUCTIVE EUPHORIA (B) | PARAKINETIC CATATONIA (B) |
| Previously, you (as spiritual disciple) have jealously acted in a covetous fashion, in response to the arrogant sense of impetuosity of the spiritual authority.<br>But now, I (as new spiritual authority) will *impetuously* act in an arrogant fashion towards you: in anticipation of your (as established SD) covetous treatment of me. | Previously, I (as new spiritual authority) have impetuously acted in an arrogant fashion towards you: in anticipation of your (as established SD) covetous treatment of me.<br>But now, you (as reluctant spiritual disciple) will deny jealously acting *covetously* towards me: scorning my (as new SA) impetuous sense of arrogance. |
| HYPOCHONDRIACAL EUPH. (B) | ECCENTRIC HEBEPHRENIA (B) |
| Previously, you (as representative member of humanity) have covetously acted longingly, in response to the impetuous sense of presumption of the humanitarian authority.<br>But now, I (as new humanitarian authority) will impetuously act in a *presumptuous* fashion towards you: in anticipation of your (as established RH) covetous sense of longing. | Previously, I (as new humanitarian authority) have impetuously acted presumptuously towards you: in anticipation of your (as established RH) covetous sense of longing.<br>But now, you (as reluctant represent. member of humanity) will deny covetously acting *longingly* towards me: scorning my (as new HA) presumptuous treatment of you. |

Fig. 16-C

| AVOIDANT PERSONALITY (B) | ANXIETY NEUROSIS (B) |
|---|---|
| Previously, you (as my personal follower) have disdainfully acted in an excessively caring fashion, in response to the insolent treatment of the personal authority.<br>But now, I (as new personal authority) will insolently act in an extremely apprehensive fashion towards you: in anticipation of your (as established PF) disdainful treatment of me. | Previously, I (as new personal authority) have insolently acted in an extremely apprehensive fashion towards you: in anticipation of your (as estab PF) disdainful treatment of me.<br>But now, you (as reluctant personal follower) will deny *disdainfully* acting in an excessively caring fashion towards me: scorning my (as new PA) insolent treatment of you. |
| PURE MELANCHOLIA (B) | INCOHERENT PARAPHRENIA (B) |
| Previously, you (as group representative) have disdainfully acted in a contemptuous fashion, in response to the insolent sense of audacity of the group authority.<br>But now, I (as new group authority) will insolently act in an *audacious* fashion towards you: in anticipation of your (as established GR) disdainful sense of contempt. | Previously, I (as new group authority) have insolently acted in an audacious fashion towards you: in anticipation of your (as established GR) disdainful sense of contempt.<br>But now, you (as reluctant group representative) will deny disdainfully acting in a *contemptuous* fashion towards me: scorning my (as new GA) insolent sense of audacity. |
| HARRIED DEPRESSION (B) | AFFECTED CATATONIA (B) |
| Previously, you (as spiritual disciple) have contemptuously acted in a reproachful fashion, in response to the audacious sense of rashness of the spiritual authority.<br>But now, I (as new spiritual authority) will audaciously act in a *rash* fashion towards you: in anticipation of your (as established SD) contemptuous sense of reproach. | Previously, I (as new spiritual authority) have audaciously acted in a rash fashion towards you: in anticipation of your (as established SD) contemptuous sense of reproach.<br>But now, you (as reluctant spiritual disciple) will deny contemptuously acting in a *reproachful* fashion towards me: scorning my (as new SA) audacious sense of rashness. |
| HYPOCHONDRIACAL DEPR. (B) | AUTISTIC HEBEPHRENIA (B) |
| Previously, you (as represent. member of humanity) have reproachfully acted in a chagrined fashion, in response to the rash sense of boldness of the humanitarian authority.<br>But now, I (as new humanitarian authority) will rashly act in a *bold* fashion towards you: in anticipation of your (as established RH) chagrined treatment of me. | Previously, I (as new humanitarian authority) have rashly acted in a bold fashion towards you: in anticipation of your (as established RH) chagrined treatment of me.<br>But now, you (as reluctant represent. member of humanity) will deny reproachfully acting in a *chagrined* fashion towards me: scorning my (as new HA) bold treatment of you. |

Fig. 16-D

| HYSTRIONIC PERSONAL. (B) | DISSOCIATIVE HYSTERIA (B) |
|---|---|
| Previously, you (as group authority) have vainly acted in a prideful fashion, in response to the flattering treatment of the personal follower.<br>But now, I (as new personal follower) will *flatteringly* act in an extremely adoring fashion towards you: in anticipation of your (as established GA) vain sense of pride. | Previously, I (as new personal follower) have flatteringly acted in an extremely adoring fashion towards you: in anticipation of your (as established GA) vain sense of pride.<br>But now, you (as reluctant group authority) will deny *vainly* acting in a proud fashion towards me: scorning my (as new PF) flattering treatment of you. |
| HAPPINESS PSYCHOSIS (B) | A/L PARAPHR.-CONFAB. (B) |
| Previously, you (as spiritual authority) have vainly acted in a conceited fashion, in response to the flattering sense of adulation of the group representative.<br><br>But now, I (as new group representative) will flatteringly act with *adulation* towards you: in anticipation of your (as established SA) vain sense of conceit. | Previously, I (as new group representative) have flatteringly acted with adulation towards you: in anticipation of your (as established SA) vain sense of conceit.<br><br>But now, you (as reluctant spiritual authority) will deny vainly acting in a *conceited* fashion towards me: scorning my (as new GR) flattering sense of adulation. |
| EXCITED CONFUSION PSY. (B) | EXCITED CATAPHASIA (B) |
| Previously, you (as humanitarian authority) have pretentiously acted conceitedly, in response to the patronizing sense of adulation of the spiritual disciple.<br><br>But now, I (as new spiritual disciple) will *patronizingly* act with adulation towards you: in anticipation of your (as established HA) pretentious sense of conceit. | Previously, I (as new spiritual disciple) have patronizingly acted with adulation towards you: in anticipation of your (as established HA) pretentious sense of conceit.<br>But now, you (as reluctant humanitarian authority) will deny *pretentiously* acting conceitedly towards me: scorning my (as new SD) patronizing treatment of you. |

Fig. 17-A

| PARANOID PERSONALITY (B) | DEPERSONALIZATION N. (B) |
|---|---|
| Previously, you (as group authority) have shamefully acted in a humiliated fashion, in response to the criticism of the personal follower.<br>But now, I (as new personal follower) will *critically* act in an extremely censuring fashion towards you: in anticipation of your (as established GA) shameful sense of humiliation. | Previously, I (as new personal follower) have critically acted in an extremely censuring fashion towards you: in anticipation of your (as established GA) shameful sense of humiliation.<br>But now, you (as reluctant group authority) will deny shamefully acting in a *humiliated* fashion towards me: scorning my (as new PF) critical treatment of you. |
| ANXIETY PSYCHOSIS (B) | A/L PARAPHR.-FANTASTIC (B) |
| Previously, you (as spiritual authority) have humiliatingly acted in a mortified fashion, in response to the critical-ridiculing of the group representative.<br><br>But now, I (as new group representative) will critically-*ridicule* you: in anticipation of your (as established SA) mortified treatment of me. | Previously, I (as new group representative) have critically-ridiculed you: in anticipation of your (as established SA) mortified treatment of me.<br><br>But now, you (as reluctant spiritual authority) will deny humiliatingly acting in a *mortified* fashion towards me: scorning my (as new GR) critical-ridiculing of you. |
| INHIB. CONFUSION PSYCH (B) | INHIBITED CATAPHASIA (B) |
| Previously, you (as humanitarian authority) have mortifiedly acted in an anguished fashion, in response to the scornful-ridiculing of the spiritual disciple.<br><br>But now, I (as new spiritual disciple) will *scornfully*-ridicule you: in anticipation of your (as established HA) mortified sense of anguish. | Previously, I (as new spiritual disciple) have scornfully-ridiculed you: in anticipation of your (as established HA) mortified sense of anguish.<br>But now, you (as reluctant humanitarian authority) will deny mortifiedly acting in an *anguished* fashion towards me: scorning my (as new SD) scornful-ridiculing of you. |

Fig. 17-B

| PASSIVE-AGRESSIVE PER. (B) | CONVERSION HYSTERIA (B) |
|---|---|
| Previously, I (as group authority) have impudently acted in an arrogant fashion, in response to the envious treatment of the personal follower.<br>But now, you (as new personal follower) will *enviously* act in an excessively admiring fashion towards me: in anticipation of my (as established GA) impudently-arrogant treatment of you. | Previously, you (as new personal follower) have enviously acted excessively admiringly towards me: in anticipation of my (as established GA) impudently-arrogant treatment of you.<br>But now, I (as reluctant group authority) will deny impudently acting *arrogantly* towards you: scorning your (as new PF) envious treatment of me. |
| MANIC/DEPRESSIVE DIS. (B) | A/L PARAPHRENIA-MANIC (B) |
| Previously, I (as spiritual authority) have arrogantly acted in an impetuous fashion, in response to the envious sense of jealousy of the group representative.<br><br>But now, you (as new group representative) will enviously act *jealously* towards me: in anticipation of my (as established SA) arrogant sense impetuosity. | Previously, you (as new group representative) have enviously acted jealously towards me: in anticipation of my (as established SA) arrogant sense impetuosity.<br><br>But now, I (as reluctant spiritual authority) will deny arrogantly acting with *impetuosity* towards you: scorning your (as new GR) envious sense of jealousy |
| HYPERKIN. MOTILITY PSY. (B) | HYPERKIN PERIODIC CAT. (B) |
| Previously, I (as humanitarian authority) have impetuously acted in a presumptuous fashion, in response to the jealous sense of covetousness of the spiritual disciple.<br>But now, you (as new spiritual disciple) will jealously act *covetously* towards me: in anticipation of my (as established HA) presumptuous treatment of you. | Previously, you (as new spiritual disciple) have jealously acted covetously towards me: in anticipation of my (as established HA) presumptuous treatment of you.<br>But now, I (as reluctant humanitarian authority) will deny impetuously acting *presumptuously* towards you: scorning your (as new SD) covetous treatment of me. |

Fig. 17-C

| SCHIZOID PERSONALITY (B) | NEURAESTHENIC NEUR. (B) |
|---|---|
| Previously, I (as group authority) have insolently acted in an audacious fashion, in response to the disdainful treatment of the personal follower.<br>But now, you (as new personal follower) will *disdainfully* act in an excessively caring fashion towards me: in anticipation of my (as established GA) insolent sense of audacity. | Previously, you (as new personal follower) have disdainfully acted in an excessively caring fashion towards me: in anticipation of my (as established GA) insolent sense of audacity.<br>But now, I (as reluctant group authority) will deny insolently acting *audaciously* towards you: scorning your (as new PF) disdainful treatment of me. |
| MANIC/DEPRESSIVE DIS. (B) | A/L PARAPHR.-CONFUSED (B) |
| Previously, I (as spiritual authority) have audaciously acted in a rash fashion, in response to the disdainful sense of contempt of the group representative.<br>But now, you (as new group representative) will disdainfully act *contemptuously* towards me: in anticipation of my (as established SA) audacious sense of rashness. | Previously, you (as new group representative) have disdainfully acted contemptuously towards me: in anticipation of my (as established SA) audacious sense of rashness.<br>But now, I (as reluctant spiritual authority) will deny audaciously acting *rashly* towards you: scorning your (as new GR) disdainful sense of contempt. |
| AKINETIC MOTILITY PSY. (B) | AKINETIC PERIODIC CATA. (B) |
| Previously, I (as humanitarian authority) have rashly acted in a bold fashion, in response to the contemptuous sense of reproach of the spiritual disciple.<br>But now, you (as new spiritual disciple) will contemptuously act *reproachfully* towards me: in anticipation of my (as established HA) rash sense of boldness. | Previously, you (as new spiritual disciple) have contemptuously acted reproachfully towards me: in anticipation of my (as established HA) rash sense of boldness.<br>But now, I (as reluctant humanitarian authority) will deny rashly acting *boldly* towards you: scorning your (as new SD) contemptuous sense of reproach. |

Fig. 17-D

| | |
|---|---|
| INDIVIDUALISM<br><br>Ego States<br><br>*Personal Authority* | PRAGMATISM<br><br>Alter Ego States<br><br>*Personal Follower* |
| PERSONALISM<br><br>Personal Ideals<br><br>*Group Authority* | UTILITARIANISM<br><br>Cardinal Virtues<br><br>*Group Representative* |
| ROMANTICISM<br><br>Civil Liberties<br><br>*Spiritual Authority* | ECCLESIASTICISM<br><br>Theological Virtues<br><br>*Spiritual Disciple* |
| ECUMENISM<br><br>Ecumenical Ideals<br><br>*Humanitarian Authority* | ECLECTICISM<br><br>Classical Values<br><br>*Humanitarian Follower* |
| HUMANISM<br><br>Humanistic Values<br><br>*Transcendental Authority* | MYSTICISM<br><br>Mystical Values<br><br>*Transcendental Follower* |

Fig. 18

| EXTREME INDIVIDUALISM | EXCESSIVE PRAGMATISM |
|---|---|
| Previously, you (as reinforcer) have excessively acted rewardingly towards me: overriding my (as antagonist) extremely motivated treatment of you.<br><br>But now, I (as personal authority) will extremely act in an *individualist* fashion towards you: overruling your (as reinforcer) excessively rewarding treatment of me. | Previously, I (as your personal authority) have extremely acted individualistically towards you: countering your (as reinforcer) excessively rewarding treatment of me.<br>But now, you (as personal follower) will excessively act in a *pragmatic* fashion towards me: overruling my (as PA) extremely individualistic treatment of you. |
| EXTREME PERSONALISM | EXCESSIVE UTILITARIANISM |
| Previously, you (as my personal follower) have excessively acted in a pragmatic fashion towards me: countering my (as PA) extremely individualistic treatment of you.<br>But now, I (as group authority) will extremely act in a *personable* fashion towards you: overruling your (as PF) excessively pragmatic treatment of me. | Previously, I (as your group authority) have extremely acted in a personable fashion towards you: countering your (as PF) excessively pragmatic treatment of me.<br>But now, you (as group representative) will excessively act in a *utilitarian* fashion towards me: overruling my (as GA) extreme sense of personalism. |
| EXTREME ROMANTICISM | EXCESSIVE ECCLESIASTICISM |
| Previously, you (as group representative) have excessively acted in a utilitarian fashion towards me: countering my (as GA) extremely personable treatment of you.<br>But now, I (as spiritual authority) will extremely act in a *romanticized* fashion towards you: overruling your (as GR) excessively utilitarian treatment of me. | Previously, I (as your spiritual authority) have extremely acted in a romanticized fashion towards you: countering your (as GR) excessively utilitarian treatment of me.<br>But now, you (as my spiritual disciple) will excessively act in an *ecclesiastical* fashion towards me: overruling my (as SA) extremely romanticized treatment of you. |
| EXTREME ECUMENISM | EXCESSIVE ECLECTICISM |
| Previously, you (as my spiritual disciple) have excessively acted in an ecclesiastical fashion towards me: countering my (as SA) extremely romanticized treatment of you.<br>But now, I (as humanitarian authority) will extremely act in an *ecumenical* fashion towards you: overruling your (as SD) excessively ecclesiastical treatment of me | Previously, I (as humanitarian authority) have extremely acted in an ecumenical fashion towards you: overriding your (as SD) excessively ecclesiastical treatment of me.<br>But now, you (as representative member of humanity) will excessively act in an *eclectic* fashion towards me: overruling my (as HA) extreme sense of ecumenism. |
| EXTREME HUMANISM | EXCESSIVE MYSTICISM |
| Previously, you (as representative member of humanity) have excessively acted in an eclectic fashion towards me: countering my (as HA) extreme sense of ecumenism.<br>But now, I (as transcendental authority) will extremely act in a *humanistic* fashion towards you: overruling your (as RH) excessively eclectic treatment of me. | Previously, I (as transcendental authority) have extremely acted in a humanistic fashion towards you: countering your (as RH) excessively eclectic treatment of me.<br>But now, you (as transcendental follower) will excessively act in a *mystical* fashion towards me: overruling my (as TA) extremely humanistic treatment of you. |

Fig. 19-A

| | |
|---|---|
| EXCESSIVE QUINTESSENTIALISM<br>Previously, I (as reinforcer) have extremely acted in a rewarding fashion towards you: overriding your (as procurer) excessively solicitous treatment of me.<br>But now, you (as personal authority) will excessively act in a *quintessential* fashion towards me: overruling my extremely rewarding treatment of you | EXTREME EXPEDIENCY<br>Previously, you (as personal authority) have excessively acted quintessentially towards me: countering my (as reinforcer) extremely rewarding treatment of you.<br>But now, I (as personal follower) will extremely act *expediently* towards you: overruling your (as PA) excessively quintessential treatment of me. |
| EXCESSIVE HEROISM<br>Previously, I (as your personal follower) have extremely acted in an expedient fashion towards you: overriding your (as PA) excessively quintessential treatment of me.<br>But now, you (as group authority) will excessively act in a *heroic* fashion towards me: overruling my (as PF) extremely expedient treatment of you. | EXTREME PRACTICALITY<br>Previously, you (as group authority) have excessively acted in a heroic fashion towards me: countering my (as PF) extremely expedient treatment of you.<br>But now, I (as group representative) will extremely act in a *practical* fashion towards you: overruling your (as GA) excessively heroic treatment. |
| EXCESSIVE CHARISMA<br>Previously, I (as group representative) have extremely acted in a practical fashion towards you: overriding your (as GA) excessively heroic treatment of me.<br>But now, you (as spiritual authority) will excessively act in a *charismatic* fashion towards me: overruling my (as GR) extreme sense of practicality. | EXTREME DOGMATISM<br>Previously, you (as spiritual authority) have excessively acted in a charismatic fashion towards me: overriding my (as GR) extremely practical treatment of you.<br>But now, I (as spiritual disciple) will extremely act in a *dogmatic* fashion towards you: overruling your (as SA) excessive sense of charisma. |
| EXCESSIVE EVANGELISM<br>Previously, I (as spiritual disciple) have extremely acted in a dogmatic fashion towards you: overriding your (as SA) excessive sense of charisma.<br>But now, you (as humanitarian authority) will excessively act in an *evangelical* fashion towards me: overruling my (as SD) extreme sense of dogmatism | EXTREME MORALISM<br>Previously, you (as humanitarian authority) have excessively acted evangelically towards me: countering my (as SD) extreme sense of dogmatism.<br>But now, I (as representative member of humanity) will extremely act *moralistically* towards you: overruling your (as HA) excessively evangelical treatment of me. |
| EXCESSIVE ALTRUISM<br>Previously, I (as representative member of humanity) have extremely acted moralistically towards you: overriding your (as HA) excessive sense of evangelism.<br>But now, you (as transcendental authority) will excessively act *altruistically* towards me: overruling my (as RH) extreme sense of moralism. | EXTREME SPIRITUALISM<br>Previously, you (as transcendental authority) have excessively acted altruistically towards me: countering my (as RH) extremely moralistic treatment of you.<br>But now, I (as transcendental follower) will extremely act in a *spiritualistic* fashion towards you: overruling your (as TA) excessive sense of altruism. |

Fig. 19-B

| HYPER-KNAVERY | HYPER-FRAUD |
|---|---|
| Previously, you (as punisher) have excessively acted punitively towards me: overriding my (as antagonist) extremely unmotivated treatment of you.<br><br>But now, I (as personal authority) will *knavishly* act hyperviolently towards you: overruling your (as punisher) excessively punitive treatment of me. | Previously, I (as your personal authority) have knavishly acted hyperviolently towards you: countering your (as punisher) excessively punitive treatment of me.<br><br>But now, you (as personal follower) will *fraudulently* act hyperviolently towards me: overruling my (as PA) extremely knavish treatment of you. |
| HYPER-VILLAINY | HYPER-CORRUPTION |
| Previously, you (as my personal follower) have excessively acted fraudulently towards me: countering my (as PA) extremely knavish treatment of you.<br><br>But now, I (as group authority) will *villainously* act hyperviolently towards you: overruling your (as PF) excessively fraudulent treatment of me. | Previously, I (as your group authority) have villainously acted hyperviolently towards you: countering your (as PF) excessively fraudulent treatment of me.<br><br>But now, you (as group representative) will *corruptly* act hyperviolently towards me: overruling my (as GA) extremely villainous treatment of you. |
| HYPER-PROFANITY | HYPER-HERESY |
| Previously, you (as group representative) have excessively acted corruptly towards me: countering my (as GA) extremely villainous treatment of you.<br><br>But now, I (as spiritual authority) will *profanely* act hyperviolently towards you: overruling your (as GR) excessively corrupt treatment of me. | Previously, I (as your spiritual authority) have profanely acted hyperviolently towards you: countering your (as GR) excessively corrupt treatment of me.<br><br>But now, you (as my spiritual disciple) will *heretically* act hyperviolently towards me: overruling my (as SA) extremely profane treatment of you. |
| HYPER-APOSTASY | HYPER-ANARCHISM |
| Previously, you (as my spiritual disciple) have excessively acted heretically towards me: countering my (as SA) extremely profane treatment of you.<br>But now, I (as humanitarian authority) will hyperviolently act with *apostasy* towards you: overruling your (as SD) excessively heretical treatment of me. | Previously, I (as humanitarian authority) have a hyperviolently acted with apostasy towards you: overriding your (as SD) excessively heretical treatment of me.<br>But now, you (as representative member of humanity) will *anarchically* act hyperviolently towards me: overruling my (as HA) extreme sense of apostasy. |
| HYPER-NIHILISM | HYPER-DIABOLISM |
| Previously, you (as representative member of humanity) have excessively acted in an anarchical fashion towards me: countering my (as HA) extreme sense of apostasy.<br>But now, I (as transcendental authority) will *nihilistically* act hyperviolently towards you: overruling your (as RH) excessive sense of anarchy. | Previously, I (as transcendental authority) have hyperviolently acted in a nihilistic fashion towards you: countering your (as RH) excessive sense of anarchy.<br><br>But now, you (as transcendental follower) will *diabolically* act hyperviolently towards me: overruling my (as TA) extremely nihilistic treatment of you. |

Fig. 20-A

| HYPER-MISCHIEVOUSNESS | HYPER-DECEPTIVENESS |
|---|---|
| Previously, I (as punisher) have extremely acted in a punitive fashion towards you: countering your (as antagonist) excessively unmotivated treatment of me.<br><br>But now, you (as personal authority) will *mischievously* act in a hypervioIent fashion towards me: overruling my extremely punitive treatment of you. | Previously, you (as my personal authority) have mischievously acted hyperviolently towards me: countering my (as punisher) extremely punitive treatment of you.<br><br>But now, I (as personal follower) will *deceptively* act in a hyperviolent fashion towards you: overruling your (as PA) excessively mischievous treatment of me |
| HYPER-NOTORIETY | HYPER-VENALITY |
| Previously, I (as personal follower) have deceptively acted hyperviolently towards you: countering your (as PA) excessively mischievous treatment of me.<br>But now, you (as group authority) will *notoriously* act in a hyperviolent fashion towards me: overruling my (as PF) extremely deceptive treatment of you. | Previously, you (as my group authority) have notoriously acted in a hyperviolent fashion towards me: countering my (as PF) extremely deceptive treatment of you.<br>But now, I (as group representative) will *venally* act in a hyperviolent fashion towards you: overruling your (as GA) excessively notorious treatment of me. |
| HYPER-SCANDALOUSNESS | HYPER-SANCTIMONY |
| Previously, I (as group representative) have venally acted in a hyperviolent fashion towards you: countering your (as GA) excessively notorious treatment of me.<br><br>But now, you (as spiritual authority) will *scandalously* act in a hyperviolent fashion towards me: overruling my (as GR) extremely venal treatment of you. | Previously, you (as my spiritual authority) have scandalously acted in a hyperviolent fashion towards me: countering my (as GR) extremely venal treatment of you.<br><br>But now, I (as spiritual disciple) will *sanctimoniously* act in a hyperviolent fashion towards you: overruling your (as SA) excessively scandalous treatment of me. |
| HYPER-FANATICISM | HYPER-LAWLESSNESS |
| Previously, I (as spiritual disciple) have sanctimoniously acted hyperviolently towards you: countering your (as SA) excessively scandalous treatment of me.<br><br>But now, you (as humanitarian authority) will *fanatically* act in a hyperviolent fashion towards me: overruling my (as SD) extremely sanctimonious treatment of you. | Previously, you (as humanitarian authority) have fanatically acted hyperviolently towards me: countering my (as SD) extremely sanctimonious treatment.<br><br>But now, I (as representative member of humanity) will *lawlessly* act hyperviolently towards you: overruling your (as HA) excessively fanatical treatment of me. |
| HYPER-ALIENATION | HYPER-HEATHENISM |
| Previously, I (as representative member of humanity) have lawlessly acted hyperviolently towards you: countering your (as HA) excessively fanatical treatment of me.<br><br>But now, you (as transcendental authority) will hyperviolently act in an *alienated* fashion towards me: overruling my (as RH) extreme sense of lawlessness. | Previously, you (as my transcendental authority) have hyperviolently acted in an alienated fashion towards me: countering my (as RH) extreme sense of lawlessness<br><br>But now, I (as transcendental follower) will hyperviolently act in a *heathenistic* fashion towards you: overruling your (as TA) excessively alienated treatment of me. |

Fig. 20-B

| | |
|---|---|
| TRANSITIONAL PRAGMATISM<br>Previously, I (as group authority) have personably acted in an individualistic fashion, in response to the pragmatic treatment of the personal follower.<br>But now, you (as new personal follower) will rewardingly act in a *pragmatic* fashion towards me: in anticipation of my (as established GA) personable treatment of you. | DISQUALIFIED PERSONALISM<br>Previously, you (as new personal follower) have rewardingly acted in a pragmatic fashion towards me: in anticipation of my (as established GA) personable treatment of you.<br><br>But now, I (as reluctant group authority) will deny acting *personably* towards you: averting your (as new PF) pragmatic treatment of me. |
| TRANSITIONAL UTILITARIANISM<br>Previously, I (as spiritual authority) have personably acted in a romanticized fashion towards you, in response to the utilitarian treatment of the group representative.<br>But now, you (as new group representative) will pragmatically act in a *utilitarian* fashion towards me: in anticipation of my (as established SA) romanticized treatment of you. | DISQUALIFIED ROMANTICISM<br>Previously, you (as new group representative) have pragmatically acted in a utilitarian fashion towards me: in anticipation of my (as established SA) romanticized treatment of you.<br>But now, I (as reluctant spiritual authority) will deny personably acting in a *romanticized* fashion towards you: averting your (as new GR) utilitarian treatment of me. |
| TRANSITION'L ECCLESIASTICISM<br>Previously, I (as humanitarian authority) have romantically acted in an ecumenical fashion, in response to the ecclesiastical treatment of the spiritual disciple.<br>But now, you (as new spiritual disciple) will *ecclesiastically* act in a utilitarian fashion towards me: in anticipation of my (as established HA) ecumenical treatment of you. | DISQUALIFIED ECUMENISM<br>Previously, you (as new spiritual disciple) have ecclesiastically acted in utilitarian fashion towards me: in anticipation of my (as established HA) ecumenical treatment of me.<br>But now, I (as reluctant humanitarian authority) will deny romantically acting in a *ecumenical* fashion towards you: averting your (as new SD) ecclesiastical treatment of me. |
| TRANSITIONAL ECLECTICISM<br>Previously, I (as transcendental authority) have ecumenically acted in a humanistic fashion, in response to the eclectic treatment of the representative member of humanity.<br>But now, you (as new representative member of humanity) will ecclesiastically act in an *eclectic* fashion towards me: in anticipation of my (as established TA) humanistic treatment of you. | DISQUALIFIED HUMANISM<br>Previously, you (as new representative member of humanity) have ecclesiastically acted in an eclectic fashion towards me: in anticipation of my (as established TA) humanistic treatment of you.<br>But now, I (as reluctant transcendental authority) will deny ecumenically acting in a *humanistic* fashion towards you: averting your (as new RH) eclectic treatment of me. |

Fig. 21-A

| | |
|---|---|
| TRANSITIONAL INDIVIDUALISM<br>Previously, you (as personal follower) have rewardingly acted pragmatically, in response to the individualistic treatment of the personal authority.<br>But now, I (as new personal authority) will solicitously act *individualistically* towards you: in anticipation of your (as established PF) pragmatic treatment of me. | DISQUALIFIED PRAGMATISM<br>Previously, I (as new personal authority) have solicitously acted individualistically towards you: in anticipation of your (as established PF) pragmatic treatment of me.<br>But now, you (as reluctant personal follower) will deny *pragmatically* acting rewardingly towards me: averting my (as new PA) individualistic treatment of you. |
| TRANSITIONAL PERSONALISM<br>Previously, you (as group representative) have pragmatically acted in a utilitarian fashion, in response to the personable treatment of the group authority.<br>But now, I (as new group authority) will individualistically act in a *personable* fashion towards you: in anticipation of your (as established GR) utilitarian treatment of me. | DISQUALIFIED UTILITARIANISM<br>Previously, I (as new group authority) have individualistically acted in a personable fashion towards you: in anticipation of your (as established GR) utilitarian treatment of me.<br>But now, you (as reluctant group representative) will deny pragmatically acting in a *utilitarian* fashion towards me: averting my (as new GA) personable treatment of you. |
| TRANSITIONAL ROMANTICISM<br>Previously, you (as spiritual disciple) have utilitarianly acted in an ecclesiastical fashion, in response to the personable sense of romanticism of the spiritual authority.<br>But now, I (as new spiritual authority) will personably act in a *romanticized* fashion towards you: in anticipation of your (as established SD) ecclesiastical treatment of me. | DISQUALIFIED ECCLESIASTICISM<br>Previously, I (as new spiritual authority) have personably acted in a romanticized fashion towards you: in anticipation of your (as established SD) ecclesiastical treatment of me.<br>But now, you (as reluctant spiritual disciple) will deny utilitarianly acting in an *ecclesiastical* fashion towards me: averting my (as new SA) romanticized treatment of you. |
| TRANSITIONAL ECUMENISM<br>Previously, you (as representative member of humanity) have ecclesiastically acted in an eclectic fashion, in response to the ecumenical of the humanitarian authority.<br>But now, I (as new humanitarian authority) will romantically act in an *ecumenical* fashion towards you: in anticipation of your (as established RH) eclectic treatment of me. | DISQUALIFIED ECLECTICISM<br>Previously, I (as new humanitarian authority) have romantically acted in an ecumenical fashion towards you: in anticipation of your (as established RH) eclectic treatment of me.<br>But now, you (as reluctant representative member of humanity) will deny ecclesiastically acting *eclectically* towards me: averting my (as new HA) ecumenical treatment of you. |

Fig. 21-B

| CRIMINAL FRAUD | DISQUALIFIED VILLAINY |
|---|---|
| Previously, I (as group authority) have villainously acted in a knavish fashion, in response to the fraudulent treatment of the personal follower.<br>But now, you (as new personal follower) will *fraudulently* act in a punitive fashion towards me: in anticipation of my (as established GA) villainous treatment of you. | Previously, you (as new personal follower) have fraudulently acted in a punitive fashion towards me: in anticipation of my (as established GA) villainous treatment of you.<br>But now, I (as reluctant group authority) will deny *villainously* acting in a knavish fashion towards you: scorning your (as new PF) fraudulent treatment of me. |
| CRIMINAL CORRUPTION | DISQUALIFIED PROFANITY |
| Previously, I (as spiritual authority) have villainously acted in a profane fashion, in response to the fraudulent sense of corruption of the group representative.<br>But now, you (as new group representative) will *fraudulently act in a corrupt fashion* towards me: in anticipation of my (as established SA) villainous sense of profanity. | Previously, you (as new group representative) have fraudulently act in a corrupt fashion towards me: in anticipation of my (as established SA) villainous sense of profanity.<br>But now, I (as reluctant spiritual authority) will deny *villainously acting profanely* towards you: scorning your (as new GR) fraudulent sense of corruption. |
| CRIMINAL HERESY | DISQUALIFIED APOSTASY |
| Previously, I (as humanitarian authority) have profanely acted with apostasy, in response to the heretical sense of corruption of the spiritual disciple.<br>But now, you (as new spiritual disciple) will *heretically act corruptly* towards me: in anticipation of my (as established HA) profane sense of apostasy. | Previously, you (as new spiritual disciple) have heretically acted corruptly towards me: in anticipation of my (as established HA) profane sense of apostasy.<br>But now, I (as reluctant humanitarian authority) will deny profanely acting with *apostasy* towards you: scorning your (as new SD) heretical sense of corruption. |
| CRIMINAL ANARCHISM | DISQUALIFIED NIHILISM |
| Previously, I (as transcendental authority) have nihilistically acted with apostasy, in response to the heretical sense of anarchism of the representative member of humanity.<br>But now, you (as new representative member of humanity) will heretically act in an *anarchical* fashion towards me: in anticipation of my (as established TA) nihilistic treatment of you. | Previously, you (as new representative member of humanity) have heretically acted anarchically towards me: in anticipation of my (as established TA) nihilistic treatment of you.<br>But now, I (as reluctant transcendental authority) will deny *nihilistically* acting with apostasy towards you: scorning your (as new RH) heretical sense of anarchism. |

Fig. 22-A

| CRIMINAL KNAVERY | DISQUALIFIED FRAUD |
|---|---|
| Previously, you (as personal follower) have fraudulently acted punitively, in response to the knavish treatment of the personal authority.<br><br>But now, I (as new personal authority) will *knavishly* act unproductively towards you: in anticipation of your (as established PF) fraudulent treatment me. | Previously, I (as new personal authority) have knavishly acted unproductively towards you: in anticipation of your (as established PF) fraudulent treatment of me.<br><br>But now, you (as reluctant personal follower) will deny *fraudulently* acting punitively towards me: scorning my (as new PA) knavish treatment of you. |
| CRIMINAL VILLAINY | DISQUALIFIED CORRUPTION |
| Previously, you (as group representative) have *fraudulently acted in a corrupt fashion*, in response to the knavish sense of villainy of the group authority.<br>But now, I (as new group authority) will *knavishly act in a villainous* fashion towards you: in anticipation of your (as established GR) fraudulent sense of corruption. | Previously, I (as new group authority) *have knavishly acted in a villainous* fashion towards you: in anticipation of your (as established GR) fraudulent sense of corruption.<br>But now, you (as reluctant group representative) deny fraudulently acting *corruptly* towards me: scorning my (as new GA) knavish sense of villainy. |
| CRIMINAL PROFANITY | DISQUALIFIED HERESY |
| Previously, you (as spiritual disciple) have heretically acted in a corrupt fashion, in response to the villainous *sense of profanity of the* spiritual authority.<br>But now, I (as new spiritual authority) will villainously act in a *profane* fashion towards you: in anticipation of your (as established SD) heretical sense corruption. | Previously, I (as new spiritual authority) have villainously acted in a profane fashion towards you: in anticipation of your (as established SD) heretical sense corruption.<br>But now, you (as reluctant spiritual disciple) will deny *heretically* acting corruptly towards me: scorning my (as new SA) profane treatment of you. |
| CRIMINAL APOSTASY | DISQUALIFIED ANARCHISM |
| Previously, you (as represent. member of humanity) have heretically acted in an anarchical fashion, in response to the profane sense of apostasy of the humanitarian authority.<br>But now, I (as new humanitarian authority) will profanely act with *apostasy* towards you: in anticipation of your (as established RH) anarchical treatment of me. | Previously, I (as new humanitarian authority) have profanely acted with apostasy towards you: in anticipation of your (as established RH) anarchical treatment of me.<br>But now, you (as reluctant representative member of humanity) will deny heretically acting *anarchically* towards me: scorning my (as new HA) profane sense of apostasy. |

Fig. 22-B

| CRIMINAL *Hyper*-FRAUD | DISQUALIFIED *Hyper*-VILLAINY |
|---|---|
| Previously, I (as group authority) have villainously acted in a hyperviolent fashion, in response to the excessive sense of fraud of the personal follower.<br>But now, you (as new personal follower) will *fraudulently* act in a hyperviolent fashion towards me: in anticipation of my (as established GA) extreme sense of villainy. | Previously, you (as new personal follower) have fraudulently acted hyperviolently towards me: in anticipation of my (as established GA) extreme sense of villainy.<br>But now, I (as reluctant group authority) will deny *villainously* acting hyperviolently towards you: scorning your (as new PF) excessive sense of fraud. |
| **CRIMINAL *Hyper*-CORRUPTION**<br>Previously, I (as spiritual authority) have profanely acted in a hyperviolent fashion, in response to the excessive sense of corruption of the group representative.<br>But now, you (as new group representative) will *corruptly* act in a hyperviolent fashion towards me: in anticipation of my (as established SA) extreme sense of profanity. | **DISQUALIFIED *Hyper*-PROFANITY<br>Previously, you (as new group representative) have corruptly acted hyperviolently towards me: in anticipation of my (as established SA) extreme sense of profanity.<br>But now, I (as reluctant spiritual authority) will deny** *profanely* acting hyperviolently towards you: scorning your (as new GR) excessively corrupt treatment of me. |
| **CRIMINAL *Hyper*-HERESY**<br>Previously, I (as humanitarian authority) have hyperviolently acted with apostasy, in response to the excessive sense of heresy of the spiritual disciple.<br>But now, you (as new spiritual disciple) will *heretically* act in a hyperviolent fashion towards me: in anticipation of my (as established HA) extreme sense of apostasy. | **DISQUALIFIED *Hyper*-APOSTASY<br>Previously, you (as new spiritual disciple) have heretically acted hyperviolently towards me: in anticipation of my (as established HA) extreme sense of apostasy.<br>But now, I (as reluctant humanitarian authority) will deny** hyperviolently acting with *apostasy* towards you: scorning your (as new SD) excessively heretical treatment of me. |
| **CRIMINAL *Hyper*-ANARCHISM**<br>Previously, I (as transcendental authority) have nihilistically acted in a hyperviolent fashion, in response to the excessive sense of anarchism of the represent. member of humanity.<br>But now, you (as new representative member of humanity) will *anarchically* act in a hyperviolent fashion towards me: in anticipation of my (as estab. TA) extreme sense of nihilism. | **DISQUALIFIED *Hyper*-NIHILISM**<br>Previously, you (as new representative member of humanity) have *anarchically* acted hyperviolently towards me: in anticipation of my (as established TA) extreme sense of nihilism.<br>But now, I (as reluctant transcendental authority) will deny *nihilistically* acting hyperviolently towards you: scorning your (as new RH) excessive sense of anarchism. |

Fig. 23-A

| CRIMINAL *Hyper*-KNAVERY | DISQUALIFIED *Hyper*-FRAUD |
|---|---|
| Previously, you (as personal follower) have excessively acted in a fraudulent fashion, in response to the extremely knavish treatment of the personal authority.<br>But now, I (as new personal authority) will *knavishly* act hyperviolently towards you: in anticipation of your (as established PF) excessively fraudulent treatment me. | Previously, I (as new personal authority) have knavishly acted hyperviolently towards you: in anticipation of your (as established PF) excessively fraudulent treatment of me.<br>But now, you (as reluctant personal follower) will deny *fraudulently* acting hyperviolently towards me: scorning my (as new PA) extremely knavish treatment of you. |
| CRIMINAL *Hyper*-VILLAINY | DISQUALIFIED *H*-CORRUPTION |
| Previously, you (as group representative) have excessively acted in a corrupt fashion, in response to the extremely villainous treatment of the group authority.<br>But now, I (as new group authority) will *villainously* act in a hyperviolent fashion towards you: in anticipation of your (as established GR) excessively corrupt treatment of me. | Previously, I (as new group authority) have villainously acted hyperviolently towards you: in anticipation of your (as established GR) excessively corrupt treatment of me.<br>But now, you (as reluctant group representative) will deny *corruptly* acting hyperviolently towards me: scorning my (as new GA) extremely villainous treatment of you. |
| CRIMINAL *Hyper*-PROFANITY | DISQUALIFIED *Hyper*-HERESY |
| Previously, you (as spiritual disciple) have excessively acted in a heretical fashion, in response to the extremely profane treatment of the spiritual authority.<br>But now, I (as new spiritual authority) will *profanely* act hyperviolently towards you: in anticipation of your (as established SD) excessively heretical treatment of me. | Previously, I (as new spiritual authority) have profanely acted hyperviolently towards you: in anticipation of your (as established SD) excessively heretical treatment of me.<br>But now, you (as reluctant spiritual disciple) will deny *heretically* acting hyperviolently towards me: scorning my (as new SA) extremely profane treatment of you. |
| CRIMINAL *Hyper*-APOSTASY | DISQUALIFIED *H*-ANARCHISM |
| Previously, you (as representative member of humanity) have excessively acted anarchically, in response to the extreme sense of apostasy of the humanitarian authority.<br>But now, I (as new humanitarian authority) will hyperviolently act with *apostasy* towards you: in anticipation of your (as established RH) excessive sense of anarchism. | Previously, I (as new humanitarian authority) have hyperviolently acted with apostasy towards you: in anticipation of your (as established RH) excessive sense of anarchism.<br>But now, you (as reluctant representative member of humanity) will deny *anarchically* acting hyperviolently towards me: scorning my (as new HA) extreme sense of apostasy. |

Fig. 23-B

| | |
|---|---|
| PERSONALITY DISORDERS (B)<br>Previously, I (as group authority) have extremely acted in a personable fashion, in response to the excessively pragmatic treatment of the personal follower.<br>But now, you (as new personal follower) will excessively act in a *pragmatic* fashion towards me: in anticipation of my (as established GA) extreme sense of personalism. | NEUROSIS (B)<br>Previously, you (as new personal follower) have excessively acted pragmatically towards me: in anticipation of my (as established GA) extreme sense of personalism.<br>But now, I (as reluctant group authority) will deny extremely acting *personably* towards you: scorning your (as new PF) excessively pragmatic treatment of me. |
| CYCLOID PSYCHOSES (I)<br>Previously, I (as spiritual authority) have extremely acted in a romanticized fashion, in response to the excessively utilitarian treatment of the group representative.<br>But now, you (as new group representative) will excessively act in a *utilitarian* fashion towards me: in anticipation of my (as established SA) extreme sense of romanticism. | UNSYSTEMATIC PARAPHRENIA<br>Previously, you (as new group representative) have excessively acted in a utilitarian fashion towards me: in anticipation of my (as established SA) extreme sense of romanticism.<br>But now, I (as reluctant spiritual authority) will deny extremely acting in a *romanticized* fashion towards you: scorning your (as new GR) excessively utilitarian treatment. |
| CYCLOID PSYCHOSES (II)<br>Previously, I (as humanitarian authority) have extremely acted in an ecumenical fashion, in response to the excessively ecclesiastical treatment of the spiritual disciple.<br>But now, you (as new spiritual disciple) will excessively act *ecclesiastically* towards me: in anticipation of my (as established HA) extremely ecumenical treatment of you. | UNSYSTEMATIC CATATONIA<br>Previously, you (as new spiritual disciple) have excessively acted in an ecclesiastical fashion towards me: in anticipation of my (as established HA) extreme sense of ecumenism.<br>But now, I (as reluctant humanitarian authority) will deny extremely acting in an *ecumenical* fashion towards you: scorning your (as SD) excessively ecclesiastical treatment of me. |
| CYCLOID PSYCHOSES (III)<br>Previously, I (as transcendental authority) have extremely acted in an humanistic fashion, in response to the excessively eclectic treatment of the represent. member of humanity.<br>But now, you (as new representative member of humanity) will excessively act *eclectically* towards me: in anticipation of my (as established TA) extreme sense of humanism. | UNSYSTEMATIC HEBEPHRENIA<br>Previously, you (as new represent. member of humanity) have excessively acted eclectically towards me: in anticipation of my (as established TA) extreme sense of humanism.<br>But now, I (as reluctant transcendental authority) will deny extremely acting in a *humanistic* fashion towards you: scorning your (as RH) excessively eclectic treatment of me. |

Fig. 24-A

| PERSONALITY DISORDERS (A) | NEUROSIS (A) |
|---|---|
| Previously, you (as personal follower) have excessively acted pragmatically: in response to the extremely individualistic treatment of the personal authority.<br>But now, I (as new personal authority) will extremely act in an *individualistic* fashion towards you: in anticipation of your (as established PF) excessively pragmatic treatment. | Previously, I (as new personal authority) have extremely acted individualistically towards you: in anticipation of your (as establ. PF) excessively pragmatic treatment of me.<br>But now, you (as reluctant personal follower) will deny excessively acting *pragmatically* towards me: scorning my (as new PA) extremely individualistic treatment of you. |
| MOOD DISORDERS (I) | SYSTEMATIC PARAPHRENIA |
| Previously, you (as group representative) have excessively acted in utilitarian fashion, in response to the extremely personable treatment of the group authority.<br>But now, I (as new group authority) will extremely act in a *personable* fashion towards you: in anticipation of your (as established GR) excessively utilitarian treatment of me. | Previously, I (as new group authority) have extremely acted in a personably towards you: in anticipation of your (as established GR) excessively utilitarian treatment of me.<br>But now, you (as reluctant group representative) will deny excessively acting in a *utilitarian* fashion towards me: scorning my (as new GA) extreme sense of personalism. |
| MOOD DISORDERS (II) | SYSTEMATIC CATATONIA |
| Previously, you (as spiritual disciple) have excessively acted in an ecclesiastical fashion, in response to the extremely romanticized treatment of the spiritual authority.<br>But now, I (as new spiritual authority) will extremely act in a *romanticized* fashion towards you: in anticipation of your (as established SD) excessively ecclesiastical treatment of me. | Previously, I (as new spiritual authority) have extremely acted romantically towards you: in anticipation of your (as established SD) excessively ecclesiastical treatment of me.<br>But now, you (as reluctant spiritual disciple) will deny excessively acting in an *ecclesiastical* fashion towards me: scorning my (as new SA) extremely romantic treatment of you. |
| MOOD DISORDERS (III) | SYSTEMATIC HEBEPHRENIA |
| Previously, you (as representative member of humanity) have excessively acted eclectically, in response to the extremely ecumenical treatment of the humanitarian authority.<br>But now, I (as new humanitarian authority) will extremely act in an *ecumenical* fashion towards you: in anticipation of your (as established RH) excessively eclectic treatment. | Previously, I (as new humanitarian authority) have extremely acted in an ecumenical fashion towards you: in anticipation of your (as established RH) excessively eclectic treatment.<br>But now, you (as reluctant representative member of humanity) will deny excessively acting *eclectically* towards me: scorning my (as new HA) extreme sense of ecumenism. |

Fig. 24-B

INDUCTIVE INFERENCE AFFECTIVE LANGUAGE ANALYZER SIMULATING TRANSITIONAL ARTIFICIAL INTELLIGENCE

BACKGROUND

This invention utilizes the transmission of my application Ser. No. 09/640,896 filed 2000 Aug. 18 that has matured into U.S. Pat. No. 6,587,846 issued Jul. 1, 2003

This application claims priority of provisional application Ser. No. 60/367,995 filed Mar. 25, 2002.

BRIEF SUMMARY

The Inductive Inference Affective Language Analyzer: Transitional (abbreviated IIALA-T), allows the transitional form of affective language to be decoded and simulated. This transitional form of power maneuver refers to a relationship initiated for the first time: where an individual attempts to establish a new interaction within a pre-existing social order. The knowledge base for the matching procedure is a collective memory array representing the formal conceptual template for the full complement of transitional power pyramid definitions. The preferred version of the IIALA-T is a coordination of two basic expert system components; namely, a transitional power pyramid definition matching procedure expert system and a master control unit expert system. The current version of the IIALA-T represents a stand-alone variation on the standard IIALA distinguished by the uniqueness of its programming; namely, the power pyramid definitions for the transitional power maneuvers.

BRIEF DESCRIPTION OF DRAWINGS

FIG. 1 The formal schematic representation of the major/transitional ethical categories FIG. 2-A The diagram depicting the lesser virtues I FIGS. 2-B, 2-C, 2-D, 2-E The transitional power pyramid definitions for the lesser virtues I FIG. 3-A The diagram depicting the lesser virtues II FIGS. 3-B, 3-C, 3-D, 3-E The transitional power pyramid definitions for the lesser virtues II FIG. 4-A The diagram depicting criminality I FIGS. 4-B, 4-C, 4-D, 4-E The transitional power pyramid definitions for criminality I FIG. 5-A The diagram depicting criminality II FIGS. 5-B, 5-C, 5-D, 5-E The transitional power pyramid definitions for criminality II FIG. 6-A The diagram depicting hypercriminality I FIGS. 6-B, 6-C, 6-D, 6-E The transitional power pyramid definitions for hypercriminality I FIG. 7-A The diagram depicting hypercriminality II FIGS. 7-B, 7-C, 7-D, 7-E The transitional power pyramid definitions for hypercriminality II FIG. 8-A The diagram depicting mental illness I FIGS. 8-B, 8-C, 8-D, 8-E The transitional power pyramid definitions for mental illness I FIG. 9-A The diagram depicting mental illness II FIGS. 9-B, 9-C, 9-D, 9-E The transitional power pyramid definitions for mental illness II FIGS. 10-A, 10-B, 10-C, 10-D The accessory transitional definitions for the lesser virtues I FIGS. 11A, 11B, 11C, 11D The accessory transitional definitions for the lesser virtues II FIGS. 12-A, 12-B, 12-C, 12-D The accessory transitional definitions for criminality I FIGS. 13-A, 13-B, 13-C, 13-D The accessory transitional definitions for criminality II FIGS. 14-A, 14-B, 14-C, 14-D The accessory transitional definitions for hypercriminality I FIGS. 15-A, 15-B, 15-C, 15-D The accessory transitional definitions for hypercriminality II FIGS. 16-A, 16-B, 16-C, 16-D The accessory transitional definitions for mental illness I FIGS. 17-A, 17-B, 17-C, 17-D The accessory transitional definitions for mental illness II FIG. 18 The main themes for the major virtuous realm.

FIG. 19-A The power pyramid definitions for the main themes for the vices of excess.

FIG. 19-B The power pyramid definitions for the accessory themes for the vices of excess.

FIG. 20-A The power pyramid definitions for the main themes for hyperviolence

FIG. 20-B The power pyramid definitions for the accessory themes for hyperviolence.

FIG. 21-A The power pyramid definitions for the transitional themes for the lesser virtues (I)

FIG. 21-B The power pyramid definitions for the transitional themes for lesser virtues (II).

FIG. 22-A The power definitions for the transitional themes for criminality (I)

FIG. 22-B The power definitions for the transitional themes for criminality (I)

FIG. 23-A The power pyramid definitions for the transitional themes for mental illness (I).

FIG. 23-B The power definitions for the transitional themes for mental illness (II)

FIG. 24-A The power definitions for the transitional themes for hypercriminality (I)

FIG. 24-B The power definitions for the transitional themes for hypercriminality (I)

DETAILED DESCRIPTION OF THE INVENTION

Figure 25:
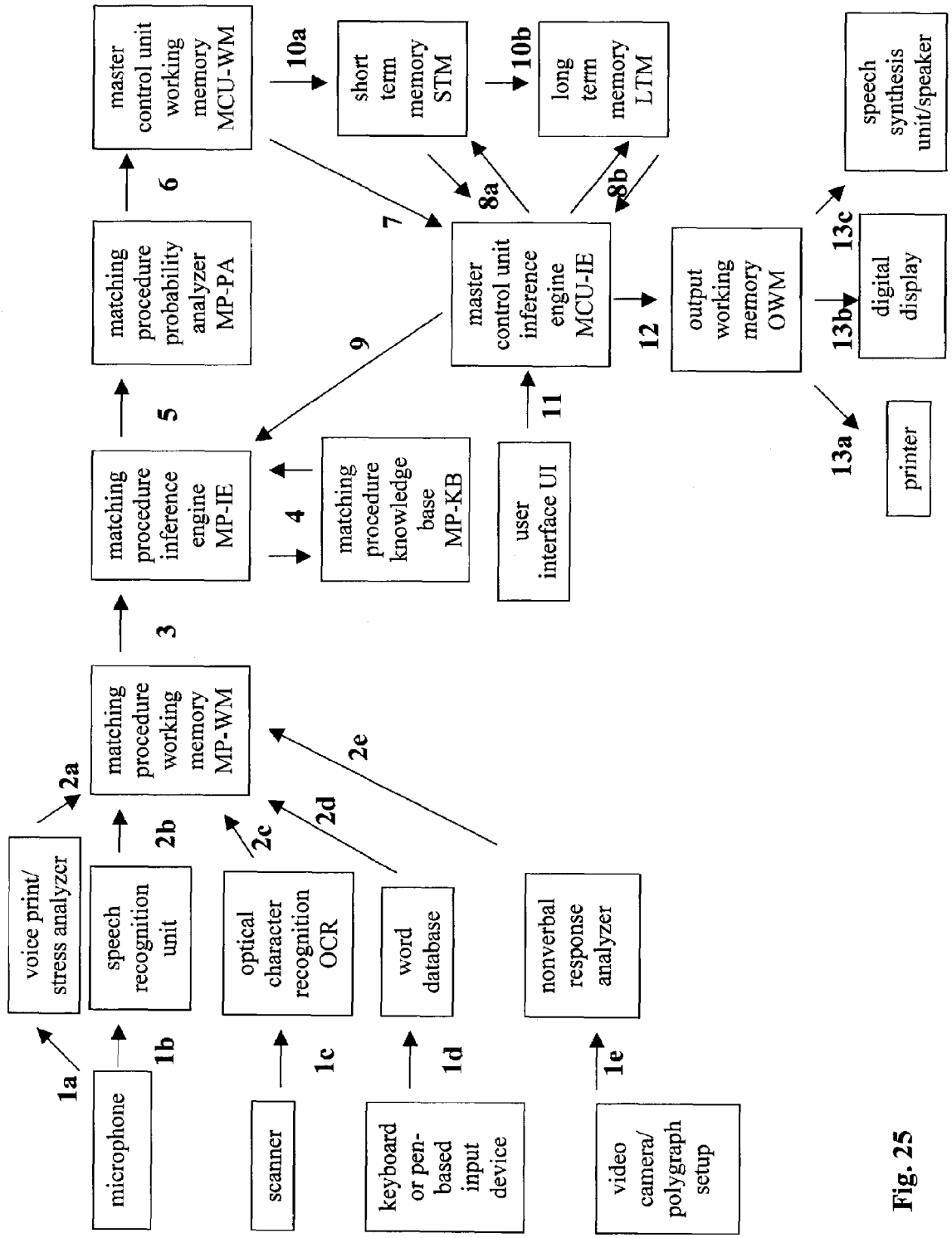
FIG. 25 The flow-chart schematic for the passive monitoring mode of the IIALA-T

Through the principles of inductive reasoning, the formal specifics of the power pyramid definitions are employed in a detection/matching function, serving as the foundation for the first inductive system for decoding and simulating affective language. The logical attributes of the power pyramid definitions provide a formal model of affective language, allowing for the decoding of the motivational parameters within a given verbal interchange. On the basis of this determination, the computer devises a counter-response of its own design, effectively simulating a sense of motivation in the verbal interaction.

The Inductive Inference Affective Language Analyzer (hereafter abbreviated IIALA) as described in the co-pending application: Ser. No. 09/640,896 filed 2000 Aug. 18 serves as a primary adjunct upon which the current patent application (which, in turn, targets transitional AI) is formally based. According to the earlier version of the IIALA, the strict transformational logic of the power pyramid hierarchy eliminates much of the redundancy bound to occur in any convincing language simulation. The greatest degree of complexity involves programming at the most basic (personal) level of the power pyramid hierarchy, the remaining higher authority levels building naturally upon this elementary foundation.

The most appropriate unit of input is necessarily the sentence, for the power pyramid definitions are similarly organized in the form of a dual sentence structure. The design schematic for the IIALA specifying an array of 320 dedicated processor complexes, employs parallel processing to determine the precise degree of correlation between an inputted (target) sentence and its matching power pyramid definition template. This matching procedure scrutinizes all of the grammatical elements of a given sentence: statistically correlating these specifics to a given power pyramid definition template. The verb tense, the plurality and person of the nouns/pronouns etc. are all scrutinized according to pre-set criteria. Each processor complex then calculates the sum-total of correct matches, yielding the relative probability that a given sentence matches a particular power pyramid definition. The processor complex yielding the highest overall rating is singled out as the most probable solution to the power pyramid definition matching procedure.

The context of the interaction is further taken into account through the aid of a feedback loop, the priority of the individual microprocessor complexes preemptively weighted on the basis of preceding deliberations. Each power pyramid definition is composed of both past (as well as present) design components, establishing context as yet a further critical feature in the detection procedure. The IIALA retains in long-term storage a record of every relevant experience with a given individual or situation. On this contextual basis, the master control unit selectively weights the individual processor complexes according to a record of both past (as well as current) behavior contexts. In this respect, the IIALA is exquisitely sensitive to variations in personality (just as humans are instinctively so) satisfying yet a further prerequisite of Turing's Test (the standard for evaluating such a system).

A Description of the Power Pyramid Definitions—FIGS. 1 to 24

A complete 320 part collection of power pyramid definitions serves as the heart of a matching procedure knowledge base of the IIALA, permitting a precise decoding of the motivational parameters of affective language—as well as a computer generated simulation of affective language. The power pyramid definitions are formally based upon the conceptual construct of the power pyramid hierarchy, a ten-level hierarchy spanning the personal, group, spiritual, humanitarian, and transcendental authority levels. In addition to the most elementary (one-to-one) style of personal interaction, the individual is typically incorporated into a wide range of group contexts (family, work, school, etc.), as well as an all-encompassing style of spiritual context. The theoretical principles governing the science of Set Theory are clearly in agreement with this three-way specialization: the unit set, the group set, and the universal set corresponding to the personal, group, and spiritual realms, respectively. The most basic personal level of interaction refers to the one-to-one style of relationship between individuals, such as in one's personal friendships. The personal level, in turn, gives way to the domain of group authority, with the group set surpassing the unit set in terms of its expansion to a multitude of elements (or class members) within such a group context. This ascending pattern further extends a next higher spiritual level of authority. This universal set surpasses the multiplicity of the group domain for the sum-totality of all groups within the domain, representing the group of all possible group sets, a third-order style of set hierarchy (equivalent to the domain of all of mankind).

Furthermore, complex interactions between individuals are dually specialized into either authority or follower roles; namely, the personal authority and personal follower roles, the group authority and group representative roles, and the spiritual authority and spiritual disciple roles.

The Master Schematic Diagram of Ethical Groupings

The three-level hierarchy of personal, group, and spiritual realms (when viewed in terms of both authority and follower roles) provides the fundamental conceptual framework of virtues, values, and ideals for programming in the IIALA (termed the power pyramid hierarchy). The first three levels of the hierarchy are designated for the personal, group, and spiritual levels: accounting for the most basic groupings of virtues and ideals. The remaining uppermost two levels, however, bring to light two hitherto unmentioned categories; namely, the humanitarian and transcendental realms, respectively. Although the third-order style of spiritual realm is clearly the maximum level of organization (in keeping with the dictates of Set Theory), the additional sense of chronological time permits the introduction of the more advanced sphere of humanitarian authority. Humanitarian authority transcends the spiritual form by claiming to speak for all generations of mankind, not just the current one. Furthermore, this extreme sense of the power of abstraction serves as the basis for a final transcendental level within the power pyramid hierarchy. Transcendental authority transcends the routine sense of concreteness shared in common by the lower levels, an innovation accounting for the most abstract groupings of values within the power hierarchy. Both the transcendental and humanitarian realms are similarly specialized into both authority and follower roles (for a grand total of four), which together with the six roles specified for the personal, group, and spiritual levels collectively comprise the master ten-level hierarchy.

The Power Pyramid Hierarchy of Virtues, Values, and Ideals

The ten affiliated listings of virtues, values, and ideals are organized into dual descending columns of five groupings each; the left column representing the hierarchy of authority roles, whereas the right-hand column describes the corresponding follower roles. This dual schematic format represents the sum-totality of reciprocating interactions between the authority and follower figures. The distinctive groupings listed for each individual level are further represented in a quartet style of schematic format (depicted as quadrants in a Cartesian system). Some of the more traditional groupings (such as the cardinal virtues) are already represented as four-part listings, fitting quite nicely into such a quadrant-style of format. Others (such as the theological virtues) are supplemented beyond their traditional number in order to achieve this quartet-style of status.

The Personal Foundations of the Power Hierarchy

The most basic personal level of power pyramid hierarchy is respectively designated for the groupings of ego states of the personal authority (guilt-worry-nostalgia-desire) and the alter ego states of the personal follower (hero worship-blame-approval-concern). These groupings are tailor-made for incorporation into the power pyramid hierarchy, serving as the elementary foundation for the remaining listings of virtues, values, and ideals. The authority roles are characterized by the authority ideals: read downwards as the personal ideals, the civil liberties, the ecumenical ideals, and the humanistic values. The affiliated follower roles specify a parallel trend based in the realm of the virtues; namely, the cardinal virtues, theological virtues, the classical Greek values, and the mystical values. Such an exceptional degree of symmetry is formally explained in terms of a concept popularized in the field of Communications Theory; namely, the metaperspective format of R. D. Laing, and also P. I. Watzlawick. Both formulations share a common theme; namely, communication between individuals is overlain with abstract meta-messages, representing a higher order perspectives upon the viewpoint held by another: schematically defined as "this is how I see you seeing me." This multi-level model of meta-communication in general allows for independent confirmation of the entire higher-order structure of the power pyramid hierarchy, culminating in an unprecedented 10th-order level of meta-abstraction. Such an arrangement necessarily implies the further repetition of both the authority and follower roles within the power hierarchy. Being that the personal authority acts first within the power sequence, this is necessarily the first to repeat in the modified sense of group authority. This meta-meta-order perspective of the group authority, in turn, is countered by the meta-meta-metaperspective of the group representative. Indeed, this reciprocating style of power escalation is further repeated for the remaining spiritual, humanitarian, and transcendental realms within the power hierarchy: culminating in an unprecedented 10th-order level of meta-abstraction.

The Power Pyramid Definitions

The applications of the power pyramid hierarchy to artificial intelligence call for the highest degree of precision. The systematic organization of the power pyramid hierarchy allows for the construction of what are termed the power pyramid definitions. This crucial innovation spells out (in longhand) the precise location of each virtue or value within the linguistic hierarchy while preserving the correct status of authority and follower roles. Each definition is formally constructed along the lines of a two-stage sequential format; namely, (A) the formal recognition of the preliminary power maneuver, and (B) the current countermaneuver now being employed, and hence, labeled. Take, for example, the representative power pyramid definition of justice reproduced below:

Previously, I (as your group authority) have honorably acted in a guilty fashion towards you: countering your (as PF) blameful treatment of me.

But now, you, (as group representative) will justly-blame me: overruling my (as GA) honorable sense of guilt.

According to this specific example, the honorable sense of guilt expressed by the group authority represents the preliminary power maneuver, countered by the just-blaming strategy initiated by the group representative. According to this formal format, the preliminary power perspective represents the one-down power maneuver, whereas the immediate power perspective is designated as the one-up variety. Power leverage, accordingly, is achieved by rising to the one-up power status; e.g., ascending to the next higher metaperspectival level The Power Pyramid Definitions of the Vices of Defect The power pyramid definitions for the virtues, values, and ideals serve as the elementary foundation for the affective language matching procedure. Any true all-inclusive system must necessarily be able to deal with the evils of the world, as well as the good. For every virtue or value, there further exists a corresponding vice (or antonym): namely, love vs. hate, good vs. evil etc. Aristotle defines these opposites as the vices of defect. The corresponding power pyramid hierarchy for the vices is identical in virtually every respect to the format previously seen for the virtues, with each virtue or value corresponding (point for point) with a respective vice within the corresponding power hierarchy. Each such vice is a direct antonym of its respective virtuous mode, making for precise quartet style listings analogous to the traditional listings of virtues and values. This further leads to the construction a parallel series of power pyramid definitions with respect to the vices of defect: parallel in virtually every respect to those specified for the virtuous mode.

This basic contrast between virtue and vice is further enhanced by the additional hierarchy of the vices of excess. The classical Greek philosopher, Aristotle initially proposed such a dual system of vices; namely, the vices of defect (previously described) as well as the vices of excess (defined as the range of extremes with respect to the virtues). Aristotle viewed the virtuous realm as a system of mean values (or norms) interposed between these two categories of vice.

In a related fashion, the vices of defect are similarly invested with a parallel range of extremes: a domain formally termed the realm of hyperviolence. Hyperviolence differs from ordinary violence primarily in the degree of extremes with which it is bestowed.

This basic four-part grouping of the major virtues, vices of defect, vices of excess, and hyperviolence represents the basic conceptual platform upon which the ethical simulation of AI is based. These four basic categories, multiplied by 40 terms each, results in a grand total of 160 individual terms.

In addition to these main listings of virtues and vices, it is further relevant to distinguish a parallel series of accessory terms. These accessory virtues and vices arise as direct transformations upon the main groupings of terms, in that the "you" and "I" roles are reversed within the corresponding power pyramid definitions: allowing for a subjective perspective upon an objective viewpoint (and vice-versa). These accessory terms represent close synonyms of the major terms, distinguished in terms of a subjective/objective reversal of polarities.

The Transitional Power Maneuvers: Objects and Advantages

The full 320-term hierarchy of virtues and vices offers a preliminary model for programming ethical AI as specified in the co-pending patent application for the IIALA. The current format, however, suffers from an inherent shortcoming; namely, the authority and follower roles are rigidly fixed in place within the power hierarchy, allowing precious little flexibility to operate within the system. Versatility remains a key feature in our modern society, with continually shifting social coalitions placing an ever-greater demand upon the individual. Each new adjustment within the social hierarchy calls for alternate mechanisms for integrating such a new addition, an innovation that the established categories of virtue and vice fail to fully take into account. In addition to the incremental pattern of maneuvering for power initially described, a more direct avenue must further exist for leapfrogging directly into the higher authority levels; namely, the group, spiritual, and humanitarian levels, respectively. This additional class of options is termed the transitional power maneuvers, being that they "transition" the individual directly into such new social contexts.

For instance, the newly devised class of lesser virtues transition directly into the major virtues, whereas the categories of criminality further transition into the vices of defect. Similarly, the classifications of hypercriminality transition into the realm of hyperviolence, whereas the formal categories of mental illness alternately permit entry into the domain of the vices of excess (as schematically depicted in FIG. 1). These four basic transitional categories are further associated with their own unique complement of power pyramid definitions, resulting in the master system of transitional definitions. When further programmed into the AI format, these additional transitional maneuvers are accurately simulated, radically supplementing the initial version of the IIALA described previously. This newly devised variation on the IIALA, distinguished as the Inductive Inference Affective Language Analyzer-Transitional (abbreviated IIALA-T), allows these distinctive (transitional) forms of affective language to be decoded and simulated. This formally extends to a simulation of humor and comedy via the lesser virtues, as in the role of AI comedic entertainer. The AI simulation of criminality and hypercriminality is further crucial in a diagnostic fashion with respect to security contexts (as well as criminal profiling). A related simulation of mental illness further allows the roles of AI clinician/therapist. The remainder of the current patent application describes this radically new "transitional" modification of the basic IIALA process, as embodied in the IIALA-T.

The Power Dynamics of Affective Communication In General

A number of key features distinguish this new class of transitional power maneuvers. Firstly, these transitional maneuvers represent the direct motivational analogs of the major power maneuvers they serve to initiate, often expressed in an exaggerated fashion in order to make the point more clearly. This flair for the dramatic can appear either humorous (as in the realm of comedy), or tragic (as in the genre of melodrama).

In order to define this new class of the transitional power maneuvers most effectively, it proves fruitful to look back in review at the dynamics of the more routine style of complementary power maneuvers. Routine communication is diagrammed in terms of a two-stage schematic format, with the initial party in the communication termed "myself," whereas the alternate party is labeled the "other." For instance, this formal cycle begins with a sample power pyramid definition for the "glory" maneuver. According to this specific example, I (as group authority) gloriously act in a nostalgic fashion towards you, overruling your (as personal follower) worshipful treatment of me. This current power maneuver is communicated from "myself" to the "other" across a formal communicational channel, which (by definition) is open to distortion, ambiguity, or misunderstanding throughout the extent of the transmission.

Despite these inherent shortcomings, for sake of illustration, the message successfully arrives at the receiver end; namely, to the direct attention of the "other." As a two-stage format of communication, this message is conceptually translated into a form subsequently meaningful to the receiver. This formally entails translating the main power pyramid definition format into its corresponding accessory counterpart specific to such an outside viewpoint. This accessory form of the power pyramid definition for "exaltation" is now respectively represented in formal format: You (as group authority) will poignantly act in an exalted fashion towards me, thwarting my (as your personal follower) adoring treatment of you. According to this revised accessory format, the "you" and "I" roles are reversed, personalizing the message to fit the subjective prerequisites of the "other."

Once the message is received and fully comprehended by the "other," it still remains to be determined how best to respond to the message. One possible option is to ignore the message as if it were never received. A second option entails claiming to misunderstand the message, or simply leaving the scene altogether. A further option entails mirroring the message directly back to the sender, in what Communications Theory terms the symmetrical maneuver. Another response involves accepting the content of the message (in addition to one's specified role within the message).

A further option builds directly upon this initial acceptance, accepting the content of the message as offered, while subsequently modifying it by rising to the next higher authority level within the power hierarchy. This formally entails countering the power maneuver originally offered, offering in its place a power status of the "other's" own making. According to this specific example, the personal follower, in turn, invokes the next higher level of the group representative, employing a "prudence" form of countermaneuver. The first part of this new maneuver builds directly upon the initial "exaltation" maneuver originally communicated, followed by the "circumspection" countermaneuver proper; namely, I (as group representative) circumspectively act adoringly towards you, overruling your (as group authority) poignant sense of exaltation. According to Communications Theory, this latter strategy is termed the complementary maneuver, in that it directly complements that which has gone before; namely, the group representative role directly complements the group authority role originally offered.

Once formulated, this new power maneuver is formally communicated back from the "other" to "myself," a transmission similarly susceptible to the inherent shortcomings of communication in general; namely, distortion, ambiguity, etc. For illustrative purposes, the communication is successfully received, a development that necessarily entails a formal translation back into a form meaningful to understanding by "myself" (namely, back into the main power pyramid definition format). According to this reverse transformation, the circumspective-adoration of the group representative is directly translated back into the prudent sense of worship—in keeping with my own subjective perspectives. In this latter sense, the "you" and "I" roles are again reversed, redefining my group authority role as the subjective sense originally communicated.

The successful receipt of the group representative's "prudence" countermaneuver offers further options with respect to "myself;" namely, to ignore, accept, or rise to the next higher authority level, etc. In the latter case, this formally involves rising to the next higher "spiritual authority" level, resulting in a "providence" variation on the original glory maneuver. By definition, this launches a further cycle within the communication schematic; namely, that sequence relating to the spiritual level within the power hierarchy.

The Transitional Power Maneuvers

With the preceding formal model of communication clearly in focus, it further proves crucial to describe the basic dynamics for the transitional power maneuvers, demonstrating both commonalties and distinctions with respect to the more routine types of communication just described. This transitional style of power maneuver (as its name implies) refers to a relationship initiated for the first time, where an individual attempts to establish a new interaction within a pre-existing social order.

For example, the "autograph hound" thrust into contact with his celebrity idol attempts to establish an initial personal relationship with his authority figure. As an outsider, this entails a special strategy for making the overture attractive to the celebrity figure. This formally specifies coming across from a "one-down" power status; namely, framing the overture in vulnerable terms with respect to the celebrity figure. According to this appeasement power strategy, the fan abandons the typical tactic of maneuvering from the "one-up" position (as in a follower role surpassing the authority status enjoyed by the celebrity). In the autograph example, the fan frames his overture in the submissive stance of the personal follower role, wherein playing-up the power of his group authority figure.

In terms of this celebrity/fan example, the "hero-worship" role of the personal follower is modified (in a transitional sense) into the loyalty maneuver of the adoring fan, a maneuver directly anticipating the glorious sense of nostalgia of the group authority. By maneuvering from the "one-down" position, the personal follower gains more ready consideration from the group authority, a strategy directly contrasting with the established style of complementary maneuver (with its reciprocal trade-off of authority and follower roles).

The latter "complementary" strategy relies upon the permanent character of the established relationship, where the reciprocating authority and follower roles are fixed firmly in place, allowing for a complementary exchange between the two parties. For the transitional maneuver, however, the newcomer cannot invoke the benefits of such an established context, finding it more useful (at least initially) to make his overture from the "one-down" status. This strategy, in essence, allows the newcomer to get his foot in the door (so to speak) in the establishment of a new relationship.

The Double Bind Maneuver

This initial phase of the transitional power maneuver is respectively termed the congeniality phase, in that the new party submissively maneuvers from a "one-down" position in order to gain further acceptance from the authority figure. The established party is usually justified in accepting such an overture, being that it amounts to automatically being granted a "one-up" power status. This advantage, however, is not often as simple as it appears, being that the authority figure is coerced to some degree (albeit congenially) into reciprocating his expected role within the new relationship. For this reason, the established party sometimes refuses to willingly submit to such a bold power grab. In essence, the newcomer (posturing from a "one-down" position) effectively dictates the subsequent cooperation of his authority figure (in the "one-up" position), a deceptive gain in power status.

This slavish submission to the dictates of another equates to a personal loss of freedom irrespective of the positive intentions therein. In a formal "meta" sense, the newcomer gains initial control of the new relationship through the process of initiating it, placing the established party in a form of a double bind maneuver. This latter term is borrowed from the terminology of Communications Theory, defined as a paradox that leaves one (thusly bound) unable to comment upon the inherent incongruity contained within the message. For the "loyalty" example, this formally amounts to the basic conflict between the primary content level and the higher meta-message.

The primary level of the message is essentially straightforward; namely, accepting the overture of the fan at its most basic content level, accompanied by the attendant advantages of the "one-up" power status. The affiliated meta-message, however, further diminishes this power advantage, being that the newcomer essentially dictates the course of the interaction through the very process of initiating it.

This inherent aversion to being subliminally controlled by another makes the initial overture of the fan somewhat of a difficult proposition to accept. This intractable form of double bind is typically defined as a "damned if you do, damned if you don't" style of paradox. Should the established party accept the overture at face value, then he risks losing face with respect to the higher meta-context of the message; namely, submitting to the control of another. By alternately rejecting the overture, he further passes-up the advantages of the primary message content with its guaranteed "one-up" power status. He also risks appearing somewhat stalwart in the process, ignoring the somewhat congenial nature of the proceedings.

The Counter Double Bind Maneuver

The most graceful resolution to such an intransigent predicament involves what Communications Theorists term the counter double bind. This latter strategy amounts to "humoring" the efforts of the newcomer, accepting the surface content of the interaction while simultaneously disqualifying one's participation through meta-contextual cues. The counter double binder skillfully disqualifies (through meta-communication) the basic context of the communication: in essence, scorning the validity of the entire transitional interchange. This strategy is formally defined as: I accept your sense of loyalty (as expressed through my gloriously-nostalgic treatment of you), while humbly denying doing so.

This distinctive style of "meta" disqualification is chiefly mediated through the use of nonverbal cues; namely, those unspoken behaviors that underscore virtually all social interactions. Chief among these are bodily gestures, where a brief shrug or raised eyebrow can greatly modify (or even reverse) the content of what is being said. Vocal tone and exaggerated inflection further reflect strategies towards these ends, where a scornful or humorous tone signals that one shouldn't be taken too seriously. Through this broad range of tactics, the counter double binder effectively regains the upper hand in the transitional interchange (without necessarily appearing to have done so). Communications theorists further describe this tactic as the meta-complementary maneuver, being that the surface content mimics the more basic complementary maneuver—although now thoroughly disqualified through the use of abstract "meta" cues.

It is precisely at this extreme level of disqualification that the paradoxical nature of the counter double bind proves most effective, obliquely expressing disdain for the newcomer's initial attempts at psychological manipulation. Through a sarcastic tone of voice (or other such strategy), the established party stresses the unreality of the situation, a direct outcome of the strained character of the new transitional relationship.

In the case of the loyalty maneuver, for instance, the established party humbly denies being worthy of such loyalty; superficially accepting the content of the interaction, although in a fully disqualified manner. By remaining humble, the group authority effectively sidesteps the insistent quality of the fan's loyalty maneuver, while fully remaining polite in the process. With respect to the related concept of "blame," the affiliated "transitional" theme of responsibility, in turn, invokes a disqualified sense of innocence, a measured defense against the initial implications of the responsibility maneuver. A similar sequence of scenarios further hold true with respect to the affiliated interplay of discipline/modesty and vigilance/meekness. Accordingly, the skillful use of such disqualification effectively defuses any complicity within the transitional interchange.

The Ultimate Resolution to the Counter Double Bind

The somewhat unpleasant experience of discovering that one's double bind has been reversed is typically one of surprise—accompanied by some sort of "aha" experience. This realization is often expressed through nervous laughter, a spontaneous acknowledgment of having been outwitted. Generally speaking, laughter represents a catharsis of sorts, signaling a restoration of the original social order following the brief disruption instigated by the transitional maneuver. Similar to the initial double bind maneuver, there is no straightforward exit from the counter double bind maneuver. The sole most reasonable solution remains to abandon the pursuit altogether, having been bested in such a pitched battle of wits.

This dual interplay of role-reversals is particularly evident in the specific examples previously described. For instance, the loyalty maneuver of the personal follower further prompts the humility maneuver of the group authority. Similarly, the responsibility brand of double bind prompts the innocence style of counter double bind. Although these specific examples prove effective at a personal level of influence, the remaining higher levels of the power hierarchy beg further specific mention in this basic regard. A cursory survey of the ethical literature reveals a wide assortment of lesser virtues unaccounted for within the major groupings of virtues. According to this expanded interpretation, loyalty represents just the first term in a sequence extending to the group, spiritual, and humanitarian realms: namely, loyalty-fidelity-piety-felicity. The related trend based upon responsibility is defined as responsibility-duty-allegiance-righteousness. A similar pattern further holds true for the affiliated sequences of counter double bind maneuvers: namely, humility-majesty-magnificence-grandeur and innocence-vindication-exoneration-immaculateness. In fact, a similar pattern is seen for the remaining pair of trends within the power hierarchy: resulting in a 32-term complement of lesser virtues (I), as schematically depicted in FIG. 2-A. This reciprocating pattern for the lesser virtues (I) is further incorporated into the transitional power pyramid definition format, as schematically depicted in FIGS. 2-B to 2-E.

This basic pattern of lesser virtues (I) further predicts the existence of an additional complement of terms formally distinguished as the lesser virtues (II): as further specified in FIG. 3-A. The lesser virtues (II) are similarly incorporated directly into the formal transitional definition format, providing a formal indication of the basic dynamics under consideration. This complete four-part listing of definitions is respectively listed in FIGS. 3-B to 3-E, a format identical in form and function to that previously seen for the lesser virtues (I) with the exception that the order of the authority/follower roles is now reversed.

Criminality and Hypercriminality

The completed description of the lesser virtues invites further comparisons to two additional categories of transitional maneuvers; namely, those specified as criminality and hypercriminality. As the chief moral opposites of the virtuous realm, the vices of defect figure prominently in this additional transitional context. Although the vices of defect can sometimes prove adaptive in a behavioral sense, they are typically always maladaptive in a transitional sense, as respectively seen in the disturbing realm of criminality. In a transitional sense, criminality refers to the habit of starting new relationships in an antagonistic fashion, directly contrasting with the trend towards cooperation characterizing the virtuous realm. Criminality, accordingly, represents the domain of transitional maneuvers extended into the darker realm of the vices of defect.

Such criminal intentions are entirely consistent with the typical transitional format, bringing to mind the disturbing scenario of the career criminal prowling the street looking for victims in a strange neighborhood (where anonymity is assured). In the case of property crimes, the criminal's response is typically somewhat measured; namely, cooperative victims usually suffer little lasting harm. This circumstance is directly in keeping with the measured character of the vices of defect; namely, the responses are similarly tailored to the context at hand.

This is scarcely the case for the more troubling realm of hypercriminality—which represents the domain of transitions into the extreme realm of hyperviolence. Hyperviolence is formally defined as the range of extremes with respect to the more routine vices of defect. Accordingly, hyperviolence is characterized by responses that escalate out of all proportion to the precipitating circumstances. In this expanded context, hypercriminality shares this tendency towards the extremes of excess with hyperviolence, being that the former represents the preliminary set of transitional maneuvers leading directly to the latter.

A Terminology for Targeting the Realm of Criminality

The terminology for defining the initial realm of criminality entails taking the well-established format of the vices of defect and adding that prefix "C-" (designating criminality) to each individual term. This innovation effectively modifies the basic defect format to accommodate the new pattern of transitional power maneuvers. For instance, "spite" would be transformed into C-spite, while malice similarly translates as C-malice: as further depicted in FIG. 4-A for criminality (I), and FIG. 5-A for criminality (II). In criminality (I), the follower roles directly initiate the transitional sequence, whereas in criminality (II) the authority roles formally launch this basic pattern. This basic notation is further signified by a small "t" (denoting the "transitional" maneuver), whereas the small "d" specifies the "disqualified" counter double bind version.

This dual system of categories for criminality is further incorporated into a respective complement of power pyramid definitions analogous to the case previously made for the lesser virtues. A complete listing of definitions for criminality (I) is represented in FIGS. 4-B to 4-E, where the follower roles are depicted in the transitional position—followed by the authority maneuvers characterizing the counter double bind.

A parallel complement of definitions is further specified for the related classifications of criminality (II) with the exception that the order of the authority and follower roles is now reversed—as depicted in FIGS. 5-B to 5-E. In either case, 64 individual slots are identified for criminality (I), and 64 individual classifications for criminality (II).

A Terminology with Respect to Hypercriminality

The basic terminology for defining hypercriminality is similar to that proposed for criminality with the exception of the degree of extremes; hence, it remains only a minor modification to label these individual classifications. This entails employing a similar naming strategy to that initially used in the case of ordinary criminology; namely, taking the terminology of hyperviolence (such as "H-cruelty") and further adding a capital "C," wherein designating the hypercriminality variant (e.g., HC-cruelty).

In direct analogy to the case previously made for criminality, hypercriminality is similarly subdivided into categories (I) and (II), as further diagrammed in FIGS. 6-A and 7-A. These diagrams represent formal categorizations of the preliminary terminology of hyperviolence modified to fit the affiliated transitional format. According to this formal schematic format, a small "t" is used to designate the initial double bind maneuvers, whereas a small "d" stands for the disqualified form of counter double bind maneuvers. These two distinctive categories of hypercriminality are further incorporated into the transitional power pyramid definition format: as depicted in FIGS. 6-B to 6-E for hypercriminality (I), and FIGS. 7-B to 7-E for hypercriminality (II). This basic format formally entails modifying existing definitions of routine criminality by adding the prefix "hyper-" to each component term.

Mental Illness—I and II

For sake of symmetry, there necessarily exists a related category of transitional maneuvers with respect to the realm of the vices of excess; namely, the 56 individual classifications of mental illness depicted within FIGS. 8-A and 9-A. According to this formal transitional format, 32 distinctive terms exist for mental illness (I), in addition to 24 terms for mental illness (II). In particular, a suitable number of clinical classifications have been identified with respect to the terminology of psychosis proposed by Karl Leonhard, as well as the terminology of the personality disorders/neuroses contained within DSM-IV. These established terminologies effectively correspond to the specifics predicted for the transitional model of mental illness, as representative of double bind and counter double bind maneuvers targeting the vices of excess.

A Clinical Terminology for Mental Illness

According to principles of modern psychology, two main classifications of psychosis are traditionally recognized; namely, the manic-depressive style of mood disorders, in addition to the distinctive categories of schizophrenia. The mood disorders are typically much less debilitating than the schizophrenias, effectively representing the initial double bind style of maneuvers with respect to the vices of excess. This precise degree of correspondence relies in large part upon the detailed terminology contained within the English translation of Karl Leonhard's *The Classification of Endogenous Psychoses, Fifth Edition*: conveniently accounting for the precise number of slots predicted within the double bind theory of mental illness. The most basic personal level within the power hierarchy represents a special case due to the less debilitating nature of its affiliated symptomology: specified through the respective listings of personality disorders and neuroses contained within the *Diagnostic and Statistical Manual of Mental Disorders-IV* (DSM-IV).

Transitional Power Pyramid Definitions for Mental Illness

This detailed terminology of mental illness is further incorporated into the formal context of the transitional power pyramid definitions. The complete listing of definitions for mental illness (I) is listed in FIGS. 8-B to 8-E, whereas those for mental illness (II) are offered in FIGS. 9-B to 9-E. This format is parallel in form and function to that previously seen for the lesser virtues, although now representing transitions into the realm of excess (instead of the virtuous mode). The power pyramid definitions for mental illness, accordingly, are based within the most basic personal level that targets the personality disorders and the neuroses. The remaining group, spiritual, and humanitarian levels, in turn, are characterized by the definitions targeting the higher classifications of the psychoses: namely, the mood disorders and the individual classifications of schizophrenia.

The Accessory Forms for the Transitional Power Maneuvers

In line with the pattern previously established for the major terms, there also exists a parallel complement of accessory versions for the transitional power pyramid definitions. These accessory definitions are defined as the formal reversal of the "you" and "I" perspectives in relation to the main counterparts. This reversal of perspectives for the accessory definitions allows for a crucial "empathic" dimension when extended to the schematic AI format, allowing the computer to decode and respond to all potential perspectives within a given verbal interchange. For the accessory power pyramid definitions, this reciprocal pattern of authority/follower roles follows a strict give-and-take dynamic, formally defined as "if you, then I," (and vice versa). According to this strict power-sharing strategy, half of the authority/follower roles are designated with respect to the subjective "I" role, whereas the remainder are specified via the objective "you" role. This confluence of role-polarities is formally staggered so that the "objective" terms directly complement the "subjective" terms within the respective power pyramid definitions.

In direct analogy to the main sets of transitional definitions, these accessory definitions are parallel in every respect to their main counterparts with the exception that the "you" and "I" polarities are now reversed. This reciprocal reversal of "you/I" perspectives is predicted within the formal definition format, allowing for a reciprocating confluence of subjective/objective viewpoints. This dual specificity of perspectives is similarly encountered with respect to the emerging field of "Theory of Mind," where reciprocating viewpoints allow for the perspective of "another."

The complete listing of accessory power pyramid definitions is tabulated in FIGS. 10-A to 10-D for the accessory lesser virtues (I), and FIGS. 11-A to 11-D for the accessory lesser virtues (II). The accessory power pyramid definitions for criminality are tabulated in FIGS. 12-A to 12-D for accessory criminality (I), and FIGS. 13-A to 13-D for the accessory criminality (II). The accessory power pyramid definitions for hypercriminality are tabulated in FIGS. 14-A to 14-D for accessory hypercriminality (I), and FIGS. 15-A to 15-D for the accessory hypercriminality (II). The accessory power pyramid definitions for mental illness are tabulated in FIGS. 16-A to 16-D for accessory mental illness (I), and FIGS. 17-A to 17-D for the accessory mental illness (II). In these latter two sets of definitions, the accessory forms of mental illness are distinguished by the addition of the qualifier—(B).

The Power Pyramid Definitions for the General Unifying Themes

One final set of definitions proves crucial to the function of the IIALA-T; namely, the power pyramid definitions relating to the general unifying themes. According to the preceding patent application for the IIALA, the respective Ten Ethical Laws of Robotics were defined in terms of general unifying themes targeting both the virtues and the vices of defect. Accordingly, a separate general theme exists for each four part grouping of individual terms. For instance, the theme of "utilitarianism" encompasses the corresponding listing of cardinal virtues. A similar pattern further extends across the entire ten-level span of the power hierarchy. For instance, the personal authority role celebrates the theme of individualism, extending to the sense of personalism for the next higher group authority level. The spiritual authority role further targets the more idealized theme of romanticism—in keeping with a broader emphasis on universal principles. The themes for the remaining humanitarian and transcendental levels take their cues from the titles of their specific listings of terms; namely, ecumenism and humanism, respectively. A parallel sequence of accessory variations are further distinguished; namely, quintessential-ism-heroism-charisma-evangelism-altruism.

In a parallel fashion, the remaining follower roles are similarly organized in terms of an affiliated sequence of individual themes: namely, pragmatism-utilitarianism-eccle-siasticism-eclecticism-mysticism. In particular, the theme of pragmatism refers to that which is expedient to the individual, extending to the group level as a utilitarian concern for the common good. This trend further extends to the remaining spiritual, humanitarian, and transcendental realms with respect to the themes of ecclesiasticism, eclecticism, and mysticism, respectively—as shown in FIG. 18. This pattern similarly extends to a corresponding accessory sequence; namely, expediency-practicality-dogmatism-moralism-spiritualism. Each of these virtuous themes is further incorporated into the formal schematic pattern of power pyramid definitions. These newly devised sets of definitions both transcend and unify the more routine sets of definitions initially described for the individual groupings of the virtues, values, and ideals.

For sake of symmetry, it also proves crucial to devise a parallel sequence of themes targeting to the vices of defect, in addition to the corresponding accessory counterparts: representing the direct moral antonyms of the respective virtuous themes. For instance, the sequence of themes specifying the authority roles (knavery-villainy-profanity-apostasy-nihilism) directly contrasts point-for-point with the themes specified for the virtuous realm (individualism-personalism-romanticism-ecumenism-humanism). Similarly, the sequence of vices targeting the follower roles (fraud-corruption-heresy-anarchism-diabolism) respectively mirrors its affiliated virtuous series (pragmatism-utilitarianism-ecclesiasticism-eclecticism-mysticism). A similar pattern extends to the respective accessory counterparts: namely, mischievousness-notoriety-scandalousness-fanaticism-alienation and deceptiveness-venality-sanctimony-lawlessness-heathenism. In strict analogy to the case previously made for the virtuous themes, this parallel hierarchy of themes for the vices of defect is similarly incorporated into the standard power pyramid definition format.

A parallel listing of definitions further extends to the realm of the vices of excess, where the basic definitions for the virtuous themes are altered through modifiers such as "extreme" and "excessive" to reflect the extreme nature of the vices of excess. These listings of definitions are further depicted in FIG. 19-A for the main versions of the themes, and FIG. 19-B for the accessory versions of the themes for the vices of excess.

A similar pattern further holds true for the remaining themes relating to hyperviolence, wherein the themes for the vices of defect are altered through similar modifiers to reflect their extreme nature of hyperviolence. This additional set of definitions is depicted in FIG. 20-A for the main themes for hyperviolence, as well as FIG. 20-B for the accessory themes for hyperviolence.

The Transitional Listings of Themes

With respect to the current specification of the IIALA-T, the basic set of the general unifying themes is further modified to target the formal two-stage transitional format, resulting in an affiliated complement of power pyramid definitions for the transitional themes. The definitions for the themes representing the lesser virtues (I & II) are depicted in FIGS. 21-A and 21-B; while those for the themes for criminality (I & II) are shown in FIGS. 22-A and 22-B. The transitional definitions for the themes for hypercriminality (I & II) are shown in FIGS. 23-A and 23-B, where the terms from FIGS. 20-A and 20-B are directly substituted into standard the transitional format. The transitional definitions for the themes for mental illness (I & II) are shown in FIGS. 24-A and 24-B, where the terms from FIGS. 19-A and 19-B are formally substituted into the standard transitional format.

These definitions for the main listings of transitional themes are further augmented by an affiliated set of accessory counterparts, where the polarities of "you" and "I" roles in the definitions are formally reversed. These additional sets of accessory definitions for the transitional themes are not explicitly spelled out in the course of this patent, being as they represent systematic modifications of the main versions. This is achieved by substituting the relevant accessory themes for the major virtues, vices of defect, the vices of excess and hyperviolence directly in the formal transitional format: resulting in the specific accessory variations (accompanied by a reversal of the "you" and "I" roles). The current patent application claims the additional application of the accessory themes with respect to the transitional power pyramid matching procedure through recourse to the previously stated basic formula (even though the tables of accessory transitional definitions for the themes are not specifically spelled out in the long-hand format).

In summary, the addition of the main and accessory general unifying themes serves in the role of an extra degree of complexity with respect to the programming for the IIALA-T, permitting an additional set of checks and balances with respect to the decoding procedure. This affiliated hierarchy of transitional themes is matched against ongoing communication, further narrowing the scope of the matching procedure in conjunction with the matching procedure for the individual terms—providing an enhanced degree of verification.

Figure 26:
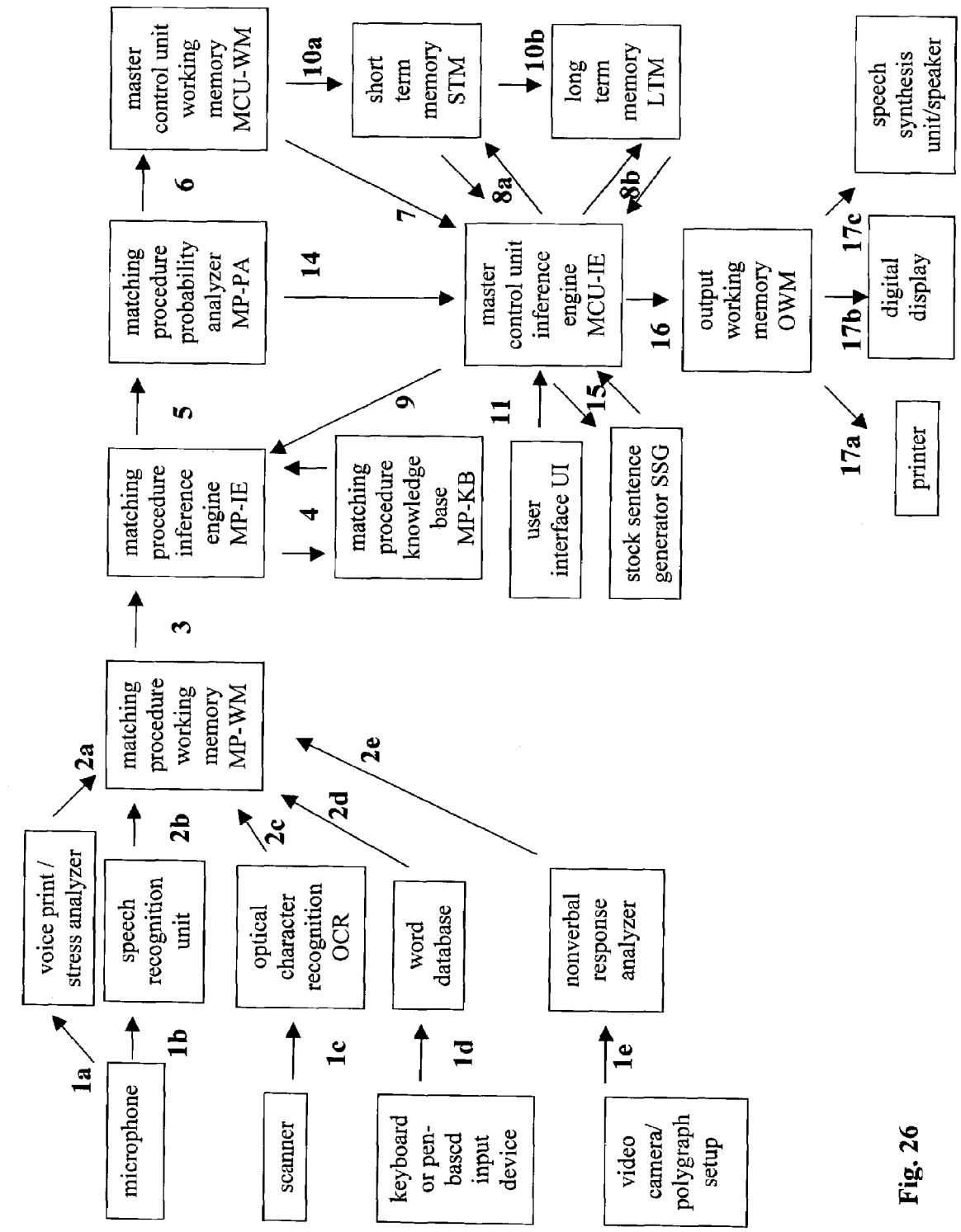
FIG. 26 The flow-chart schematic for the active monitoring mode of the IIALA-T
Figure 27:
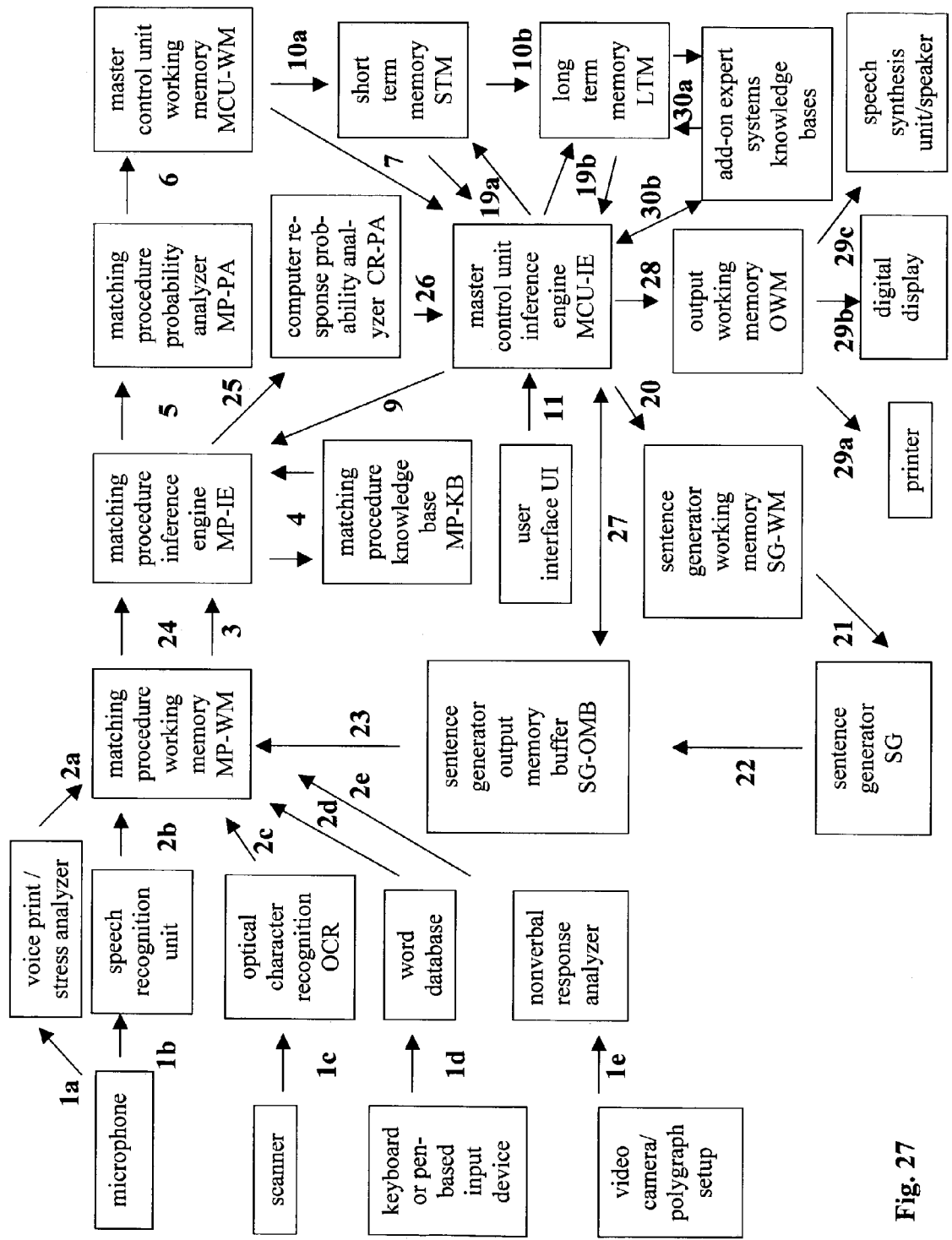
FIG. 27 The flow-chart schematic for the (preferred) AI mode of the IIALA-T

Specifications and Operation—FIGS. 25, 26, 27

The currently defined transitional form of the inductive inference affective language analyzer (transitional)—abbreviated IIALA-T—exhibits three modes of operation, each with distinct advantages. First to be described is a passive monitoring mode, which monitors a verbal interaction without any active input of its own (no clarification of ambiguities). This circumstance is remedied through a subsequent active monitoring mode, clarifying uncertainties through the addition of a stock sentence generator that devises interview types of questions—eliciting yes or no answers. The most advanced mode of operation is a true AI simulation mode, where the IIALA-T employs detection/monitoring data to simulate a transitional interactive role of its own design. This is accomplished utilizing a general-purpose sentence generator that formulates responses that are judged for appropriateness by feedback through the decoding system. Each of these three modes of operation is described further in the order given. These modes of the IIALA-T (although distinct operations) are fully compatible with (and run in conjunction with) the more basic form of IIALA described previously: allowing for the additional applications of humor/comedy & security functions, etc. In concert with the more basic forms of communication mediated by the IIALA, a convincing simulation of AI is achieved (in conjunction with the transitional features embodied in the IIALA-T).

REFERENCE LIST OF ABBREVIATIONS USED IN PATENT FIGS. 25, 26, 27

AI=artificial intelligence

AMS=active monitoring subcomponent

CR-PA=computer response probability analyzer

IIALA-T=inductive inference affective language analyzer—(transitional)

LTM=long term memory

MCU=master control unit

MCU-IE=master control unit inference engine

MCU-KB=master control unit knowledge base

MCU-PA=master control unit probability analyzer

MCU-WM=master control unit working memory

MP-IE=matching procedure inference engine

MP-KB=matching procedure knowledge base

MP-PA=matching procedure probability analyzer

MP-WM=matching procedure working memory

NV-RA=nonverbal response analyzer

OCR=optical character recognition

OWP=output working memory

SG-WM=sentence generator working memory

SSG=stock sentence generator

SG-OMB=sentence generator output memory buffer

STM=short-term memory

UI=user interface

The Passive Monitoring Mode

A passive monitoring mode (depicted in FIG. 25) serves as the basic foundation for the other two modes of the IIALA-T. As a process for decoding the motivational parameters of affective language, the flow chart depicting the operation of this process (as well as the representative circuitry) are illustrated in the same schematic diagram. According to FIG. 25, the sequence of steps comprising the operation of the passive monitoring mode are depicted using consecutively numbered arrows, each number designating a step in the procedure depicted by the box to which the designated arrow points. This specific format was chosen (rather than numbering the individual boxes themselves) due to the fact that some of the boxes are assigned differing functions in the remaining active monitoring and AI simulation modes. For sake of clarity, the arrow leading to a given box is therefore numbered, allowing all three modes of operation to be depicted in concert with one another. The current schematics for the IIALA-T are closely related to that previously specified for the original IIALA, with the exception that the transitional power maneuvers (rather than the complementary variety) are now targeted in the definition matching procedure. Through this decoding and simulation of the transitional class of power maneuvers, the IIALA-T employs a number of the same processes and circuitry specified for the IIALA—although with a number of key exceptions—now to be described.

The first step in the passive monitoring mode for the IIALA-T is an input stage, where language is inputted for matching with the transitional power pyramid definitions. Spoken language is decoded by means of a microphone linked to a speech recognition unit (step 1b): where sound waves are analyzed into distinct words and sentences using continuous speech recognition (such as commercially available in IBM's Via Voice program). The microphone is also connected to a voice print analyzer (step 1a) allowing a person speaking to be matched to a voice print pattern stored in long term memory. The microphone is also connected to a voice-stress analyzer, a further indicator of any degree of verbal disqualification characteristic of the counter double bind maneuvers. Active written input from a keyboard or handwriting recognition device is routed to a digital word database (1d). Printed text is inputted from a scanner to an optical character recognition program (OCR) such as Xerox Pagis Pro (step 1c). A video camera (as well as an optional polygraph setup) is connected to the nonverbal response analyzer, which decodes nonverbal aspects of the communication. Discretely analyzed words or phrases are subsequently routed to a working memory of the power pyramid definition matching procedure (steps 2b, 2c and 2d). The voice print results are also routed to the working memory (abbreviated MP-WM) (step 2a), as well as the determinations of the NV-RA (step 2e).

The Power Pyramid Definition Matching Procedure Inference Engine

A matching procedure with the transitional power pyramid definitions is initiated upon the sentence data imported from the working memory of the matching procedure. The circuitry relating to this procedure is structured along the lines of an expert system (the transitional definition matching procedure expert system). It consists of the three basic components of an expert system; namely, an inference engine, a knowledge base, and a working memory—the MP-WM, already described. The inference engine is a hierarchy of processor complexes, a separate processor complex dedicated to each power pyramid definition (for a grand total of 496): 64 for the lesser virtues, 64 for the classifications of criminality, 64 for the categories of hypercriminality, and 56 for the forms of mental illness (in addition to the 248 total accessory variations).

Each processor complex is further interconnected in strict accordance with the hierarchial organization of the transitional power pyramid hierarchy. This programming architecture is further augmented with the definitions for the general unifying themes depicted in FIGS. 21-A & 21-B through 24-A & 24-B, providing an additional layer of complexity to the matching procedure. This is accomplished by programming the 16-table complement of definitions for both the main and accessory transitional themes, matched against ongoing communication: which in conjunction with the matching procedure for the individual transitional terms further narrows the scope of the matching procedure (providing an additional degree of validity with respect to the individual transitional terms).

The Power Pyramid Definition Matching Procedure Knowledge Base

Each processor complex within the matching procedure inference engine (hereafter abbreviated MP-IE) receives the same data from the matching procedure working memory (step 3), initiating the power pyramid definition matching procedure in concert with a knowledge base memory array (step 4). The knowledge base for the matching procedure is a collective memory array for the MP-IE, representing the formal conceptual template for the full complement of transitional power pyramid definitions. The matching procedure knowledge base (hereafter abbreviated the MP-KB) takes the form of bulk memory storage, reflecting the enormous memory capacity required for programming the variable parameters of the power pyramid definitions into memory storage. The basic unit of knowledge organization within the MP-KB is the conceptual frame (and sub-frame), A separate frame is created for each basic component within a power pyramid definition; namely, noun, predicate, adjective, etc. employing a programming language such as C++ (although not necessarily restricted to any one language in particular). Each (master) frame is further subdivided into numerous sub-frames specifying the words/phrases descriptive of the frame.

For example, the nouns (captain, chairman, etc.) represent sub-frames of the basic frame denoting group authority. In addition to list-based algorithms, rule based algorithms are further employed, as in cases denoting exceptions to the rule. A similar process holds for the verb/predicate components of the sentence as well. The sum-totality of all such frames and sub-frames summate into a master frame-based model of affective language in general, a task simplified through a reliance upon the hierarchal organization of the power pyramid hierarchy. The greatest degree of complexity involves programming the most basic personal authority/follower levels within the power pyramid hierarchy. The subsequent group, spiritual, humanitarian, and transcendental authority levels build in a stepwise fashion upon this elementary personal foundation, resulting in a master semantic hierarchy of motivational terms. Through the principle of inheritance, the higher levels inherit the basic dynamics set forth at the personal level (group authority representing a more advanced modification of personal authority, and so forth). Through this formal sequence of transformations, the entire range of affective language is reproduced in the MP-KB, providing a master data-base for the matching procedure of the MP-IE.

The Matching Procedure Inference Engine

The matching procedure inference engine searches the MP-KB employing heuristic search parameters (step 4), determining the most probable match for the sentence inputted from working memory. The algorithm employed in this matching procedure is one of the process of elimination; namely, the field of inquiry is systematically narrowed until the best remaining solution is ultimately determined. This is achieved through a parallel style of search paradigm employing an expert system concept of a decision tree. Through a depth-first style of decision tree search (employing an if/then logic structure) the most probable solution to the power matching procedure is effectively determined.

A typical example of a sample cycle for such a matching procedure is offered for clarification purposes. As previously described, a typical spoken sentence is recorded through a microphone and analyzed into its individual words within a speech recognition unit. The results are routed to a matching procedure working memory, where they are subsequently routed (in parallel fashion) to each of the 496 processor complexes comprising the matching procedure inference engine (MP-IE), in addition to the 128 processor complexes relating to the main and accessory transitional themes. Each processor complex within the MP-IE searches for the particular criteria of its respective power pyramid definition within the MP knowledge base, determining a given probability of a match with the target sentence inputted from working memory. The matching procedure knowledge base is shared in parallel fashion by each of the processor complexes, each searching for matches in the knowledge base specific to the particulars of its particular power pyramid definition. For example, if the noun, "governor" is a component of the inputted sentence, then the processor complexes of the MP-IE dealing with group authority determine (from checking with the knowledge base) that this circumstance is indicative of a match for group authority.

Such a match is judged probable according to criteria set forth in rules programmed into the inference engine, making use of the principles of fuzzy logic for evaluating the variable probabilities under consideration. A key feature of many expert systems, fuzzy logic gives a general confidence level of reliability—rather than an absolute degree of certainty or falsity. Circumstances can be judged highly probable, moderately probable, moderately improbable, etc., (with even greater shades of meaning in between)—determined by the degree of precision called for by the applications under consideration. Fuzzy logic is particularly helpful in cases when pronouns are used in the sentences. Collective pronouns (such as we, us, and them) indicate a group context or higher, with the final probabilities approximated through the aid of fuzzy logic. The meaning of pronouns is further clarified through the aid of accessory data from the voice print analyzer, offering clues to the identity of the speaker of the sentence (along with the underlying context), a function mediated by the master control unit (more concerning this later).

A Sample Sequence for the Matching Procedure

In summary, each processor complex within the MP-IE is equipped with a specific set of criteria attuned to a particular power pyramid definition. In the first step of the process of elimination, each said processor complex initiates a matching procedure with respect to the subject/object content of the sentence data from working memory (namely, the nouns, adjectives, and articles related to them. For example, the noun "celebrity" makes a high probability match with the processor complex specifying group authority. The adjective "entertainment" celebrity further enhances this probability, as respectively determined from the knowledge base.

The initial party in the interaction also proves crucial for specifying the transitional relationship: as in "You as my loyal fan are gratefully seeking my celebrity autograph." The party initiating the contact (the fan) maneuvers from the one-down position (the personal follower role) with respect to the group authority figure (the one-up position). Accordingly, to match the power pyramid definition for loyalty, all of these specific factors must be detected; namely, a new relationship established from the one-down position (with both the authority and follower roles are directly specified).

According to this decoding procedure, the nouns relating to the authority/follower roles are examined first. In the case of the loyalty example, the personal follower/group authority pairing relegates the remaining potential pairings to a low probability status, a full 90% reduction for this first stage alone. In cases where the sentence is incomplete (such as with the use of pronouns) the processor complexes are weighted more equally, with any more decisive degree of elimination necessarily awaiting further analysis at the forthcoming predicate stage of processing.

Returning to the ongoing example, the "group authority/personal follower" processor complex is determined as the most probable domain of inquiry at this initial phase of the matching procedure. This domain is preferentially selected for the next step in the elimination process; namely, an examination the predicate structure of the inputted sentence (verbs, adverbs, and modifiers), further narrowing down the scope of the matching procedure. This subsequent determination is one step further into the matching procedure decision tree, according to the if/then style of logical operation. If the "group authority/personal follower" realm is the most highly probable (according to the standards set forth in fuzzy logic), then only those subordinate processor complexes are activated at the subsequent (predicate) level of analysis. The other authority-related nodes within the decision tree are temporarily shunted out of the process due to their low probability following the subject/object decoding procedure. These can be reactivated, however, if the prime line of reasoning through the "group authority/personal follower" domain does not yield adequate results. The prime search strategy employs a depth-first style of search algorithm, exploring all of the subordinate nodes of the preferred "group authority/personal follower" path for the most probable solution to the matching procedure (or failing this, the less likely nodes are evaluated in turn for further possible matches).

Returning to our ongoing example, the "group authority/personal follower" domain node is depth-searched first in the predicate matching procedure. For sake of simplicity in explanation, this example is restricted to the lesser virtues, although in relation to the broader picture, this could further extend to the realms of criminality, hypercriminality, or mental illness. With this analysis restricted to the lesser virtues (for illustrative purposes), the processors that contain the exact pairing of authority/follower roles as components are directly spotlighted first: namely, loyalty-responsibility-discipline-vigilance. The predicate matching procedure further narrows this preliminary scope, examining the verbs and adverbs of the target sentence for affective content to be matched with the matching procedure knowledge base. Unlike the subject/object procedure, the predicate matching procedure employs several sequential stages to completely narrow the focus (which can be employed either sequentially or simultaneously).

The Predicate Matching Procedure

The most easily determined (and logical first operation) determines the specific tense of the main verb from the target sentence. Although the term "loyal" fan is specified within the sentence, such an arrangement is not always so clear. The true verb structure of the sentence (are seeking), along with the object (autograph) collectively prove informative, which in conjunction with the "fan" status suggests a past directed time-frame: e.g. the fan worships the past notable achievements of the celebrity. This further limits the range to two basic options: namely, loyalty or responsibility.

This second node in the predicate matching decision tree (by definition) activates a further if/then decision node; namely, if loyalty and responsibility match, then determine whether either positive or negative reinforcement is at issue. This is resolved through a further examination of the basic dynamics underlying autograph-seeking, employing a more detailed examination of the matching procedure knowledge base (by the MP-IE processor complexes specific to loyalty and responsibility). The knowledge base subsequently determines that "autograph seeking" typically denotes a positive action within such a past-directed context: directly spotlighting loyalty as the ultimate solution.

Although loyalty is determined to be the most probable match, one final process of elimination proves crucial; namely, determining whether the main or accessory version of the term is employed. The main and accessory terms differ in terms of subjectivity vs. objectivity (where the you and I roles are reversed). This step is left till last due to ease with which it is resolved. The fan seeks the autograph in the third-person tense; hence, the objective "loyalty" perspective is selected.

Although this completed matching procedure example appears relatively straightforwardly, recall that (for simplicity's sake) the domain of possibilities in the selected example was restricted to the realm of the lesser virtues. In an unrestricted sense, the predicate matching procedure is expanded to allow for a determination of any of the related configurations: namely, criminality, hypercriminality, and mental illness. These additional power pyramid definition-processor complexes of the MP-IE are simultaneously activated in an unrestricted fashion (the decision trees for these further options operating in parallel fashion). The final outcome is essentially the same, with only one determination specified as the most probable match within the predicate matching procedure.

The Decoding Procedure for the Counter Double Bind Maneuvers

This decoding of the transitional style "loyalty" double bind maneuver relies upon a specific configuration of authority/follower roles, as well as the predicate details of the relationship. This preliminary character of the double bind maneuver further serves as a cue that the counter double blind might surely follow, in this case, the humility countermaneuver of the celebrity figure. This counter double bind maneuver is by no means the only option, for the celebrity figure can also accept the initial transitional maneuver as offered: in essence, reciprocating his expected "glorious sense of nostalgia" role. In order to distinguish this cooperative "glory" option from its related "humility" counter maneuver, an additional decoding strategy must further be employed. The respective segments for the power pyramid definitions for "glory" and "humility" are virtually indistinguishable (with the exception of the disqualification expressed for the latter). It therefore follows that this latter disqualified aspect represents a further crucial focus of inquiry. Hence, rather than the strict analysis of the verbal content previously emphasized, the detection of any degree of disqualification is crucial at this further level of decoding.

This is chiefly be detected through monitoring the many naturally occurring physiological parameters accompanying such disqualified communication. In addition to inconsistencies in verbal communication, additional voice stress and lie-detector technologies further serve to identify such disqualified communication. For instance, in addition to the voice-print analyzer, the voice stress analyzer specifically measures low frequency levels of stress in the voice, a feature frequently indicative of deceptiveness. Other tonal aspects of the voice (such as heightened inflection) further indicate insincerity, particularly in the guise of jocularity or facetiousness.

Facial expressions further betray states of underlying emotion; in particular the micro-expressions recorded using a video camera amenable to classification within a Facial Action Coding System. This facial camera set-up is also modified to include monitoring the changes in pupil size. This parameter directly indicates underlying states of emotion, with larger pupils indicating positive emotions, whereas the reverse applies to negative contexts. In concert with body posture, body synchrony, and gestural mannerisms, these outwardly monitored diagnostic parameters certainly prove crucial for detecting any affiliated sense of disqualification.

Autonomic parameters requiring direct physical contact similarly prove useful: such as conventionally monitored in the traditional lie-detector set-up. Said polygraph indicators include the galvanic skin response GSR (monitoring stress), the blood pressure cuff (monitoring fluctuations in blood pressure), in addition to the chest strain gage (measuring rate and depth of breathing). Even brain wave activity can indicate deceptiveness, employing brain "fingerprinting" to detect distinctive brain-murmur wave patterns indicative of recognition of a crucial event (or lack thereof).

These more invasive strategies are clearly less desirable from a technical standpoint, being that the obvious context of the test can adversely skew the accuracy of the results.

The less-invasive strategies (such as voice stress and microexpressions) prove more effective for detecting disqualification within a conversational context. Through the use of said non verbal strategies, disqualification within the counter double bind maneuvers is formally detected, greatly aiding the matching procedure.

This crucial role in detecting disqualification directly employs the nonverbal response analyzer (NV-RA), a critical component of the IIALA-T. Indeed, the NV-RA doubles as an expert system in its own right, examining a broad range of nonverbal parameters in order to determine if any degree of disqualification. To increase accuracy, an extensive database of individuals previously contacted is consulted: comparing previous patterns of mannerisms and inflections with the current context in order to detect disqualified communication. This relative determination of disqualification is passed (step 2E) to the working memory of the matching procedure, which activates the relevant processor complexes in conjunction with the analysis of the verbal content of the sentence, wherein increasing decoding accuracy.

The Matching Procedure Probability Analyzer

Returning to our ongoing example, the "loyalty" option is determined to be the most probable result through a process of elimination. This result is subsequently routed to the probability analyzer (step 5) of the matching procedure (hereafter abbreviated MP-PA). The MP-PA compares the probabilities derived from the loyalty determination to calculate the degree of compliance with respect to the standards set for the applications at the current level of operation. If the determination is affirmative, the matching procedure is judged to be complete. In the case of an inadequate determination, the remaining nodes of the matching procedure decision tree are retroactively activated, subsequently reexamined in a descending order of probability. If none of these subsequent searches proves more reliable than the preferred loyalty determination, then loyalty is retained as the solution (although to a substandard level of confidence).

Also at this stage, the matching procedure targeting the transitional themes is evaluated. Should the respective theme correspond with its respective "loyalty" counterpart, then the matching procedure is said to be enhanced in its accuracy (as opposed to a lack of correlation): a factor that can easily sway the balance of the final determination.

The Master Control Unit Working Memory & Short Term/ Long Term Memory

The results of the ultimate (loyalty) determination of the MP-PA are routed (step 6) for temporary storage in the active (contextual) working memory of the master control unit. Said current data identifies the most probable transitional power pyramid definition associated with the currently inputted (target) sentence. A particular entry within this working memory is actually entered as a complex of features; namely, the complete sentence, the sentence components, the identity of the person speaking, the nonverbal response parameters, along with a determination of the most probable match with its transitional power pyramid definition. This data remains in temporary storage until a new sentence is received, the original entry subsequently displaced (step 10a) into a short term memory storage (abbreviated STM). STM encompasses the sum totality of data recorded within an ongoing active conversation. The record of the final complete conversation is subsequently transferred (step 10b) to a long term memory storage (abbreviated LTM), freeing up short-term memory for the recording of new conversations. This MCU conversational knowledge base takes the form of a bulk memory device, storing all past verbal interactions monitored by the computer: coded so as to be quickly searched by the MCU-IE. A portion of this knowledge base also contains a baseline database installed during manufacture (so that the maiden startup is fully supported via a preliminary knowledge base).

Short-term and long-term memory storage is further crucial for determining the context of sentences with indeterminate structure (such as occurs with the use of pronouns). This contextual content is determined by a master control unit (abbreviated MCU), coordinating the retrieval of information stored from past conversations, whereby converting it into a form useful to the matching procedure. The MCU is actually an expert system in its own right, employing a knowledge base based upon conversational memory. Whereas the inference engine for the matching procedure of the IIALA-T is restricted to a knowledge base targeting the transitional power pyramid definitions, the knowledge base of the MCU is defined as the cumulative pattern of how such power maneuvers accumulate over real time (a higher-order style of knowledge base). The MCU predicts ahead of time which power pyramid maneuvers in conversation are most likely to occur next, allowing the matching procedure to operate more accurately. The MCU is now described in greater detail, outlining its utility as a feedback system for enhancing the performance of the matching procedure.

The Master Control Unit

The MCU incorporates all of the familiar aspects of an expert system. The working memory of the MCU is the active (contextual) working memory previously described, now defined as the MCU working memory (abbreviated MCU-WM). The knowledge base of the MCU is the short-term and long-term memory stores (abbreviated STM and LTM), containing the sum-totality of all (short-term and long-term) conversational contexts. The inference engine of the MCU (abbreviated the MCU-IE) is organized along lines similar to the matching procedure inference engine, with a separate processor complex for each transitional power pyramid definition (for a grand total of 496). The decision tree of the MCU-IE employs a radically different heuristic style of search algorithm consistent with the distinctive content of its knowledge base (the record of all previous verbal interactions). The MCU determines the relative probability that a given power maneuver follows another (based upon its memory base), offering a prediction of the power maneuver immediately forthcoming, priming the matching procedure with clues to the predicted identity of the next inputted sentence.

The decision tree of the MCU-IE systematically narrows the focus of its memory knowledge base, determining the next most probable solution or solutions. For a given transitional power maneuver, there are a limited number of possible options that can follow it (not all equally probable). The most probable follow-up maneuver is an immediate transformation of the current one. In terms of a semantic network, it shares an "edge" with the preliminary maneuver. For the transitional power maneuvers, the options are fairly restricted. For instance, with respect to the virtuous responses to the double bind style of "loyalty" maneuver, four basic options are predicted. The first entails accepting the loyalty maneuver as presented; e.g., gloriously acting nostalgically as expected. In the second case, the celebrity resists the overture by humbly denying being worthy of such a loyalty, wherein disqualifying the context of the entire transitional relationship. A third possible option invokes the symmetrical loyalty maneuver; namely, mirroring the loyalty transitional maneuver back to the fan: as in complementing him on his activities as a fan. A fourth option entails a switch to the accessory counterpart, where the "you" and "I" roles are effectively reversed, allowing one to maneuver the perspective of another. The act of ignoring the fan is not considered here, representing a "null" form of aborted relationship.

With respect to the affiliated counter double bind maneuvers, the range of potential (follower) responses to the celebrity's humility maneuver is similarly restricted. These basic options are defined as: (1) abandon the transitional interchange altogether, (2) change to a new subject, (3) mirror the humility tactic back in a symmetrical fashion, or (4) switch to an accessory viewpoint. In both cases, this preliminary reduction procedure represents a much more manageable complement of potential response options, serving as a basis for the subsequent determinations mediated by the MCU.

a Sample Sequence with Respect to the MCU Decoding Procedure

Before proceeding further, the dynamics of a sample decoding procedure is summarized through returning to the previous loyalty example. At the beginning of the MCU process, the MCU-WM contains the loyalty determination (previously determined through a matching procedure with the power pyramid definitions). This basic determination, along with the person speaking it, a breakdown of grammatical components, etc., are routed to the MCU-IE (step 7), directly activating the loyalty processor complex within the MCU-IE processor array. The loyalty processor, in turn, searches the MCU knowledge base (the STM and LTM) for all recorded instances matching the current parameters (steps 8a and 8b); namely, all past instances of the loyalty maneuver matching the person speaking (the celebrity fan in question). Through an additional operation, the loyalty processor further activates the next most probable processors in the sequence governed by the transformational rules previously described: namely, willing acceptance of the "glory" maneuver by the group authority, resistance in the form of "humility," or the symmetrical/accessory options.

The MCU-IE loyalty processor, in turn, passes along data identifying the next party in the interaction predicted to respond next (in this case, the celebrity figure). According to this additional information, the four newly activated processors further search the MCU knowledge base in a parallel fashion (designated as steps 8a and 8b), identifying power maneuvers immediately following the previously highlighted loyalty maneuver. For example, if the MCU-IE processor complex specific to "humility" identifies many past examples of the celebrity acting humbly in response to the fan's loyalty maneuver, then this determination is identified as the preferred response according to the personality dynamics of the celebrity figure. These relative probabilities are further calculated according to the algorithm of fuzzy logic in terms of the number of occurrences, the strength of response, etc. (leading to an overall determination of highly probable, moderately probable, etc.). The other three (transitional) processor complexes initiate their own knowledge base searches, yielding similar sets of (fuzzy logic) probabilities. The results from all four processors are analyzed within a separate probability analyzer subroutine within the MCU-IE, predicting the next most probable power maneuver.

With "humility" selected as the most probable prediction, the MCU-IE connects directly via a feedback loop (step 9) to the corresponding humility complex within the matching procedure inference engine. This feedback mechanism primes the power pyramid definition matching procedure so that the humility node in the decision tree is checked first when a new sentence is inputted. The other three transitional options within the MCU-IE (with lesser degrees of confidence) are similarly relayed in parallel fashion, although with lesser influence than the primary option (respectively ranked as secondary, tertiary, etc.). Such feedback from the MCU provides a crucial context for ongoing communication, improving accuracy over and beyond that gleaned simply from the grammatical components of the target sentence.

The MCU provides further ancillary benefits when pronouns are used, keeping track of respective identities through a contextual style of monitoring. Furthermore, this feedback mechanism increases the accuracy of the predicate matching procedure by predicting (in advance) the next most probable power maneuver. Random changes of subject necessarily circumvent such predictions, (usually signaled in conversation as: "not to change the subject, but . . . ). The matching procedure-working memory is further designed to detect such colloquialisms, signaling to the MCU that all educated bets are off (at least for a new transitional sentence).

The complete description of the passive monitoring mode of the IIALA is respectively seen as a recurrent network, a dynamic system where the state of the network at any given moment is dependent upon the state of previous moments. The MCU provides a contextual foundation for the power pyramid definition matching procedure, greatly increasing the degree of accuracy in monitoring ongoing verbal communication. Although the "loyalty" example was described in detail for demonstration purposes, it remains just one of many possible variations possible in the transitional matching procedure. This patent further claims the domain of each of these remaining variations in relation to the transitional power pyramid definition matching procedure, the true heart of the IIALA-T.

The User Interface

The passive monitoring mode further requires a separate input mechanism for permitting adjustments to the system, in addition to an output mechanism (for supplying the results of said determinations upon demand). This is accomplished through a separate user interface (abbreviated UI), yet a further standard feature of an expert system. This user interface is connected directly to the MCU-IE (step 11), being that the MCU directly oversees the STM and LTM segments of its knowledge base. Through the input function of the UI, the machine operator queries the MCU for records within its knowledge base of past conversational sequences. The UI is also used to modify the knowledge base of the MCU. Furthermore, through aid of the feedback loop (step 9) the UI modifies and updates the knowledge base of the matching procedure (through relay through the MCU).

The final determinations to UI inquiries are routed from the MCU to an output working memory, abbreviated OMB (step 12), a temporary memory buffer that distributes output data to the output display devices. This takes the form of an active digital display (step 13b), or a standard printer for a permanent paper-based record (step 13a). A third pathway (step 13c) connects to a speech synthesizer/speaker module, allowing for a more personalized style of UI response mechanism.

The Active Monitoring Mode

In summary, the practical applications of the passive monitoring mode are limited only in terms of the purely passive nature of the information gathering procedure. Communication within the transitional (virtuous) realm is allowed to flow freely, while excursions into the realm of criminality and hypercriminality sound the alarm for outside intervention. As a basic recording device, the passive monitoring mode serves as a smart style of surveillance tape, allowing for a fast synopsis of recorded conversations. Although the unobtrusive nature of the passive monitoring mode is one of its major selling points, it can lack accuracy due to its inability to clarify the inevitable occurrence of incomplete information (where a simple query would clarify the issue). Accordingly, the passive monitoring mode can alternately be converted to an optional active monitoring mode through the addition of a stock sentence generator equipped with a stock repertoire of questions for eliciting the desired clarifications.

FIG. 26 illustrates the operation of the active monitoring mode—analogous to the passive monitoring mode up to step 5. The crucial departure occurs at the probability analyzer stage of the matching procedure (the MP-PA), invoked in cases where none of the solutions to the power pyramid definition matching procedure fit the minimum degree of confidence specified for a particular application. The MP-PA then sends a problem alert (step 14) to a special active-monitoring sub-component within the MCU (abbreviated the AMS). Unlike the regular processor array of the MCU-IE, the AMS is activated only when active clarification is called for. The AMS analyzes the deficient sentence data in order to determine where the sentence is lacking in clarity. For instance, if the subject/object data is weak due to the use of a pronoun, then this aspect is targeted for clarification. Should the predicate data of the sentence prove to be the weak link, then this aspect is respectively targeted. Clarifications are best achieved by posing simple yes-or-no questions formulated through the aid of a stock sentence generator (abbreviated SSG).

The AMS routes directly to the SSG (step 15) a description of the deficiency of the sentence, with a best guess at its potential resolution. The SSG then formulates a yes-or-no question using a stock formula incorporating the particulars of what is being queried. What follows is an attention getting prefix, followed by the question proper. For example, a typical question might be: "By (he) do you mean your celebrity?" A yes answer terminates the questioning, while a no answer reiterates the process until a solution is finally reached (or the quest is abandoned as unproductive).

Should the target of the question attempt to respond with more than a yes or no answer, then the stock repertoire politely reminds the responder of the limitations of the system. Once the query procedure has begun, the matching procedure is restricted to listening for yes or no answers (relaying the results of either option to the AMS). Following each such answer, the AMS updates the original sentence, accordingly, silently resubmitting it to the matching procedure-inference engine (where it is subsequently reevaluated through the matching procedure). When a standard level of confidence is ultimately achieved, the query phase is terminated—the system again opened up to a full range of responses. To provide closure, the SSG offers a wrap-up statement, as in: That explains things, please continue.

The physical delivery of the question utilizes the same output pathway from the MCU to the output working memory (step 16), as previously described for the passive mode. This takes the form of an active digital display (step 17b), a standard printer for a paper-based record (step 17a), or a speech synthesizer/speaker set-up (step 17c). Due to its restriction to simple yes or no questions, the active monitoring mode never becomes a convincing participant in the interaction, acting in a moderator/interviewer role. The prime directive of the active monitoring mode aims for maximum disclosure, screening for target issues (while interrupting with yes or no questions when clarifications are in order).

The True AI Simulation Mode

In summary, the active monitoring mode surpasses the passive monitoring mode in terms of potential certainty. The distractions of interrupting the natural flow of conversation are offset by the ability to clarify uncertainties in the conversation. The active monitoring mode is handicapped by its restriction to simple yes-or-no questions, imparting a somewhat machine-like demeanor. Questions posed more diplomatically entail true AI simulation, employing a more sophisticated style of response repertoire (a general-purpose sentence generator). Accordingly, large number of sentences are necessarily generated, ensuring that at least one is judged suitable following feedback through the transitional definition matching procedure (judged for overall appropriateness). The true AI mode effectively simulates an identity of its own allowing for a more natural style of interaction.

FIG. 27 illustrates this third and most elaborate version of the IIALA-T, representing an enhanced modification of the basic passive monitoring mode through the addition of a general purpose sentence generator (and associated pathways). For sake of clarity, the circuitry for the active monitoring mode has been omitted in FIG. 27, although both sets of circuitry are compatible with one another. According to this preferred version, the active monitoring mode is switched off when operating in the AI mode (and vice versa). Although not mutually exclusive, it proves inadvisable to run both modes simultaneously (for sake of response consistency), although a task-driven alternation between the two modes remains an option.

Returning to FIG. 27, this diagram builds directly upon the basic passive monitoring mode with the exception that extensive modifications are employed beginning at the level of the MCU. In terms of operation, the passive monitoring mode runs concurrently with the AI mode, the latter only overruling the former when a computer generated response is called for. Recall (in the passive monitoring mode) that the MCU predicts the next most probable response in an ongoing interaction, passing this information on to the power pyramid definition matching procedure in order to increase monitoring accuracy. This information can further be used to synthesize responses offered as originating from the IIALA-T, a simulation of AI in the realm of the transitional maneuvers.

Simulating differing modes of temperament and personality is further possible, particularly those personalities the individual gets along with the best. This data is solicited in advance for each individual, with the computer then simulating these specific personalities in order to put the individual most at ease. This simulation of personality is directly mediated through the MCU, as the following description directly serves to illustrate.

The AI Language Simulation Procedure

A brief review of the basic workings of the MCU is appropriate here, serving as the basic template upon which the modifications of the AI operation are employed. Recall that the MCU working memory dovetails into the end of the matching procedure; namely, the active (contextual) working memory doubles as the working memory for the MCU. According to the specific (loyalty) example, the basic determination of loyalty (along with its grammatical parameters) is routed from the MCU-WM to the inference engine of the MCU, activating the corresponding (loyalty) processor complex within the MCU-IE processor array. This specific "loyalty" processor, in turn, searches the MCU knowledge base, highlighting all previous occurrences (in both STM and LTM) matching said particulars (e.g., the fan's autograph-seeking maneuver).

It is at this step that the true AI procedure diverges from the passive monitoring mode. Should the loyalty maneuver of the fan be directed towards the computer (in the role of celebrity-computer), then a response is definitely called for. In preparation for formulating the AI response, the loyalty processor within the MCU-IE identifies all instances of loyalty within its knowledge base (steps 19a & 19b), regardless of the identity of the individual who made it (highlighting an abundant sampling of examples within the database). Upon this broad basis, the MCU-IE further narrows the focus of the operation through a subsequent rule based algorithm (mediated by the loyalty processor) specifying the four most probable transitional states; namely, glorious acceptance, humble resistance, symmetrical loyalty, or accessory loyalty.

Each of these four individually selected processor complexes searches the common knowledge base for examples of each type of maneuver directly following the initial loyalty maneuver. A large number of responses are highlighted in the MCU-KB, serving as a template upon which the computer will model its own response. For instance, sentences relating to humility would be identified for the next step in the process. Furthermore, preferred styles of personality are selectively favored, leading to a computer response repertoire tailored exclusively to the respondent.

The Master Control Unit Probability Analyzer Subroutine

The wide selection of sample sentences within the knowledge base are evaluated in their entirety within a separate probability analyzer subroutine within the MCU (the MCU-PA), as the return steps 19a and 19b serve to indicate. Each sentence is rated according to the principles of fuzzy logic, calculated as highly probable, moderately probable, etc. (based upon variable criteria, such as the number of times used, etc.). Should humility (for instance) receive the highest rating, it, accordingly, is ranked first (followed in descending order by the remaining less probable options).

The Sentence Generator Working Memory

It is at this stage that the true AI procedure diverges from the passive monitoring mode. In the latter mode, the probability determination is used in a feedback function to increase the accuracy of the matching procedure. In the AI mode, however, this probability data (along with its grammatical particulars) is routed to the working memory of a separate general-purpose sentence generator. Should humility (for example) be rated first, then all highlighted sentences within the knowledge base relating to humility are passed (step 20) to the sentence generator working memory (SG-WM).

Sentences relating to the other potential response options are similarly transferred in turn, although respectively further down the cue. In addition to this large sampling of sentences, the MCU-PA also sends a template of the fixed particulars of the response currently being formulated; namely, to whom the current response is being addressed, the context of the response, etc. These particulars are essential for properly modifying the sample sentences, changing the examples spoken by others (in the desired personality mode) to fit a response the computer is devising for its current context.

The General Purpose Sentence Generator

At the next stage (step 21) the sample sentences are transferred in order of priority to the sentence generator—in addition to the response particulars of the active response template. The sentence generator (abbreviated SG) strips away the original particulars of the sample sentences, replacing them with particulars specified for the AI response. The SG is further equipped with a comprehensive set of rules for syntax, grammar, and phraseology, allowing for many novel modifications to the sample sentences. These modifications effectively disguise the fact that said modified sentences were previously employed by others. Certainly not all such modified sentences are equally suited to the task. This is not a major concern, for only the best sentence is selected for delivery to the output unit—as judged through a subsequent feedback through the matching procedure.

The Sentence Generator Output Working Memory

The modified sentences from the sentence generator are stored in their original order of priority (step 22) in the sentence generator output memory buffer (SG-OMB), a necessary step being that the sentence modification procedure occurs in a prioritized fashion. The final modified sentences are slated for subsequent feedback through the transitional power pyramid definition matching procedure, where they are evaluated for their potential to express the desired maneuver intended.

Recall, however, that sentences inputted from active speech are first broken down into basic sentence components; namely, noun, verb, adverb, etc. (in order to be transformed into a form decipherable by the power pyramid definition matching procedure). It is crucial, therefore, to maintain a record of generated response sentences in an intact form before passing them along to such a diagnostic operation. Each sentence, accordingly, is labeled with an add/on code designation within the SG-OMB, and also affixed to the disjointed (component) form of the sentence. In said fashion, the sentence ultimately selected at the end of the matching procedure, in turn, surrenders its code back to the MCU, allowing the intact sentence to be subsequently retrieved from the SG-OMB for eventual delivery to the output response mechanism.

The AI Response Matching Procedure

Returning to the ongoing diagnostic procedure, sentences within the SG-OMB are coded and routed in order of priority (step 23) to the working memory for the matching procedure (MP-WM), wherein broken down into sentence components in preparation for the matching procedure. The affixed code, however, specifies a different matching procedure than was previously seen for actively inputted verbal data. Recall that a given sentence inputted from human conversation was matched to a particular power pyramid definition through a process of elimination; i.e., an unknown quantity systematically identified through a diagnostic decision tree. In the case of the computer-generated sentences, however, a different set of variables is now in question (for the power pyramid definition targeted by the sentence is already known).

Returning to the ongoing example, the first sentence to be decoded by the matching procedure represents a response within the domain of humility (being that the MCU rated humility as the most probable response). Rather than following the standard decision tree, the computer-generated sentence(s) with respect to humility are routed directly to the humility processor complex within the MP-IE processor array, which then searches its respective knowledge base (using fuzzy logic) to determine how well this artificially generated sentence conveys its designated meaning.

In a further critical sense, this new sentence should ideally further exhibit a low correspondence to any of the other power pyramid definitions (that might overlap with humility), wherein confusing its clarity. In order to achieve this additional level of confidence, the new sentence is processed in parallel fashion through the rest of the processor complexes as well. This all-inclusive process is more computationally intensive than the process-of-elimination algorithm previously described for the passive-monitoring mode, the probabilities now determined as the degree of probability approximating a null hypothesis (e.g., not matching humility). This increased demand upon the system, however, represents a necessary sacrifice for achieving a full degree of confidence with respect to the final selected response.

The Computer Response Probability Analyzer

This radical departure from the standard matching procedure specifies that the final determination be routed to a separate probability analyzer (step 25), the computer response probability analyzer (abbreviated CR-PA). The CR-PA is distinct from the MP-PA used in the standard matching procedure. The CR-PA uses a radically different evaluation algorithm, with the humility determination evaluated in the typical matching fashion, whereas all remaining comparisons are evaluated in terms of a reverse probability rating (a null matching algorithm). The code designation previously assigned to the intact sentence is given an overall probability rating by the CR-PA. This is then followed by the next sentence in the cue from the SG-OMB, processed in a sequential fashion until all sentences relating to humility are processed. The sentence emerging from this procedure with the highest overall rating is selected as the preferred computer response. On occasions when none of these computer generated sentences meets a minimum standard rating (as specified within the CR-PA), then the sentences representing the next most probable power maneuver (for example, glory) are examined in turn (and so on) until an acceptable sentence is eventually selected.

The Computer Response Output Mechanisms

The attached code for the final selected sentence is transferred to a separate subroutine within the MCU (step 26), which then uses this code to retrieve the original sentence (step 27) from the SG-OMB. The MCU then relays this retrieved sentence to the output working memory (step 28) for subsequent delivery to the respective output devices: either a speech synthesis unit/speaker (step 29*c*), a digital display (step 29*b*), or a printer (step 29*a*). Note that these same output pathways are also utilized in both the active and passive monitoring modes, allowing for an economical sharing of common pathways. Speech synthesis that requires a simulation of disqualified communication would require an additional modification of the output mechanisms to reflect the sarcastic inflections typically encountered.

The computer further receives feedback of its own responses through its input devices (such as when output is configured in the speech synthesis mode), although a subliminal carrier frequency is employed to cue the matching procedure to ignore decoding this response. A more effective strategy for maintaining a record of the computer's responses is a direct pathway via the MCU directly to LTM storage. These computer responses are stored in a separate folder labeled for the computer role under consideration. Ideally, a separate folder is created for each specific interaction with a given individual. Here the LTM makes effective use of a concept known as the floating ego; namely, the computer's own responses are treated the same in memory as those from other individuals. Although the computer is not technically aware of its own ego status (as humans are instinctually so) its ability to convincingly simulate the transitional maneuvers renders this drawback a moot point as far as practical applications are concerned.

Although this current version of the AI response mechanism is described in great detail, it is just one of many possible variations that accomplish a common goal; namely, the use of the entire complement of 496 transitional power pyramid definitions for simulating a transitional response repertoire in the IIALA-T. The current patent claims these other potential variations (not explicitly excluded in the previous descriptions) with respect to their practical applications to the transitional power pyramid definitions.

The AI Initiation of Transitional Sequences

With respect to its transitional style of response repertoire, the IIALA-T is not restricted to responding exclusively in terms of such counter double bind maneuvers, for it also must be able to initiate transitional maneuvers as well. The IIALA-T interacts with a new person (for the first time) by transitioning directly into a new relationship. This entails decoding the new transitional overture (should the other party go first), or devise a transitional overture of its own making. This is accomplished as a function of the MCU, employing a standard template of introductory transitional maneuvers: a general list of pleasantries that typically occur at the start of any new relationship. These standard response templates are routed to the general-purpose sentence generator (along with the particulars of the current context), resulting in a varied complement of a initial sentences. These are subsequently fed back through that feedback mechanism (steps 23-29), judged for their ability to the express the opening maneuver specified, with only the top response is delivered to the output device(s).

A further pressing question remains; namely, how does the IIALA-T determine when it is its turn to respond? The computer first looks for statements directly addressed to itself. A period of silence of more than five seconds similarly indicates that a response is in order. Furthermore, information often takes more than a single sentence to convey, further establishing the need to wait for such a pause. This is more critical in a one-to-one situation (than in a group setting), where the extra participants are typically willing to take up the slack in a given conversation. Generally speaking, less is more with respect to computer responses: where maximum human disclosure is encouraged (with computer responses restricted to pithy and meaningful interjections). This subdued approach minimizes any human resistance to a machine acting too humanlike. In circumstances calling for a livelier interaction, the MCU is instructed (via the user interface) to step up its response rate, etc.

The Addition of Add-On Expert Systems

In conclusion, the heart of the IIALA-T system is a recurrently-organized, matching procedure based upon the transitional power pyramid definitions, a procedure that is dependent upon both the content and context of a given sentence. In longer narratives (such as storytelling) meaning is typically spread out over a broad range of sentences, a circumstance that might not always be correctly comprehended by the computer. Indeed, some sentences are essentially neutral in character, but are imbedded in some overall sense of affective context with respect to the expectations of the participants. This tendency towards expanded narratives can be remedied by informing participants (ahead of time) to be succinct and to speak in discrete sentences. Such a restriction, however, is a serious drawback to any truly convincing AI simulation, where meaning is often conveyed in complex passages.

Such a shortcoming is remedied through the addition of additional expert systems attuned to such an enhanced degree of narrative complexity. Such add-on options are necessarily compatible with the two existing knowledge bases of the IIALA-T. One such expert system is necessarily a conversational analyzer, specializing in following extended conversation for affective meaning through connections to the MCU-IE and its knowledge base (steps 30*a* and 30*b* of FIG. 27). Other expert systems prove equally applicable, such as a general knowledge-expert system providing general-purpose knowledge (employing well established knowledge bases such as CYC). Once the computer is brought up to general speed, additional expert systems in the truest sense of the term (such a legal knowledge, medical knowledge, etc.) allow the computer to become proficient in many areas of expertise far in advance of what a human might collectively master.

Specialized Applications for the Transitional Power Maneuvers

The transitional definition format for the lesser virtues allows for crucial applications to the fields of humor and comedy, as specified within the transitional power hierarchy. The reciprocating arrangement of authority and follower roles proves particularly effective for deciphering the nuances governing the comedic realm.

The power pyramid definitions for the lesser virtues are tailor-made for programming into the computer, serving as a key adjunct to the formal simulation of humor and comedy. The power pyramid definitions for the lesser virtues are expressed in terms of a dual sentence structure utilized in a matching function with sentences inputted from live conversation—determining the precise degree of correspondence with respect to the ethical terms under consideration.

Abrupt shifts within conversation directly signals that a transitional maneuver has just occurred. This further prompts the detection of the affiliated counter double bind maneuvers (that are typically disqualified to some degree). This greatly increases the complexity of the detection procedure, necessitating the decoding of the variable nuances of inflection, timing, lingo, sarcasm, etc. that signal disqualification.

Enhanced speech recognition proves crucial for decoding such transitional sequences, with special provisions for detecting disqualified communication. Nonverbal cues are crucial at this juncture, where a spontaneous shrug of the shoulders can greatly modify the content of what is being said. Other sub-routines target visual cues such as pupil size, body synchrony, breathing patterns, etc. (parameters particularly representative of internal motivational states). In conjunction with verbal cues (such as voice stress analysis), the suitably enhanced IIALA-T is able to detect telltale disqualification within the ongoing verbal interaction. In the passive-monitoring mode, the IIALA-T is fully equipped to detect the use of humor. Those attempting to use humor in inappropriate computer-monitored contexts would be instructed to clarify their statements in more formal terms, or be referred to a human troubleshooter.

Such humorous themes become an asset where true human companionship is desired, simulating a more informal style of social setting, resulting in more relaxed feelings of camaraderie. Here the roles become less rigidly fixed, in direct contrast to the more formal restrictions governing the strictly serious side to the power hierarchy. In the true AI simulation mode, the AI computer detects such humorous sequences and also devises humorous responses of its own design, further tailored to the sensibilities of a given person or audience. The databanks alone prove formidable, although enjoying the advantages of power pyramid indexing, wherein stored in a fashion conducive to ready retrieval and delivery. Although such applications typically refer to active verbal input, such functions also extend to written language input as well. The vast accumulated tradition of literature is similarly amenable to decoding within such a system, allowing for a master database of the great literature of the world eminently searchable in terms of affective content.

Networking Applications for the IIALA-T

The parallel processing capabilities of the IIALA-T could process of a large number of conversations simultaneously, maximizing the available circuitry by staggering the timing to make use of lulls naturally occurring within a given conversation. This is managed through a time-share arrangement, where multiple accounts are accommodated—rated in terms of urgency. Conversations requiring real-time parameters are assigned the highest priority, whereas more leisurely accounts are processed during free periods. This further entails a centralized CPU complex, connecting end users through a user interface network or the Internet.

This stand-alone model of AI computing is surpassed by transferring the bulk of processing directly to the considerable resources of the Internet. The comprehensive knowledge bases of the AI computer are distributed as open source code over a network of broad-band servers. The end user's computer only need run a modified version of the AI-MCU program, the inference engine of which interfaces directly with the web-based knowledge base on a real-time basis. The basic groundwork for such a standardized database network is already being implemented with respect to the newly proposed Semantic Web, which aims to implement a strictly machine-based version for standardizing the wealth of network information. In conjunction with provisions for an affiliated AI interface, the potential for an AI assistant could become widespread.

Decoding the Realms of Criminality/Hypercriminality

The other forms of transitional maneuvers are similarly invested with unique applications. For instance, applications extending to criminality and hypercriminality are invoked in security types of contexts, as well as in the fields of law enforcement and criminal profiling. The empathic insights associated with the criminal mentality prove extremely informative in a diagnostic sense. For the passive-monitoring mode, this enables the detection and diagnosis of criminal behavior (with the express purpose of preventing it). In cases where a crime has already been perpetrated, the specific details are recreated in a criminal profiling type of context. By definition, the computer would be formally restricted from responding in kind, rather acting to circumvent/report such detected activities. Although this modification of the basic AI program (to simulate criminality) might appear somewhat of a risky maneuver, with proper safeguards in place, this application could prove invaluable in the detection and diagnosis of this disturbing realm of criminality.

The AI Mental Health Clinician

The power pyramid definitions for mental illness, when implemented within the standard IIALA-T format, permits the decoding of dysfunctional communication in a diagnostic/clinical setting. In the passive-monitoring mode, the AI clinician monitors a mental health setting, detecting a wide range of symptomologies and sounding the alarm when intervention is in order. This ability of the IIALA-T to decode disqualified communication further enables the affiliated diagnosis of the neuroses and schizophrenia. Within a true AI simulation mode, the response repertoire specifies the role of an AI therapist that intervenes in a prescribed fashion in order to counter the symptomology of the patient. Through said therapeutic type of intervention (in conjunction with its diagnostic functions), the IIALA-T assists the human staff in less critical contexts.

SUMMARY, RAMIFICATIONS, AND SCOPE

In summary, the preferred version of the IIALA-T is a coordination of two basic expert system components; namely, a transitional power pyramid definition matching procedure expert system and a master control unit expert system. The latter coordinates the system over real time, as well as overseeing the generation of computer responses (whereby allowing for a simulation of the transitional power maneuvers). At the heart of this tandem system are the listings of transitional power pyramid definitions (as documented in FIGS. 2 through 17). These transitional definitions are indispensable as the heart of the system, the general knowledge base without which this process would have remained impossible.

The current version of the IIALA-T represents a stand-alone variation on the standard IIALA, distinguished by the uniqueness of its programming; namely, the power pyramid definitions for the transitional power maneuvers. These independent versions of the IIALA and the IIALA-T makes good economic sense, being that not every AI application requires the simulation of humor and comedy, etc. (as included in the IIALA-T). When run in combination, this tandem setup provides the most convincing (unrestricted) sense of ethical artificial intelligence, allowing for a simulation of the serious side to communication as well as its more light-hearted aspects.

This tandem operation greatly enhances the accuracy of the overall monitoring procedure, allowing for the decoding of virtually every possible category of affective communication. When the respective output devices are configured in a similar fashion, this independent type of arrangement would not immediately be apparent to an outside observer. A response synchronization routine is crucial for such a tandem arrangement, assuring that both modules do not respond at the same time. Here the IIALA-T serves an invaluable adjunct to the IIALA, although the IIALA-T can operate independently in roles requiring pure simulation of humor/comedy, criminality, mental illness, etc. As such, the IIALA-T supplements the more serious response repertoire of the IIALA, offering the potential for an unrestricted model of AI in general.

Although preceding description of the IIALA-T contains many specificities, these should not be construed as limiting the scope of the invention but merely as providing illustrations of some of the preferred embodiments for this invention. For example, the passive monitoring mode of the IIALA-T exhibits applications to the monitoring of a comedic context, as well as clinical/diagnostic functions relating to criminality/mental illness. The preferred AI mode of the IIALA-T further excels in applications where a convincing simulation of transitional power maneuvers is specified, including the roles of AI entertainer, security specialist, and AI therapist. The use of non-verbal cues in the decoding/matching procedure adds further confidence to the AI matching procedure. Accordingly, the scope of this invention should be determined not only by the embodiments described, but by the appended claims and their legal equivalents.

I claim:

1. A computer implemented method embodied in a computer readable media to establish conditional acceptance consisting of:
    a) establishing a social environment including a physical setting and a plurality of participants, each participant with a predetermined quantative disposition profile;
    b) identifying a newcomer to the social environment;
    c) recording in initial relationship parameters the features of newcomer's projected authority and follower roles subclassified with personal and group perspectives and annotated with emotions conditioned on the social environment and together defining a newcomer's quantative perspective profile;
    d) identifying the participant from the plurality of the participants in the social environment responding to the newcomer's dictated the quantative perspective profile;
    e) adjusting the participant's initial the quantative disposition profile for assessment by the participant to the newcomer's quantative perspective profile;
    f) analyzing the reaction by the participant to the features of the initial relationship parameters dictated by the newcomer by comparison of the quantative disposition profile and the quantative perspective profile using a predetermined threshold to determine acceptance condition;
    g) outputting the participant's condition of acceptance of the features of initial relationship parameters by either an outward response accepting the features of the initial relationship parameters or a disqualification response where the participant outwardly accepts dictated initial relationship parameters proposed by the newcomer while simultaneously disqualifying willing participation through the use of meta-contextual cues expressed in a non threatening manner;
    h) selecting an alternative participant within the plurality of participants and repeating steps b) through g) to establish a predetermined range of the conditional acceptance of the newcomer in the social environment.

* * * * *